(12) United States Patent
Ozog

(10) Patent No.: US 10,027,726 B1
(45) Date of Patent: *Jul. 17, 2018

(54) DEVICE, APPARATUS, AND METHOD FOR FACIAL RECOGNITION

(71) Applicant: OZOG MEDIA, LLC, Wilmington, DE (US)

(72) Inventor: Jesse Ozog, Bethesda, MD (US)

(73) Assignee: Ozog Media, LLC, Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/803,824

(22) Filed: Nov. 5, 2017

Related U.S. Application Data

(63) Continuation-in-part of application No. 15/150,408, filed on May 9, 2016, which is a continuation-in-part (Continued)

(51) Int. Cl.
| | |
|---|---|
| *G06F 3/048* | (2013.01) |
| *H04L 29/06* | (2006.01) |
| *G06K 9/00* | (2006.01) |
| *H04L 29/08* | (2006.01) |
| *G06F 3/0484* | (2013.01) |
| *G06F 17/30* | (2006.01) |
| *G06F 3/0488* | (2013.01) |

(52) U.S. Cl.
CPC ........ *H04L 65/403* (2013.01); *G06F 3/04842* (2013.01); *G06F 17/30247* (2013.01); *G06K 9/00288* (2013.01); *H04L 67/306* (2013.01); *G06F 3/0488* (2013.01)

(58) Field of Classification Search
CPC . H04L 65/403; H04L 67/306; G06F 3/04842; G06F 3/0488; G06F 17/30247; G06K 9/00288; G06K 9/00295
See application file for complete search history.

(56) References Cited

U.S. PATENT DOCUMENTS

| | | | |
|---|---|---|---|
| 2003/0004916 A1* | 1/2003 | Lewis | ................ H04N 1/00132 |
| 2003/0009527 A1* | 1/2003 | McIntyre | .......... G06F 17/30247 709/206 |

(Continued)

*Primary Examiner* — Patrick F Riegler
(74) *Attorney, Agent, or Firm* — Patrick E. Caldwell, Esq.; The Caldwell Firm, LLC

(57) ABSTRACT

In one embodiment, a device is provided, comprising: a screen; an input mechanism; at least one non-transitory memory storing instructions; and one or more processors in communication with the screen, the input mechanism, and the at least one non-transitory memory, wherein the one or more processors execute the instructions to cause the device to provide at least one option for sharing images, where the sharing is performed utilizing face recognition information that is based on third party input of a third party that is provided by the third party into at least one other device in association with at least one face, the face recognition information being utilized in connection with the at least one option for sharing images based on a relation between a user of the device and the third party associated with the third party input, such that the face recognition information is only utilized in connection with the at least one option for sharing images if the relation exists between the user of the device and the third party associated with the third party input.

30 Claims, 37 Drawing Sheets

Related U.S. Application Data of application No. 14/582,946, filed on Dec. 24, 2014, now Pat. No. 9,336,435, which is a continuation-in-part of application No. 14/085,832, filed on Nov. 21, 2013.

(60) Provisional application No. 61/784,109, filed on Mar. 14, 2013, provisional application No. 61/759,816, filed on Feb. 1, 2013, provisional application No. 61/731,462, filed on Nov. 29, 2012, provisional application No. 61/729,259, filed on Nov. 21, 2012.

(56) References Cited

U.S. PATENT DOCUMENTS

| | | | |
|---|---|---|---|
| 2003/0078968 A1* | 4/2003 | Needham | H04L 29/06 709/204 |
| 2003/0210808 A1* | 11/2003 | Chen | G06K 9/00221 382/118 |
| 2009/0037477 A1* | 2/2009 | Choi | G06F 17/30259 |
| 2009/0141950 A1* | 6/2009 | Ryu | G06F 17/30259 382/118 |
| 2010/0066822 A1* | 3/2010 | Steinberg | G06K 9/00208 348/77 |
| 2011/0078097 A1* | 3/2011 | Thornton | G06F 17/30253 706/12 |
| 2018/0047269 A1* | 2/2018 | Thomas | G08B 13/19695 |

* cited by examiner

1300

APPLICATIONS — FILTER:

| NAME | DEVICE | GENRE | RATING | SIZE | # USES | LAST USED | • • • | MORE → |
|------|--------|-------|--------|------|--------|-----------|-------|--------|
| — — | — — | — — | — — | — — | — — | — — | | |
| — — | — — | — — | — — | — — | — — | — — | | |

FILTER BASED ON PARAMETERS

| DEVICE: | TYPE ▽ |
|---------|--------|
| GENRE: | ☐ ACTION<br>☐ ADVENTURE ••• |
| TYPE: | GAME ▽ |
| NOT INSTALLED: | ☑ |

FIGURE 13B

DEVICE, APPARATUS, AND METHOD FOR FACIAL RECOGNITION

RELATED APPLICATIONS

The present application is a continuation-in-part of U.S. patent application Ser. No. 15/150,408, titled "SYSTEM, METHOD, AND COMPUTER PROGRAM PRODUCT FOR PERFORMING PROCESSING BASED ON OBJECT RECOGNITION," filed May 9, 2016, which is a continuation-in-part of U.S. patent application Ser. No. 14/582,946, now U.S. Pat. No. 9,336,435, titled "SYSTEM, METHOD, AND COMPUTER PROGRAM PRODUCT FOR PERFORMING PROCESSING BASED ON OBJECT RECOGNITION," filed Dec. 24, 2014, which is a continuation-in-part of U.S. patent application Ser. No. 14/085,832, titled "SYSTEM, METHOD, AND COMPUTER PROGRAM PRODUCT FOR SHARING METADATA ASSOCIATED WITH A MEDIA OBJECT," filed Nov. 21, 2013, which claims priority to previously filed U.S. Patent Application No. 61/729,259, titled "SYSTEM, METHOD, AND COMPUTER PROGRAM PRODUCT FOR SHARING METADATA ASSOCIATED WITH A MEDIA OBJECT," filed Nov. 21, 2012, U.S. Patent Application No. 61/731,462, titled "SYSTEM, METHOD, AND COMPUTER PROGRAM PRODUCT FOR UPDATING DIRECTIONS BASED ON A CHANGE IN LOCATION," filed Nov. 29, 2012, U.S. Patent Application No. 61/759,816, titled "SYSTEM, METHOD, AND COMPUTER PROGRAM PRODUCT FOR SHARING METADATA ASSOCIATED WITH A MEDIA OBJECT," filed Feb. 1, 2013, U.S. Patent Application No. 61/784,109, titled "SYSTEM, METHOD, AND COMPUTER PROGRAM PRODUCT FOR SHARING METADATA ASSOCIATED WITH A MEDIA OBJECT," filed Mar. 14, 2013.

The present application further incorporates the following applications by reference, for all purposes: U.S. patent application Ser. No. 14/582,946, titled "SYSTEM, METHOD, AND COMPUTER PROGRAM PRODUCT FOR PERFORMING PROCESSING BASED ON OBJECT RECOGNITION," filed Dec. 24, 2014; U.S. patent application Ser. No. 14/085,832, titled "SYSTEM, METHOD, AND COMPUTER PROGRAM PRODUCT FOR SHARING METADATA ASSOCIATED WITH A MEDIA OBJECT," filed Nov. 21, 2013; U.S. Patent Application No. 61/729,259, titled "SYSTEM, METHOD, AND COMPUTER PROGRAM PRODUCT FOR SHARING METADATA ASSOCIATED WITH A MEDIA OBJECT," filed Nov. 21, 2012; U.S. Patent Application No. 61/731,462, titled "SYSTEM, METHOD, AND COMPUTER PROGRAM PRODUCT FOR UPDATING DIRECTIONS BASED ON A CHANGE IN LOCATION," filed Nov. 29, 2012; U.S. Patent Application No. 61/759,816, titled "SYSTEM, METHOD, AND COMPUTER PROGRAM PRODUCT FOR SHARING METADATA ASSOCIATED WITH A MEDIA OBJECT," filed Feb. 1, 2013; and U.S. Patent Application No. 61/784,109, titled "SYSTEM, METHOD, AND COMPUTER PROGRAM PRODUCT FOR SHARING METADATA ASSOCIATED WITH A MEDIA OBJECT," filed Mar. 14, 2013.

FIELD OF THE INVENTION AND BACKGROUND

The present invention relates to data sharing, and more particularly to the sharing of metadata and/or media between devices.

SUMMARY

In one embodiment, a device is provided, comprising: a screen; an input mechanism; at least one non-transitory memory storing instructions; and one or more processors in communication with the screen, the input mechanism, and the at least one non-transitory memory, wherein the one or more processors execute the instructions to cause the device to: display, utilizing the screen of the device, a plurality of indicia each including at least a portion of an image including a face; receive, utilizing the input mechanism of the device, a user input in connection with at least one of the indicia including at least a portion of a first image including a first face; after receiving the user input in connection with the at least one indicia, display, utilizing the screen of the device, a first set of images each including the first face that has been recognized in at least one of a plurality of images accessible via the device; display, utilizing the screen of the device, at least one option for sharing images, where the sharing is performed utilizing face recognition information that is based on third party input of a third party that is provided by the third party into at least one other device in association with at least one face, the face recognition information being utilized in connection with the at least one option for sharing images based on a relation between a user of the device and the third party associated with the third party input, such that the face recognition information is only utilized in connection with the at least one option for sharing images if the relation exists between the user of the device and the third party associated with the third party input; in connection with the at least one option for sharing images, display, utilizing the screen of the device, a second set of images each including the at least one face that has been recognized in at least one of the plurality of images accessible via the device utilizing the face recognition information that is based on the third party input of the third party that is provided by the third party into the at least one other device in association with the at least one face; receive, utilizing the input mechanism of the device, a user input in connection with at least one of the second set of images; and after receiving the user input in connection with at least one of the second set of images, cause one or more of the second set of images to be shared. In other embodiments, other apparatuses, methods, and devices are provided that may omit one or more of the features disclosed hereinabove.

BRIEF DESCRIPTION OF THE DRAWINGS

FIG. 13A shows a media object display list, in accordance with another embodiment.

FIG. 13B shows an exemplary parameter selection interface for selecting filter criteria associated with an interface, in accordance with another embodiment.

DETAILED DESCRIPTION

Figure 1:
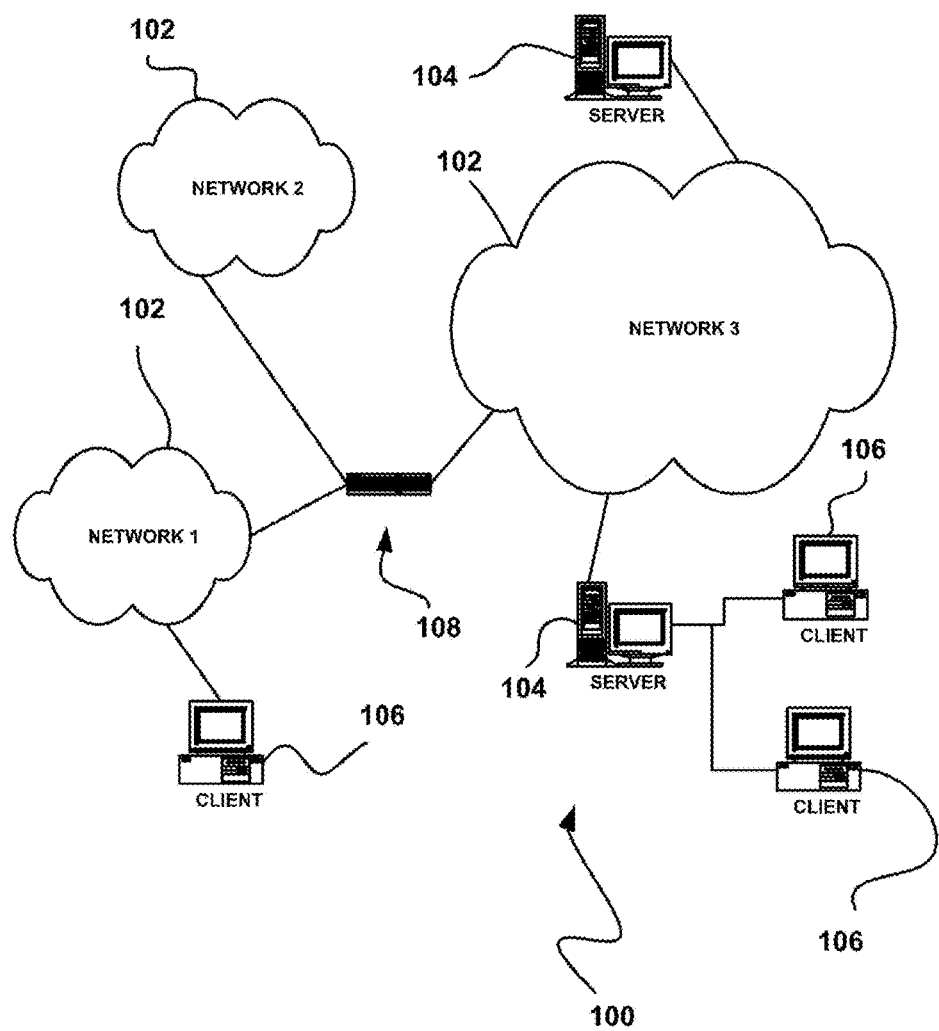
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
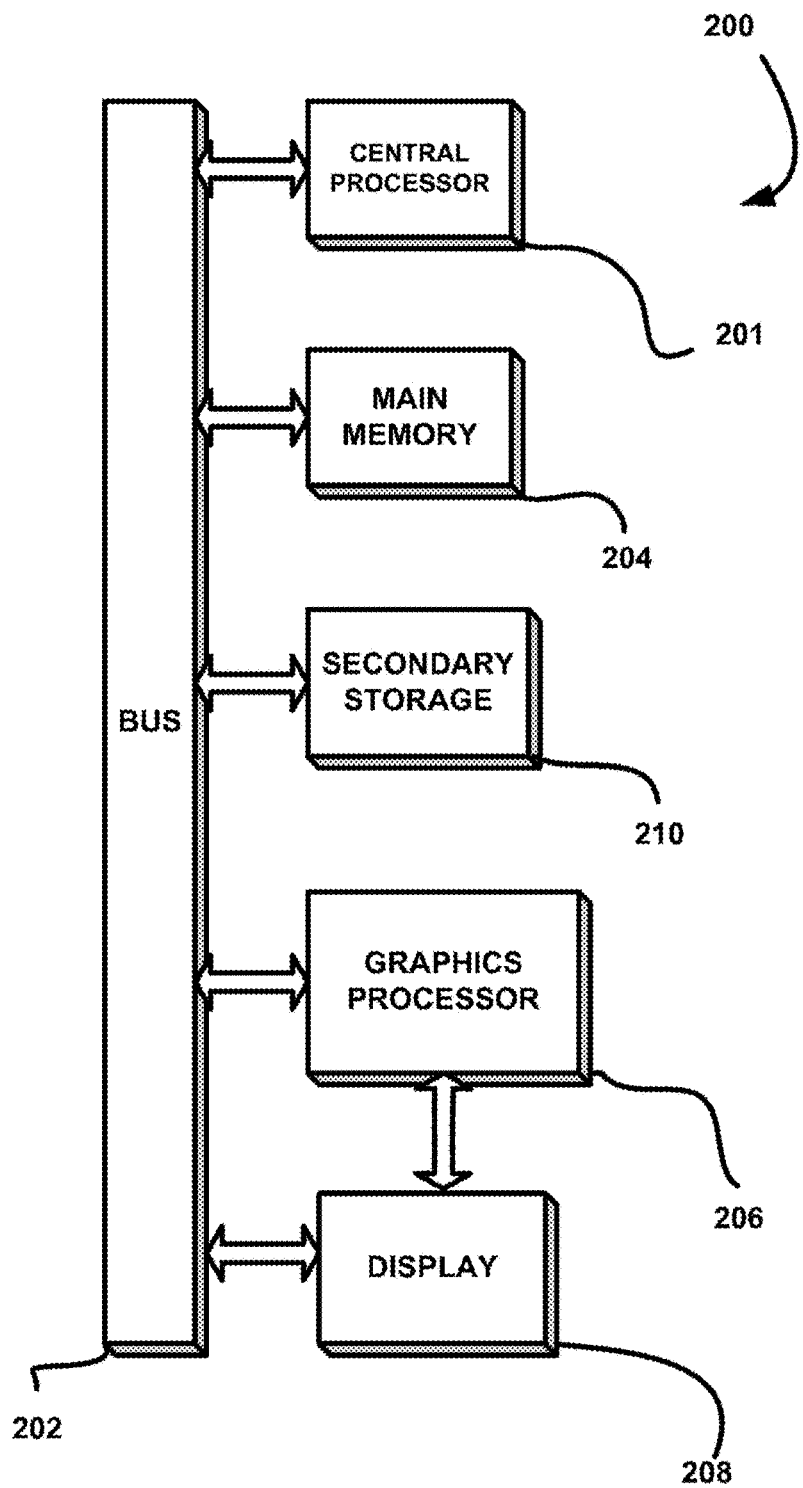
FIG. 2 illustrates an exemplary system in which the various architecture and/or functionality of the previous embodiment and/or subsequent embodiments may be implemented.

FIG. 2 illustrates an exemplary system 200 in which the various architecture and/or functionality of the previous embodiment and/or subsequent embodiments may be implemented. As shown, a system 200 is provided including at least one host processor 201 which is connected to a communication bus 202. The system 200 also includes a main memory 204. Control logic (software) and data are stored in the main memory 204 which may take the form of random access memory (RAM).

The system 200 also includes a graphics processor 206 and a display 208, i.e. a computer monitor. In one embodiment, the graphics processor 206 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 200 may also include a secondary storage 210. The secondary storage 210 includes, for example, at least one of a non-volatile memory (e.g. flash memory, magnetoresistive memory, ferroelectric memory, etc.), a hard disk drive, and a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions. The main memory 204, the secondary storage 210 and/or any other storage are possible examples of computer-readable media.

In one embodiment, the architecture and/or functionality of the various previous figures may be implemented in the context of the host processor 201, graphics processor 206, an integrated circuit (not shown) that is capable of at least a portion of the capabilities of both the host processor 201 and the graphics processor 206, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 200 may take the form of a desktop computer, a laptop computer, a server computer, and/or any other type of logic. Still yet, the system 200 may take the form of various other devices including, but not limited to, a personal digital assistant (PDA) device, a mobile phone device, a tablet device, a television, etc.

Further, while not shown, the system 200 may be coupled to a network [e.g. a telecommunications network, local area network (LAN), wireless network, wide area network (WAN) such as the Internet, peer-to-peer network, cable network, etc.] for communication purposes.

Of course, the various embodiments set forth herein may be implemented utilizing hardware, software, or any desired combination thereof. For that matter, any type of logic may be utilized which is capable of implementing the various functionality set forth herein.

Figure 3:
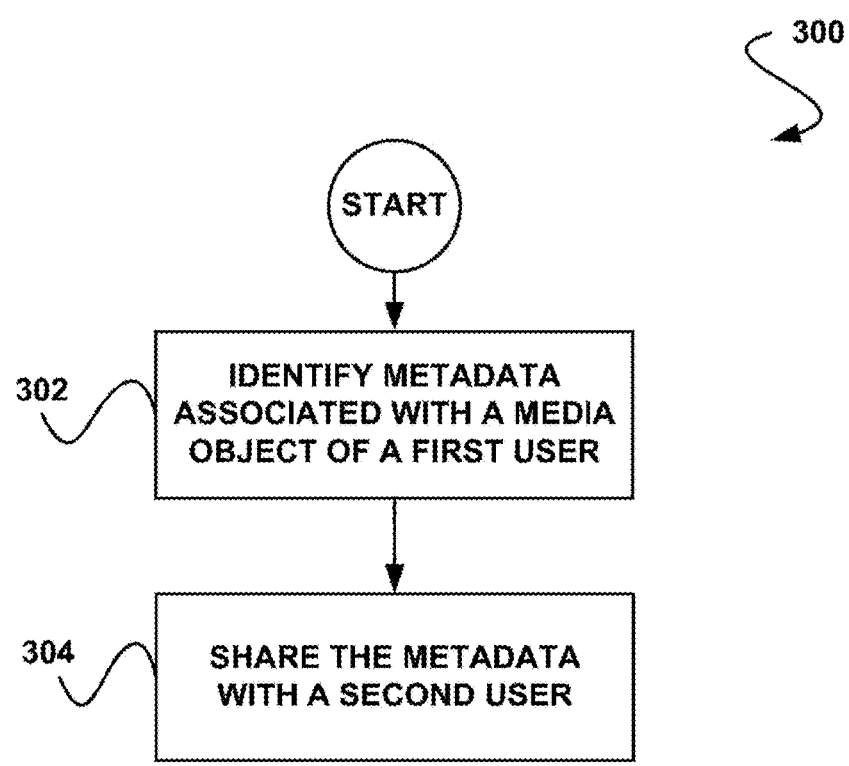
FIG. 3 shows a method for sharing metadata associated with a media object, in accordance with one embodiment.

FIG. 3 shows a method 300 for sharing metadata associated with a media object, in accordance with one embodiment. As an option, the method 300 may be implemented in the context of the architecture and environment of the previous figures and/or any subsequent figures. Of course, however, the method 300 may be carried out in any desired environment.

As shown, metadata associated with a media object of a first user is identified. See operation 302. Furthermore, the metadata is shared with a second user. See operation 304. The media object may include any type of media and/or portion of media. For example, in various embodiments, the media object may include one or more images, videos, applications, audio, text, binary information, and/or data.

Additionally, the metadata may include any data associated with the media object. For example, in one embodiment, the metadata may include at least one filter or a component thereof. In various embodiments, the filter may include one or more filters for filtering media objects or components thereof, and/or filter information for performing filtering functions associated with media objects. In one embodiment, a filter associated with an image may be created by selecting one or more faces in an image. Additionally, in one embodiment, the filter may include metadata associated with the image, such as a group association, a time associated with the image, a location associated with the image, people associated with the image, a quality of the image, a rating associated with the image, and/or various other information.

In one embodiment, the filter may be shared with a group of users and the media associated with this filter may be viewable by the members of the group. Further, in one embodiment, a user may have the option to view a summary associated with a filter before accepting a filter (e.g. from a share invitation, etc.). In various embodiments, the summary may include information associated with identified users, information associated with the identifying user, information associated with ratings, information associated with quality metrics, and/or various other information. Additionally, in one embodiment, the filter may include a blacklist of users that are prohibited from sharing the media object.

In one embodiment, the metadata may include at least one rating. Further, in one embodiment, the rating may include user ratings associated with the media object. In various embodiments, the rating may include a numerical rating, a letter rating, an object rating (e.g. a star rating, a thumbs-up/thumbs-down rating, etc.), and/or various other types of ratings.

In another embodiment, the metadata may include location information. For example, in one embodiment, the metadata may include information associated with a location the media object was created, modified, last accessed, and/or captured, etc. In another embodiment, the metadata may include time information. For example, in one embodiment, the metadata may include information associated with a time the media object was created, modified, last accessed, and/or captured, etc.

In another embodiment, the metadata may include information associated with the originator of the media object. In various embodiments, the originator information may include an originator name, alias, location, contact information, and/or other information. In another embodiment, the metadata may include relationship information. For example, in one embodiment, the relationship information may include relationship information between the first user and the second user, etc. In various embodiments, the relationship information may include information associated with people present in an image.

Further, in one embodiment, the media object may include a picture or video, and the metadata may include a result of a facial recognition learning process. In this case, in one embodiment, the metadata may include a person name and/or alias. In another embodiment, the metadata may include physical description data associated a person. In various embodiments, the physical description data may include hair color, eye color, skin color, facial feature attributes, body type, height, weight, distinguishing features, gender, and/or any other physical description data.

Additionally, in one embodiment, the facial recognition learning process may be capable of being carried out by the first user in connection with a plurality of the media objects utilizing a single interface. For example, in one embodiment, a single interface may be capable of implementing a facial recognition learning process on multiple images (e.g. multiple individual images, a video including multiple images, etc.).

In one embodiment, the facial recognition learning process may be capable of being carried out by the first user in response to the media object being created by the first user utilizing a camera (e.g. in response to an image and/or video being captured by the camera, etc.). In another embodiment, the facial recognition learning process may be capable of being carried out by the first user in response to compositing of one or more images. For example, in one embodiment, faces/users may be associated during the compositing of the image before the image is created and/or saved. In this case, in one embodiment, the camera/processor may process raw frames of an image or video to identify faces and/or users associated with those faces prior to saving/creating the image. In other embodiments, the faces/users may be associated in image pre-processing, and/or post-processing, etc.

In another embodiment, the media object may include a music file, and the metadata may include a result of a music rating process. In one embodiment, the metadata may include a song or album title. In another embodiment, the metadata may include an artist name, a rating, a track number, a play time, a file size, and/or any other data associated with the music file.

Further, in one embodiment, the metadata may be shared directly between a first device of the first user and a second device of the second user. The device may include any type of device. In one embodiment, the device may include a mobile device. In various embodiments, the device may include a laptop computer, a tablet computer, a desktop computer, a mobile phone, a media player, a camera, a television, and/or various other devices. In one embodiment, the metadata may be shared between devices of the first user.

In another embodiment, the metadata may be shared between a first device of the first user and a second device of the second user via a service with at least one server. The service may include any type of service. For example, in various embodiments, the service may include a sharing service, a social network service, a photo service, and/or any other type of service. In another embodiment, the metadata may be shared between a first device of the first user and a second device of the second user via a service instance (e.g. a virtualized server instance, etc.).

Additionally, in one embodiment, the metadata (or a portion of the metadata) may be periodically communicated to the at least one server from the first device. Further, in one embodiment, the metadata may be periodically communicated from the at least one server to the second device.

The metadata and/or media object may be transferred and/or received utilizing any suitable technique. For example, in one embodiment, the metadata and/or media object may be transferred and/or received utilizing WiFi technology (e.g. via a router, WiFi Direct, etc.). In another embodiment, the metadata and/or media object may be transferred and/or received utilizing Bluetooth technology. In another embodiment, the metadata and/or media object may be transferred and/or received utilizing a near field communication technology. In another embodiment, the metadata and/or media object may be transferred and/or received over a cellular network. In another embodiment, the metadata may be transferred and/or received over the Internet. In another embodiment, the metadata may be communicated utilizing at least one of a push communication or a pull communication.

Still yet, in one embodiment, at least one person may be identified in the media object. Further, in one embodiment, it may be determined whether the identified at least one person is associated with the second user in accordance with at least one rule. In various embodiments, any number of rules may be associated with one or more users and/or between one or more users.

The rules may include any type of rules. In one embodiment, the rule may indicate that the at least one person is associated with the second user when the at least one person is the second user. In another embodiment, the rule may indicate that the at least one person is associated with the second user when the at least one person has a relationship with the second user. In another embodiment, the rule may indicate that the at least one person is associated with the second user when the at least one person has a relationship with a third user that has a relationship with the second user. Further, in one embodiment, the sharing of the metadata may be conditioned on the determination of whether the identified at least one person is associated with the second user in accordance with at least one rule.

In various embodiments, the metadata and/or the media object may be stored on a user device (e.g. a mobile device, etc.), a local server, a network server, a network cloud, a distributed system, and/or any other system. In one embodiment, the metadata may be stored with the media object. In this case, in one embodiment, the media may be shared with the metadata.

In another embodiment, an identifier may be stored with the media object for identifying the metadata. In various embodiments, the metadata identifier may be unique per media, per share, and/or per user group, etc. Additionally, in one embodiment, the metadata may be shared by sharing the identifier for identifying the metadata. In one embodiment, when requesting metadata, a device may request the metadata via an identifier associated with the metadata, and a service and/or user device may respond with the associated metadata.

In one embodiment, the metadata may be utilized in combination with additional metadata associated with the second user to create aggregate metadata. As an option, the aggregate metadata may be created utilizing a system associated with a service. As another option, the aggregate metadata may be created on a device associated with the first user and/or the second user. As yet another option, the aggregate metadata may be created on a device associated with a third user. In one embodiment, the aggregate metadata may be shared with users (e.g. with the first user, the second user, and/or a third user, etc.). In one embodiment, the metadata used to create the aggregated metadata may be stored utilizing multiple systems in different locations.

Further, in one embodiment, different metadata associated with different media objects of different users may be stored at the at least one server for processing. In this case, in one embodiment, the shared metadata may include processed metadata. Additionally, in one embodiment, the sharing may be conditioned on the processing. For example, in one embodiment, based on the processing result, it may be determined to share one or more media objects with one or more users. In one embodiment, the sharing may be conditioned on the processing and one or more rules. The processing may include any type of processing, such as a prioritization, a correlation, an assessment of the metadata, and/or any other type of processing.

As an option, users may be presented with the ability to specify settings associated with the sharing or metadata, portions of metadata, and/or media objects. In this case, the sharing between users may be conditioned upon the sharing settings associated with the users. For example, in one embodiment, it may be determined whether the first user permits the metadata to be shared. In this case, the sharing may be conditioned on the determination.

Once the metadata is shared, in one embodiment, the metadata may be utilized by the user with whom the metadata was shared. For example, once the metadata is shared with the second user, the second user may be allowed to utilize the metadata in connection with the media object. In various embodiments, the use may include storing the shared metadata, applying the shared metadata to one or more media objects, modifying the shared metadata, merging the shared metadata with other metadata, re-sharing the shared metadata, processing the shared metadata, and/or other uses of the shared metadata. In one embodiment, the second user may be allowed to utilize the metadata in connection with a different media object.

Additionally, in one embodiment, at least one aspect of the metadata may be presented to the second user. In this case, in one embodiment, input in connection with the at least one aspect of the metadata may be capable of being received from the second user. As an option, utilization of the metadata may be conditioned on the input. In various embodiments, the input may include feedback, a rating, providing supplemental data, verifying data, correcting data, and/or providing various other types of input.

For example, in one embodiment, the second user may be allowed to input a rating in association with the metadata. In another embodiment, the second user may be allowed to utilize the metadata for filtering purposes. In another embodiment, the second user may utilize the metadata for further sharing purposes. In another embodiment, at least a portion of the at least one input may be stored in association with the metadata.

Further, in one embodiment, a query may be received from the second user, and a response including a plurality of the media objects may be sent based on the query. In various embodiments, the query may identify at least one of a location, a time, and/or a person's name or alias for use in association with facial recognition. In another embodiment, a query may be received from the second user, and a response including particular metadata may be sent based on the query.

Still yet, in one embodiment, the metadata may be shared with a group of users. In one embodiment, the group of users may include an ad-hoc group. Additionally, in one embodiment, the group of users may be formed based on at least one of a time, a location, or a facial recognition. In another embodiment, the group of users may be formed based on a set of recognitions. For example, in one embodiment, the group may be formed based on identifying faces of a first person, a second person, and a third person.

In another embodiment, members of the group may be capable of being restricted. For example, in various embodiments, members of the group may be restricted from modifying metadata (or portions thereof), adding metadata, viewing metadata (or portions thereof), viewing media objects (or certain media objects), and/or may be restricted in a variety of other ways.

In one embodiment, potential new members of the group may be capable of being identified based on the metadata or a lack thereof. For example, in one embodiment, a person in an image may be identified by the metadata and may further be identified as a potential new member of the group. Moreover, in one embodiment, users of the group may create, edit, and/or add to the metadata and share the edited metadata with the other users in the group. In this way, work performed by one user of the group may reduce the work needed to be performed by another user in the group. For example, in one embodiment, a total workload in connection with creating the metadata may be reduced by sharing results of an individual workload of the first user and the second user Furthermore, in one embodiment, the metadata may be utilized to advertise to a user or the group of users. For example, in one embodiment, the metadata may be used to determine targeted advertisements to display and/or present to a user or group of users (e.g. on mobile devices associated with the users, etc.).

More illustrative information will now be set forth regarding various optional architectures and features with which the foregoing techniques discussed in the context of any of the present or previous figure(s) may or may not be implemented, per the desires of the user. For instance, various optional examples and/or options associated with the identifying of metadata of operation 302, the sharing of metadata of operation 304, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 4:
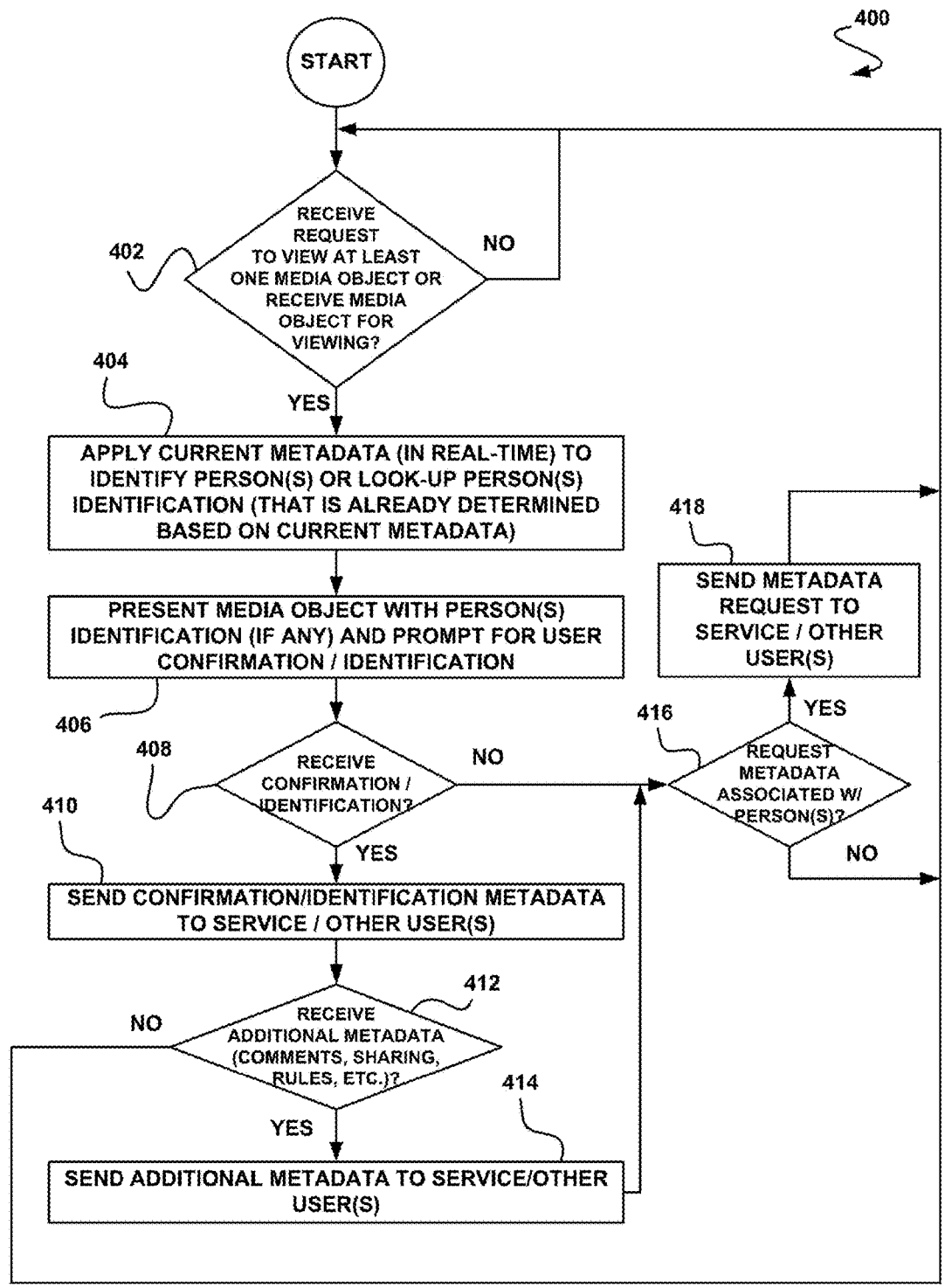
FIG. 4 shows a method for sharing metadata associated with a media object, in accordance with another embodiment.

FIG. 4 shows a method 400 for sharing metadata associated with a media object, in accordance with one embodiment. As an option, the method 400 may be implemented in the context of the architecture and environment of the previous Figures or any subsequent Figure(s). Of course, however, the method 400 may be carried out in any desired environment. It should also be noted that the aforementioned definitions may apply during the present description.

As shown, it is determined whether a request to view at least one media object is received, or whether a media object is received for viewing. See decision 402. In one embodiment, the request and/or the media object may be received at a user device (e.g. a mobile phone, a tablet computer, a desktop computer, a television, a media device, a camera, etc.). In another embodiment, the request and/or the media object may be received at a system associated with a service (e.g. a social network service, a sharing service, etc.) and may be sent to a user device.

If a request to view a media object is received, or a media object is received for viewing, current metadata is applied to identify at least one person associated with the media object, or a look-up of the identification of the at least one person is performed. See operation 404. In one embodiment, the identification of the at least one person may already be determined based on the current metadata.

Further, the media object that was requested or received is presented to a user with the identification of the at least one person, and the user is prompted for a confirmation and/or an identification if one or more people were not identified. See operation 406. It is then determined whether a confirmation and/or an identification is received. See decision 408. In one embodiment, an identification correction may be received. For example, in one embodiment, a person associated with the media object may be identified incorrectly and the user may provide a correct identification.

If a confirmation and/or identification is received, confirmation and/or identification metadata is sent to the service and/or one or more users. See operation 410. Additionally, it is determined whether additional metadata is received. See decision 412. The additional metadata may include any type of additional data, such as comments, sharing information, rating information, rules, alias information, and/or various other data.

If it is determined that additional metadata is received, the additional metadata is sent to the service and/or the one or more users. See operation 414. Further, it is determined whether to request metadata associated with the at least one person associated with the media object. See decision 416. If it is determined to request metadata associated with the at least one person associated with the media object, a metadata request is sent to the service and/or the one or more users. See operation 418.

Figure 5:
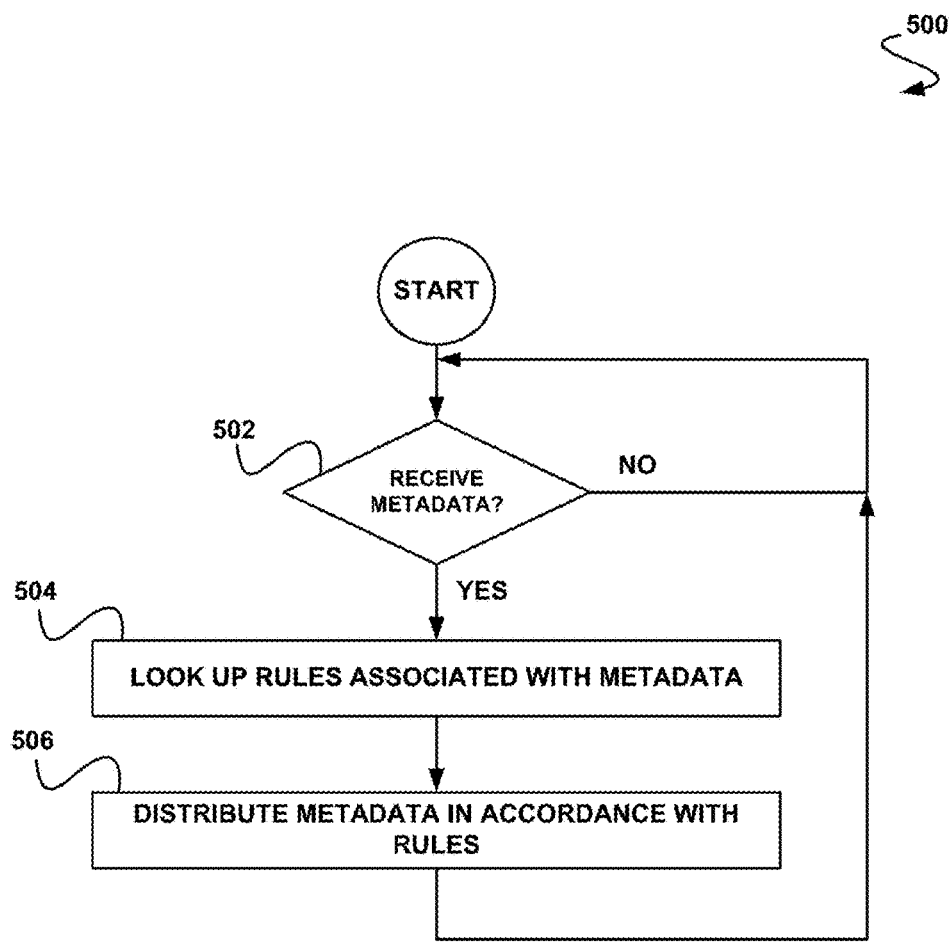
FIG. 5 shows a method for sharing metadata associated with a media object, in accordance with another embodiment.

FIG. 5 shows a method 500 for sharing metadata associated with a media object, in accordance with one embodiment. As an option, the method 500 may be implemented in the context of the architecture and environment of the previous Figures or any subsequent Figure(s). Of course, however, the method 500 may be carried out in any desired environment. It should also be noted that the aforementioned definitions may apply during the present description.

As shown, it is determined whether metadata associated with a media object is received. See decision 502. In one embodiment, a server may determine whether the metadata is received. In this case, in one embodiment, the server may be associated with a service. In various embodiments, the service may include a social network service, a sharing service, a service associated with media, and/or any other type of service. In another embodiment, the metadata may be received by a user device (e.g. a mobile device, etc.).

If it is determined that metadata is received, a look-up operation is performed for rules associated with the metadata. See operation 504. In one embodiment, the service system may perform the look-up operation. In another embodiment, a user device may perform the look-up operation.

Further, metadata is distributed in accordance with the rules. See operation 506. In one embodiment, the service system may distribute the metadata in accordance with the rules. In another embodiment, the user device may distribute the metadata in accordance with the rules.

The rules associated with the metadata may include any type of rules. For example, in one embodiment, the rules may define the users with whom the metadata may be shared. In another embodiment, the rules may define what actions users may perform with the metadata. For example, in one embodiment, the rules may define read and/or write and/or editing privileges associated with the metadata (and/or the media object). In another embodiment, the rules may define with whom the metadata may be further shared.

The media object may include any type of media, including audio media, video media, image media, applications, and/or various other media objects. In the case the media object includes at least one image (e.g. one or more photos, video, etc.), in one embodiment, metadata associated with facial data of one or more recognized users may be shared with other users. In this way, in one embodiment, the metadata may be permitted to be shared such that a recipient user may utilize the metadata to train a facial recognition process (and/or algorithm, etc.) for a particular face.

In one embodiment, once identified via the facial recognition algorithm, each face in an image may be identified and that identifier of the face may be associated with the media, and may be stored in conjunction with the media (or stored in the media, etc.). In various embodiments, the metadata may be associated with the media, and/or associated with an identifier that is included in/with the media, etc. In this way, in one embodiment, the redundant work of identifying or training facial recognition metadata may be reduced by sharing training data with other users.

As an example, USER A may identify FACE B in a collection of media (e.g. a collection of images, etc.). As more faces matching FACE B are identified in the media, the metadata describing FACE B may be improved. USER A may share the FACE B metadata with USER C and the FACE B metadata may be incorporated into USER C's metadata for FACE B. In various embodiments, the shared metadata may augment, replace, improve, and/or refine, etc., the metadata set utilized to identify FACE B.

In one embodiment, the metadata may be shared explicitly. For example, in one embodiment, metadata itself may be shared between a first user and a second user (e.g. by selecting a share metadata option, etc.). Also, in one embodiment, the metadata (or an identifier associated with the metadata, etc.) may be embedded in media data (e.g. photo data, in exif, other image metadata, etc.). In the case of the previous exemplary implementation, the embedded metadata may include the best matching metadata for identifying FACE B.

In one embodiment, the metadata may include metadata for the shared media, etc. Additionally, in one embodiment, if multiple faces are identified in the shared media, the metadata may include at least one best, instance, and/or aggregate metadata for identifying at least one face in the media. Further, in one embodiment, each metadata may be tagged with a name associated with a user, identifier associated with a user, and/or other information associated with a user, in order to correlate, locate, find, search, and/or categorize all media associated with that user.

In the case that the metadata is large, in one embodiment, only metadata associated with faces that are common may be shared (e.g. based on a search set, social data, etc.). For example, in one embodiment, metadata may be included/associated with/referenced for each face/user. In this case, in various embodiments, all metadata may be sent, partial metadata may be sent, and/or metadata may be sent based on relationships, and/or rules, etc. In one embodiment, a service may share metadata IDs and a user device may request associated metadata if requested and/or based on rules, etc.

Additionally, in one embodiment, media associated with a first user may be aggregated with media associated with at least one other user. In this case, in one embodiment, the aggregate contribution for each user may include a subset of media associated with a media object (e.g. at least one photo from each user, etc.).

In one embodiment, the metadata may include particular facets of facial recognition training data. For example, in various embodiments, the metadata may include data associated with a Face Mesh, a geometry of data points, proportions of data points, color of a face and/or hair and/or eyes, skin features, and/or other identifying features, etc. In various embodiments, the data points may include at least one of a location of each eye, a nose location, a mouth location, and/or eye brow locations, etc.

Further, in one embodiment, any feature of a face may be utilized to form a relative, absolute, average, and/or best mesh that represents a face of a particular user. Additionally, in another embodiment, factors other than hair color may be utilized for facial/user recognition (since hair color may change), such as eye brow color (since less likely to change), feature geometry, eye color, skin color/shade, etc.

In one embodiment, multiple similar media objects (e.g. two pictures of the same time instance, location, face, etc.) may be correlated and the best of the media may be selected. For example, a first media object (e.g. an image, etc.) including faces 1, 2, and 3, which was captured at or around time T1, may be determined to be better quality than a second media object including faces 1, 2, and 3, which was captured at or around T1. In one embodiment, utilizing a shared collection of media (or a personal collection of media, etc.), less optimal media may be hidden when 2N+ similar media exists of the same faces, time, and/or location, etc.

In one embodiment, a user may receive points, or other performance indicators, for making valuable contributions to a group of users. For example, in one embodiment, image qualities such as composition, clarity, color, lighting, etc., may be rated and the originating user may receive points, or other performance indicators, for such qualities. In another embodiment, image qualities may be rated and the image may be automatically attributed a quality rating and/or may be ranked, based on the quality. In another embodiment, user ratings may be utilized to rate photo quality (and/or any media object quality, etc.).

In one embodiment, more recent metadata may be rated higher than older metadata associated with a media object. For example, in some cases, metadata associated with facial recognition from 5-10 years in the past may be rated lower (or may be given less weight, etc.) than metadata associated with facial recognition from the past year.

In another embodiment, older metadata may be rated higher than recent metadata associated with a media object. For example, in some cases, metadata associated with facial recognition from 5-10 years in the past may be relevant to a particular data set, and thus be rated higher (or may be given more weight, etc.) than metadata associated with facial recognition from the past year.

As another example, metadata associated with facial recognition data may be grouped by a particular time interval. In this case, this particular metadata may be rated higher (or given a higher weight) when applied to photos in/around that time interval. Thus, in one embodiment, there may be an overall/recent metadata aggregate and individual time interval based metadata to allow for identifying faces in older media.

Further, in one embodiment, a user that rates a media object and/or metadata associated with the media object may be rated. For example, the rating user may be rated or graded based on the judgment. In one embodiment, the rating of a user may be specific to another user.

For example, a first user may like the opinion/judgment of a second user and thus rate the second user high. However, the first user may not like the opinion/judgment of a third user and, in turn, rate the third user low. On the other hand, a fourth user may like the opinion/judgment of the third user and, in turn, rate the user high. Thus, in one embodiment, the rating between the first user and the third user may be different than the rating between the fourth user and the third user. In one embodiment, the overall user rating of the third user may be an average of all ratings associated with the third user. In another embodiment, there may not be an overall rating of the third user.

In another embodiment, a rating associated with a user may be different for different types of media objects. For example, the first user may associate a low rating with the third user for images (or metadata associated therewith), but a high rating for the third user for music. In another embodiment, a user may have a group rating. For example, in one embodiment, a first group of users may associate a low overall rating with the third user for images (or metadata associated therewith), and a second group of users may associate a high overall rating with the third user for images (or metadata associated therewith).

Further, in one embodiment, a person may be rated higher by others based on facial recognition data training, so that one may automatically or manually adopt the rating/training of their trusted person over another. As an example, a certain set of users may be more interested in a particular rating aspect and may be determined to have a better trust for rating others. In this case, another set (e.g. which may or may not include overlap in the raters, etc.) of users may be interested in the training and may gain trust via the volume/accuracy of ratings (e.g. as rated by peers/service, etc.).

Additionally, in one embodiment, media and/or metadata may be aggregated in a service (e.g. a cloud service, a centralized service, a decentralized service, a local service, etc.). In this case, in one embodiment, the service may merge the metadata. In the case that the metadata is associated with one or more images, in one embodiment, the service may merge the metadata and identify each face in the media. Further, in one embodiment, the service may communicate updated metadata to all associated users of the aggregate set. In one embodiment, the service may push the updated metadata. In another embodiment, a user device may pull the updated metadata. In this way, current/updated face metadata may be communicated back to the users.

In one embodiment, the service may suggest metadata to users. For example, a social network service may review pictures associated with one or more first users (e.g. which are posted on the social network site, uploaded to the social network site, etc.) and determine that the first users include metadata (e.g. facial recognition filters, etc.) worth recommending to one or more second users. In various embodiments, the metadata recommendations may be based on relationships, privacy settings, and/or rules. In one embodiment, the recommended metadata may be accepted by the user and may be utilized to automatically train a media object process for the user (e.g. a facial recognition process, a music suggestion process, etc.).

Further, in one embodiment, groups of users may be formed based on date, time, location, and/or metadata (e.g. metadata associated with faces, etc.). In one embodiment, ad hoc temporary groups may be generated for an event. In this case, in one embodiment, a face in a photograph taken at an event may be analyzed (e.g. utilizing current metadata, etc.) such that each identifiable face in the photograph is identified and an ad hoc temporary group may be generated for an event. In this case, media associated with the event (e.g. photographs, videos, etc.) may be associated with group (e.g. utilizing metadata, etc.). In one embodiment, users may be permitted access to the media based on being a part of the ad hoc group.

In one embodiment, permissions may be granted based on metadata. Additionally, in one embodiment, other users may be invited by a member of the ad hoc group. As an option, invited members may have a restricted set of permissions. In various embodiments, the permissions may include permissions associated with editing, voting, commenting, viewing, uploading, contributing, sharing, and/or the performance of various other actions associated with the media objects or metadata associated with the ad hoc group.

In one embodiment, if a user associated with an identified face is determined to not be included in a group, the user may be invited. In various embodiments, the invite may be based on a threshold, an automatic and/or a manual invitation, a prior relationship with users of the group, and/or various other criteria. In one embodiment, a user may be invited based on historical associations of the non-invited user with a given set of users that are a part of the group.

Still yet, in one embodiment, a group aggregate of media for an event may be rated, commented, and/or shared, etc. For example, each user of group may export the media to a tangible representation of media (e.g. a collage album, individual pictures, a digital album, etc.).

In one embodiment, users may select to automatically share media and/or metadata associated therewith, and/or indicate which media to share or exclude. Further, in one embodiment, users may be given an option to blacklist certain (or all) users, and/or restrict sharing to other users, etc. For example, in one embodiment, a first user may blacklist a second user if the first user determines that metadata (e.g. filters, etc.) associated with the second user are undesirable. In one embodiment, the blacklists may be shared between users.

Any criteria and/or aspect of the metadata or media may be utilized when determining how a media object (e.g. a photo, etc.) is shared. For example, if a first user, a second user, and a third user have previously been identified in a first media object (e.g. an image, a video, etc.), and the first user and the second user are identified in a second media object, the second media object may be shared with third user based on the identification in the first media object.

Additionally, in one embodiment, the originating user may be given options to confirm sharing for each identified user, and/or related user, etc. Table 1 shows exemplary sharing preferences associated with an originating user, in accordance with one embodiment.

TABLE 1

| USER | SHARE ALL | SHARE INCLUDED | SHARE RELATED |
|------|-----------|----------------|---------------|
| 1 | YES | YES | YES |
| 2 | NO | YES | YES |
| 3 | NO | YES | NO |

With reference to Table 1, as an example, User 1 may be a spouse of the originating user. In this case, the originating user has elected to share all photos, photos including User 1, and photos including media determined to be related to User 1. Additionally, User 2 may be a friend of the originating user. In this case, the originating user is sharing only photos where User 2 is included, and photos where the media is determined to be related to User 2. Further, User 3 may be an acquaintance of the originating user. In this case, the originating user is only sharing media where User 3 is included in the media.

In one embodiment, filters associated with metadata may only be used when authorized (e.g. utilizing a key, etc.). In another embodiment, filters associated with metadata may only be used when authorized and may only be usable with respect to a certain application (e.g. the filter cannot be used by all Internet users, etc.). In various embodiments, usage based restrictions may be implemented utilizing share/private keys, passwords, key encryption/authorization, etc., of an application and/or service.

In one embodiment, references may be set to automatically share metadata and/or media in a media application (e.g. a camera application, a photo application, a media application, a music application, a video application, a sharing application, etc.). For example, in one embodiment, an application associated with a camera may automatically upload new media. In one embodiment, a user device (e.g. a camera, a mobile phone, etc.) may use existing training metadata to identify subjects of media, and push/transmit identified face metadata to one or more media taking applications for inclusion in and/or in association with the media.

In one embodiment, the service may also alert users if a face appears in a media object the preferences are set to share. For example, users included in a piece of media may be determined automatically (or with manual intervention) and the media may be shared with those users. In various embodiments, media may be directly shared with each user, shared in a central location, and/or shared from a device of an originating user, etc.

In various embodiments, the sharing of metadata and/or media may be persistent or may be transient. For example, a user may share an image with another user and, after the other user views the image, the image may be removed from a viewing location (or viewing permissions may expire, change, etc.). In another embodiment, a user may be prohibited from viewing the image after a period of time, at request of user, or after a certain number of accesses, etc. Of course, in various embodiments, the transient nature of the metadata and/or media may apply to all type of media objects (e.g. with respect to audio, applications, etc.).

In one embodiment, the filters associated with the metadata may identify people "on the fly" such that immediately after an image is captured, people in the image may be identified, and the IDs associated with those people may be displayed on the picture. In one embodiment, a viewer of the image may be given the option to confirm people, and/or add an ID (at the time of picture, etc.), etc.

In one embodiment, voice recognition may also be utilized. For example, a user may say a name of who is being captured in the image, at or around the time or image capture. In one embodiment, the stated name may be utilized to train the metadata. Further, in one embodiment, live frames may be processed to identify faces/people prior to the picture being captured (e.g. during compositing, etc.). In this way, a picture stream (e.g. video frames, etc.) may be processed.

In one embodiment, a shared timeline may be presented to a user that includes media associated with faces, if currently identified media is present. For example, User A, User B, and User C may automatically join a group and old events that are associated with media of User A, User B, and User C (or at least one user, etc.) may be available for viewing. As another example, User A may share User B media from a past event associated with those users.

Additionally, users may share other metadata associated with media to other users. For example, a user may share ratings associated with a song, video, and/or application with another user. In one embodiment, the other user may incorporate those ratings into the other user's media ratings. In various embodiments, the new metadata may replace existing metadata, not replace existing metadata, and/or be incorporated with existing metadata (e.g. utilizing an averaging algorithm, etc), etc.

In various embodiments, the metadata may include any type of user data and/or preference. Further, in one embodiment, the similarity of the sharing user may be utilized when incorporating their shared metadata. For example, if the first user has a strong similarity to the second user, then their ratings may be incorporated without modification to the ratings (not necessarily without modification to data for incorporation purposes, etc.). However, if the first user does not have a strong similarity to the second user (e.g. the first user likes Genre_A more than the second user, etc.), then the shared metadata may be filtered, normalized, raised, lowered, changed, modified, etc., before incorporation.

In one embodiment, the user that is incorporating the ratings may be allowed to review each rating change (e.g. incorporating rating metadata will raise song X from 3 stars to 4.5 stars, etc.). Additionally, in one embodiment, the user incorporating the metadata may approve per group of media, subgroup, all media, etc. For example, a user may elect to approve incorporated ratings for each album, each song, all media, once, never, automatically, and/or manually, etc.

As another example, user application metadata may be shared with other users. For example, if a user installs and/or uses an application, the application may be suggested, installed, recommended, and/or shared, etc., with at least one other user. Further, in one embodiment, if a user uses an application, the interactions associated with that application may be utilized to generate metadata associated with the application. In various embodiments, the metadata may describe each use of an application, such as (but not limited to) application name, genre, cost, rating, number of uses, location(s) of each use, date/time of each use, duration of each use, achievements, rank, accomplishments, and/or goals, etc. Of course, in various embodiments, any aspect of the application may be utilized in creating the metadata describing the application.

In one embodiment, application metadata may be utilized to recommend the application to other users. As an option, these users may be associated with each other. For example, one user may invite another user to be a part of the application group. As another option, a user may invite another user to be part of a general group that shares all/selected metadata.

For example, a first user may invite a second user to share metadata. In this case, in one embodiment, each criteria/aspect of the metadata may be allowed or disallowed for sharing between users. For example, the first user may allow for sharing facial metadata associated with media, but the second user may not. As another example, the second user may allow for sharing of application location usage with the first user.

The metadata and the media may be shared in variety of ways. For example, a first user may share with at least one other user. In this case, in various embodiments, the media associated with the first user may be transmitted to another user, sent to a third party (e.g. a cloud service, at least one server, at least one service) for sharing with the other users, communicated directly to the user (e.g. via local sharing, direct connect, WiFi, NFC, Bluetooth, or other wireless technology, etc.), communicated via a storage media (e.g. memory, a disk, flash memory, a drive, etc.), and/or utilizing any other suitable technique.

In one embodiment, if two users are associated with each other for sharing media, the first user media may be automatically transmitted to the second user. For example, transmitting to the second user may include the second user's device(s) downloading the media, and/or the media being linked to/with another user, etc. For example, a first user may take a picture. Further, a second user may be identified as being associated with the picture, and the media (and/or metadata associated therewith) may be transmitted from the first user to the second user (e.g. directly or indirectly, etc.). For example, a service may receive the media and/or the metadata from the first user and transmit the media and/or the metadata to the second user. Further, the second user may then view, save, and/or share the media and/or the metadata utilizing a device associated with the second user. In one embodiment, an identifier of the shared media may be sent to the second user instead of the media itself (e.g. a link, resource identifier, etc.).

Additionally, in one embodiment, the metadata and/or the media may have a standard format, such that media and/or metadata may be shared between users, without the need for changing the format. In another embodiment, adapters may be available such that media and/or metadata of a first format may be shared with another device requiring the media and/or metadata to be of a second format. In this case, the device that requires the media and/or the metadata to be of the second format may request (or have) an adapter that transforms the media and/or metadata of the first format to the second format. In one embodiment, the adaptor may be transferred with the media and/or metadata. Additionally, in one embodiment, the metadata may include the adaptor.

Further, in one embodiment, the first user may be allowed to set permissions associated with the shared media. For example, the first user may be allowed to set permissions such that one or more other users are not able to share the media. As another example, the first user may be allowed to set expiration times associated with the media (e.g. a global expiration time, user specific expiration times, etc.). As another example, the first user may be allowed to set a number of allowed views for the media (e.g. a global number, a total number, a number for specific users, etc.). As another example, the first user may be allowed to set permissions associated with print options. Of course, in various embodiments, the first user may have the ability to set any type of permission associate the media and/or the metadata.

In one embodiment, a first user may cause media (and/or metadata associated therewith) to be encrypted such that other users may be allowed to view the media as long as an encryption key/certification is not revoked. Further, in one embodiment, if the originating user removes, disables, and/or revokes, etc., the decryption key, then the media will not be viewable to other users.

In one embodiment, a service may serve as a keystore, and a user device may check the keystore for key revocation (e.g. before each view, once per session, set intervals, after a specific number of accesses, etc.). In another embodiment, keys may be cached locally. In one embodiment, an application on the device (or service, etc.) that is utilized to the view the media may check for key/cert revocations prior to allowing viewing (e.g. by checking the key/cert itself, via local/remote key/cert service, etc.).

Still yet, in on embodiment, users may be able to select applications to use in association with their devices via an application selection interface. In one embodiment, the application selection interface may provide a filterable set of criteria that allows the user to show applications that match selected (or defined) criteria. In various embodiments, the applications may be presented in any style view including a grid view, a list view, an icon view, an image view, a preview view, and/or a detail view, etc.

Additionally, in various embodiments, the user may select/specify criteria such as name, author, type of application, description, category, language, genre, device type, rating, size, number of uses, duration of uses, last used, restrictions, version, last updated, date purchased, date shared, shared from user, shared to user, date shared, expiration date, remaining uses, and/or remaining shares, etc. In one embodiment, the user may be able to request a search/listing of similar applications (and/or characteristics associated with the applications, etc.) for each application in the list.

For example, a user may like Application_A and click a "Similar" button to receive a listing of additional applications deemed similar to Application_A. Similar applications may be found utilizing criteria associated with Application_A, as well as other criteria (e.g. search for applications with an average of 4 stars, 40+ uses, used more than 4 hours, type equals game, genre equals adventure, etc.). In one embodiment, a first user may search metadata associated with another user for the criteria. For example, the first user may be friends with a second user, and the first user may search a service for applications (e.g. games, etc.) that the second user has installed, ranked highly, and/or has played for a minimum number of hours, etc.

Further in one embodiment, a user of an application may indicate that an application is sharable. In one embodiment, an author of an application may indicate the application is allowed to be shared. In various embodiments, the author may set a limit to a total number of shares allowed overall, a limit to a total number of shares allowed per user, a limit to a number of uses per share, and/or a limit to a usage time per share, etc.

In one embodiment, the user may be allowed to share an application with another user. Additionally, in one embodiment, a service may automatically share an application with another user based on similar metadata for application type, genre, rating, uses, and/or any other criteria. In another embodiment, applications may be shared based on a location/proximity of two associated users. For example, in one embodiment, if users are within a predefined distance from one another (e.g. and other sharing criteria is met, etc.), the applications may be shared. In another embodiment, if the users are at the same location (e.g. a business, a city, a defined location, etc.), the applications may be shared. In another embodiment, if users are within a predefined distance from a location (e.g. and other sharing criteria is met, etc.), the applications may be shared.

In one embodiment, each user may be able to share the application a predetermined number of times. Further, in one embodiment, each share may be associated with a predetermined number of uses. In one embodiment, the user with whom the application was shared may be presented with an option to purchase the shared application. In various embodiments, the user may be offered the option to purchase more uses of the application and/or purchase more time to utilize the application, etc.

In one embodiment, if the application is purchased, the user who shared the application may receive a benefit. For example, in various embodiments, the user who shared the application may be refunded a share (e.g. the user may be credited the opportunity to share the application one more time, etc.), given extra shares, and/or given a portion of a sale price/profit, etc.

As an example, User_A with Application_B may meet User_C, who does not have Application_B. In this case, User_A may have used Application_B a certain number of times and may have rated the application positively. Based on location, uses, and/or rating, etc., a device associated with User_C may indicate to User_C that User_A likes Application_B and User_C may be invited to receive a shared version of Application_B for a trial. User_C may, in turn, accept the invitation and may be able to initiate a demo/trial of application. In one embodiment, after a predefined number of uses/time/etc., Application_B may be removed/disabled/limited on the device of User_C. In one embodiment, prior to and/or after Application_B being removed/disabled/limited, User_C may be given an option to purchase the application and/or to purchase additional uses of the Application_B. In one embodiment, User_A may have the ability to revoke the application from User_C at any time. In another embodiment, the author of the application may have the ability to prevent sharing, thereby disabling, etc., the application.

As one exemplary data flow, users may send media to a service system. The service system may process the media and send back metadata to the users. In the case that the media included images, the metadata may include identified faces and data describing faces. The data describing the faces may include data utilized to identify faces in the media. Additionally, in various embodiments, the data may include data specific to that media, data associated with at least one face, and/or aggregate data for a plurality of instances of a particular face, etc. Further, in one embodiment, users may have the option to accept or decline the identified faces, and this information is sent back to the service system to help improve detection. In this way, both the service system and the users may have a detailed set of metadata for each face. Furthermore, in this way, a face may be capable of being detected at a client device (e.g. a user device, etc.) or at a server (e.g. a server associated with the service system, etc.). In one embodiment, if a client device has additional identification metadata not present at the service system, the metadata may be communicated to the service system for improving server face detection criteria.

In one embodiment, if one user identifies a face and sends that additional metadata to the service system, the service system may send updated metadata to another user that is associated with the additional face metadata. In this way, the work of one user may be communicated to the service system and other users may avoid performing duplicate identification work.

The metadata may be communicated via a service or directly to the user. In one embodiment, the metadata may be embedded in the media and by virtue of sharing the media, the other user may received improved metadata for the faces detected in the media. In various embodiments, the metadata may be embedded in the media, or separate from the media. Additionally, in one embodiment, the metadata may include an identifier of the metadata utilized to identify a face.

In one embodiment, metadata may be merged, incorporated, etc., from one user to another. Additionally, the metadata may not be limited to faces but to other identifying criteria (e.g. height, body geometry, color, identifying marks and/or features, etc.).

In various embodiments, any media may be shared and any metadata associated with the media may be shared. For example, users may share metadata associated with media or the media itself. In one embodiment, a user may share an application with another user as a limited use application. In another embodiment, along with the application, metadata from the sharing user (e.g. rating, comment, uses, price paid, etc.) may be included along with the application. Further, in one embodiment, metadata may be displayed to the user that received a shared application. As another example, a user name and associated information may be displayed for a face identified in a photograph.

It should be noted that, in other embodiments, additional training techniques may be used to further reduce the work of identifying or training facial recognition metadata. For example, in one embodiment, various information may be collected in association with various actions users take in connection with photos, and such information may be utilized to support the aforementioned training, without necessarily requiring any/additional formal training exercises by the user. For instance, the originator, destination, copy addressees, etc. may be identified in connection with shared photos. Further, this information may be used as an additional factor in ascertaining an identity of faces in such photos. In the present example, it may be assumed that there is a higher likelihood that photos (of people) being shared between parties are more likely to include faces of such parties. Similarly, any metadata, comments, tags, e-mail/text message bodies, etc. that accompany the photos may be analyzed for similar purposes.

Figure 6:
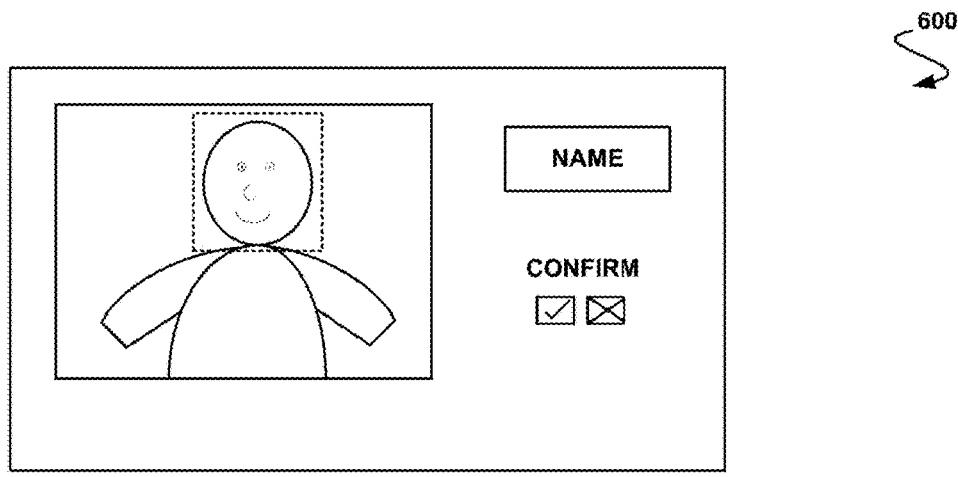
FIG. 6 shows an interface for displaying a face and name identified in a media object, in accordance with another embodiment.

FIG. 6 shows an interface 600 for displaying a face and name identified in a media object, in accordance with one embodiment. As an option, the interface 600 may be implemented in the context of the architecture and environment of the previous Figures or any subsequent Figure(s). Of course, however, the interface 600 may be implemented in the context of any desired environment. It should also be noted that the aforementioned definitions may apply during the present description.

In one embodiment, a face may be automatically detected in a media object (e.g. an image, video, etc.) and a name associated with the face may be displayed utilizing the interface 600. In one embodiment, a user may be allowed (or prompted, etc.) to confirm or decline the name association. In one embodiment, the interface 600 may display the name associated with the face and present the user a button on the interface 600, such that the user may confirm the association.

In another embodiment, the user may be presented with a check box in order to confirm the association. In another embodiment, the user may be presented with an option to decline the association. In another embodiment, the user may be presented with a list of alternative names to associate with the face. In another embodiment, the user may be presented with the option to insert a name to associate with the face.

In one embodiment, the name to associate with the face may be determined utilizing metadata associated with the image. In another embodiment, the image may be processed utilizing a facial recognition algorithm and the name may be determined (e.g. utilizing a lookup, etc.). In another embodiment, the name to associate with the face may be determined utilizing voice data. For example, in one embodiment, a device may receive an utterance when an image is captured (e.g. from the user taking the picture, etc.). In this case, in one embodiment, the utterance may be analyzed and a name to associate with a face in the captured image may be determined.

In another embodiment, the name to associate with the face may be determined utilizing a text message (e.g. an SMS and/or an MMS, etc.). For example, in one embodiment, an image may be received via a text message (or sent via a text message). In this case, in one embodiment, text accompanying the texted image may be analyzed to determine a name to associate with a face in the image.

In another embodiment, the name to associate with the face may be determined utilizing an email. For example, in one embodiment, an image may be received via an email message. In this case, in one embodiment, text accompanying the email may be analyzed to determine a name to associate with a face in the image.

In another embodiment, the name to associate with the face may be communicated with the image. In another embodiment, the name to associated with the image may be explicitly indicated (e.g. as a tag, as a file name, etc.).

In addition, in one embodiment, the interface 600 may be utilized to indicate whether the face is clear and includes a good example for basing the metadata (e.g. for facial recognition, etc.). In one embodiment, the user may be presented with an option to indicate the image includes a high quality face to base the metadata. Further, in various embodiments, the user may have the ability to enter a name, select a name from a list of names, and/or be presented with a suggested list of names in which to choose a name, etc., if the name is not correct.

Figure 7:
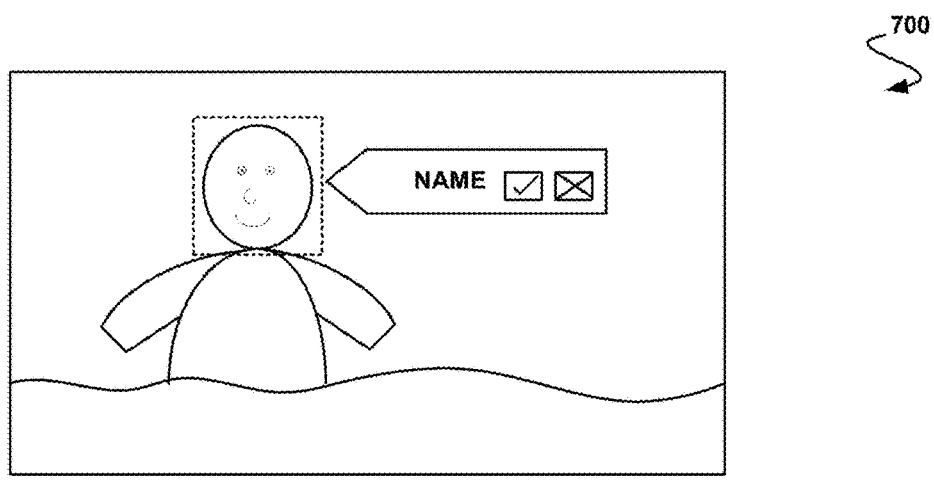
FIG. 7 shows an interface for displaying a face and name identified in a media object, in accordance with another embodiment.

FIG. 7 shows an interface 700 for displaying a face and name identified in a media object, in accordance with another embodiment. As an option, the interface 700 may be implemented in the context of the architecture and environment of the previous Figures or any subsequent Figure(s). Of course, however, the interface 700 may be implemented in the context of any desired environment. It should also be noted that the aforementioned definitions may apply during the present description.

FIG. 7 shows another exemplary interface for displaying a detected face and an associated name. As shown, the associated name may be displayed with confirmation checkboxes, allowing the user to confirm or decline the name association. In one embodiment, the user may be presented with only an option to decline or accept the name association. Further, in another embodiment, the user may have the ability to override the suggested name in the name field. For example, in one embodiment, the user may have the ability to type a name into the name field.

Figure 8:
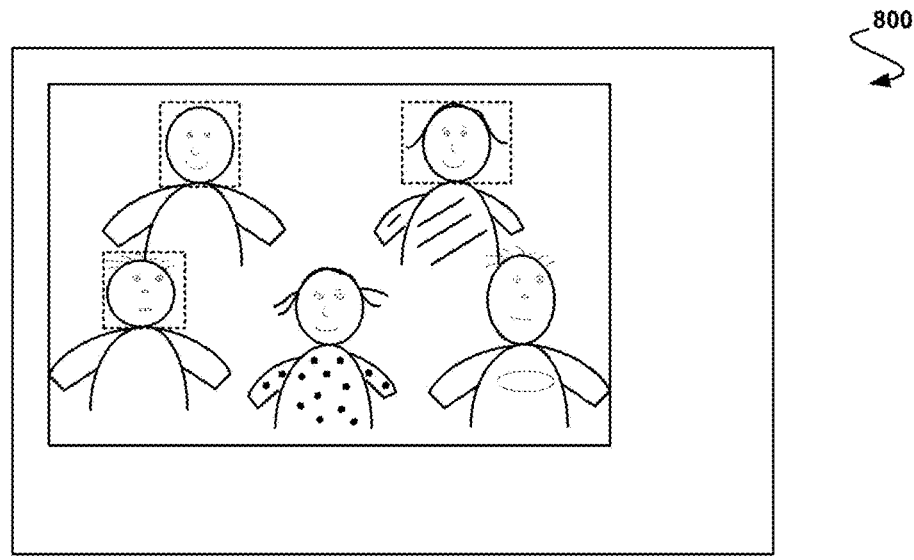
FIG. 8 shows an interface for displaying one or more detected faces in a media object, in accordance with another embodiment.

FIG. 8 shows an interface 800 for displaying one or more detected faces in a media object, in accordance with another embodiment. As an option, the interface 800 may be implemented in the context of the architecture and environment of the previous Figures or any subsequent Figure(s). Of course, however, the interface 800 may be implemented in the context of any desired environment. It should also be noted that the aforementioned definitions may apply during the present description.

As shown, the interface 800 may present a media object with detected faces. In one embodiment, the interface 800 may allow a user to select additional faces in the media. In one embodiment, the interface 800 may display the names of the detected faces (e.g. as in FIGS. 6-7, etc.). Additionally, in one embodiment, the interface 800 may present the user with the option to confirm and/or decline a name association (e.g. as in FIGS. 6-7, etc.).

Furthermore, in one embodiment, the interface 800 may present the user with the opportunity to name undetected faces. In another embodiment, the interface 800 may present suggested names to the user for confirmation, etc. In this case, in one embodiment, suggestions may include at least one potential match.

Further, in one embodiment, the interface 800 may present the user with the opportunity to share the media and/or metadata associated therewith. In one embodiment, the interface 800 may present the user with options to allow and/or deny sharing for each user. In one embodiment, the user may have the ability to enter a name of another user (or a username, email, phone number, etc.) to facilitate sharing. In another embodiment, the user may select one or more users to receive the shared data from a list. In another embodiment, the user of the interface 800 may receive a share request from another user.

Additionally, in one embodiment, the user of the interface 800 may be capable of defining a boundary of an undetected face. For example, in one embodiment, the user may have the ability to draw a box (or circle, irregular shape, any shape, etc.) around a face to define the face boundary. In one embodiment, the user may have the ability to resize the boundary. In another embodiment, the user may have the ability to resize the face captured by the boundary.

Further, in one embodiment, the user may be able to enter, modify, and/or add metadata associated with a face in the media. For example, in one embodiment, the user may have the ability to click on a face or face boundary and to enter, modify, and/or add metadata corresponding to the selected face. In another embodiment, the user may be presented with an interface for to entering, modifying, and/or adding metadata (e.g. via a menu, a tab, a drop-down, etc.).

Figure 9:
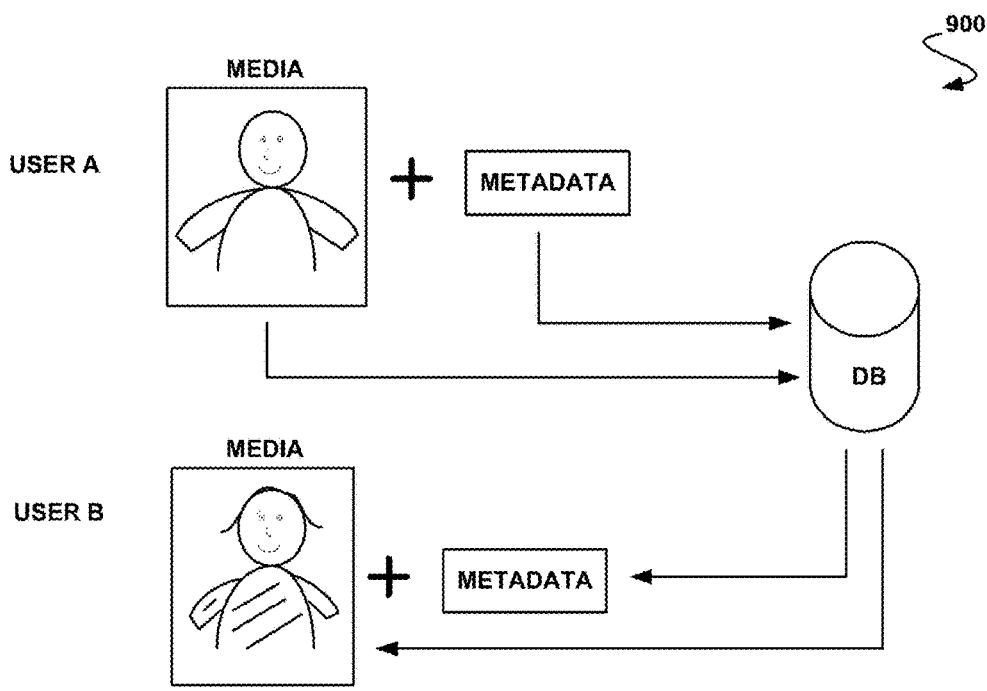
FIG. 9 shows an exemplary system flow for sharing metadata and media objects, in accordance with another embodiment.

FIG. 9 shows an exemplary system flow 900 for sharing metadata and media objects, in accordance with another embodiment. As an option, the system flow 900 may be implemented in the context of the architecture and environment of the previous Figures or any subsequent Figure(s). Of course, however, the system flow 900 may be implemented in the context of any desired environment. It should also be noted that the aforementioned definitions may apply during the present description.

In operation, User A may send a media object (e.g. an image, etc.) and/or metadata to a service system. If the media and/or metadata is new to the service system, the service system may be updated with the new media and metadata. In one embodiment, the media and/or metadata may be communicated to User B. For example, User A may have previously allowed User B to receive media and/or metadata, and the service system may have determined to send the media and/or metadata to User B. In various embodiments, the determination may be based on rules, detected faces in the media and/or metadata, previous associations, and/or preferences, etc.

In one embodiment, the metadata received by the service system and/or or User B (and/or sent by User A) may be a difference in the new metadata and what the system/user already has (i.e. a delta of the metadata, etc.). For example, the metadata sent by User A may only include a portion of metadata that is new to User B. In this case, in one embodiment, the service system may make this determination and send User B only the new portion of metadata. As another example, the service system may include all but a portion of new metadata associated with User A. In this case, User A may only send the new portion of the metadata to the service system.

Figure 10:
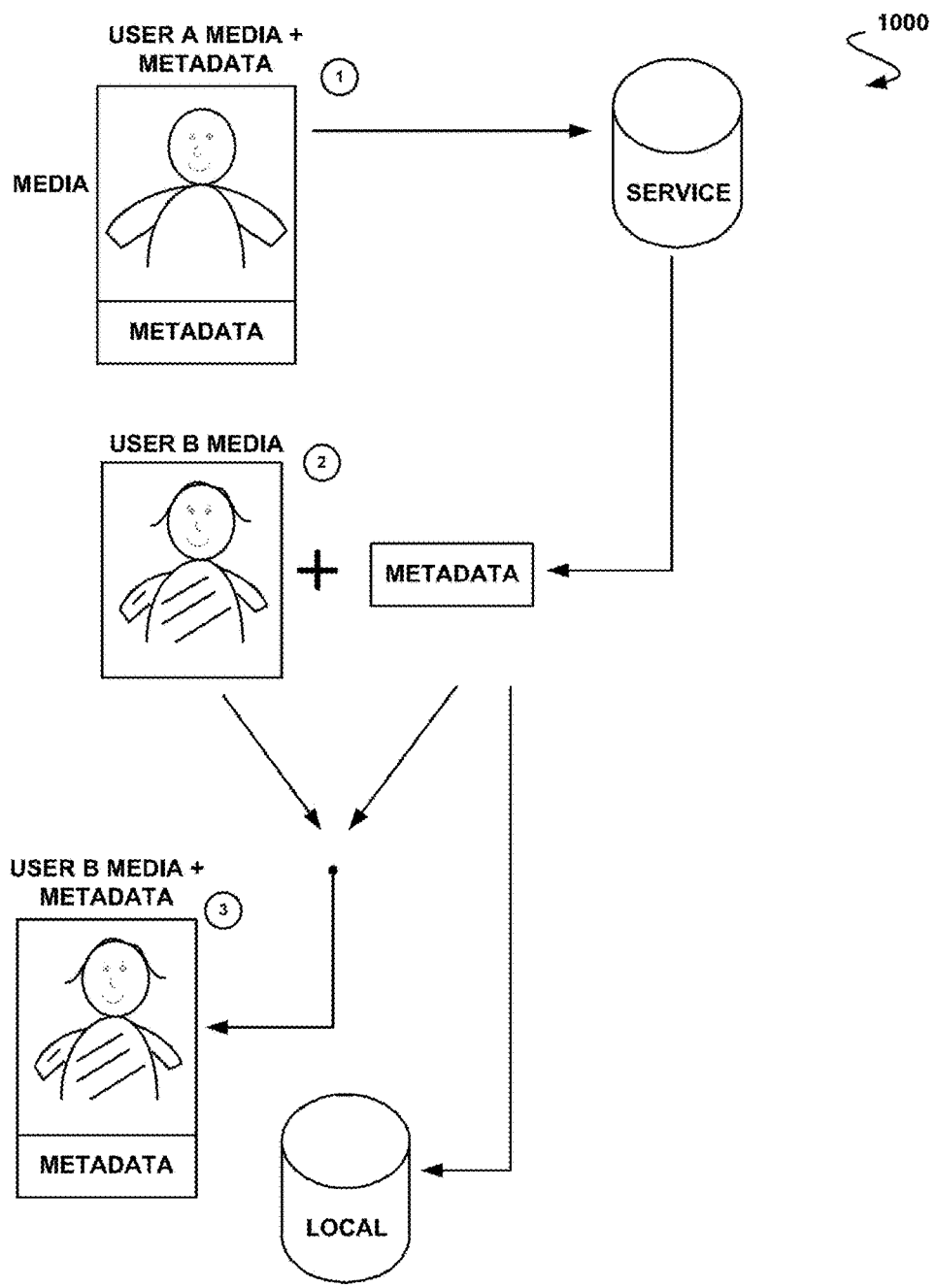
FIG. 10 shows an exemplary system flow for sharing metadata and media objects, in accordance with another embodiment.

FIG. 10 shows an exemplary system flow 1000 for sharing metadata and media objects, in accordance with another embodiment. As an option, the system flow 1000 may be implemented in the context of the architecture and environment of the previous Figures or any subsequent Figure(s). Of course, however, the system flow 1000 may be implemented in the context of any desired environment. It should also be noted that the aforementioned definitions may apply during the present description.

As shown, User A sends media and metadata to a service system. See step 1. Further, the metadata associated with the media is sent to User B by the service system. See step 2. Additionally, the metadata is associated with the media and the metadata is incorporated into a local metadata repository of User B. See step 3.

In one embodiment, a mobile device may include the local metadata repository of User B. In another embodiment, a computer may include the local metadata repository of User B. In still another embodiment, the metadata repository of User B may include a networked repository. Furthermore, in one embodiment, the metadata received by the service system and/or User B may include a difference between the new metadata and the data already present at the service system and/or the metadata repository of User B (i.e. a delta of the metadata, etc.).

In one embodiment, the service system and/or User B may receive a reference to the metadata, rather than the metadata itself. In various embodiments, the reference to the metadata may include a link to the metadata, a metadata identifier, a portion of the metadata, and/or any other reference to the metadata. As an example, in one embodiment, the service system may send a device associated with User B a link to the metadata received by User A.

Figure 11:
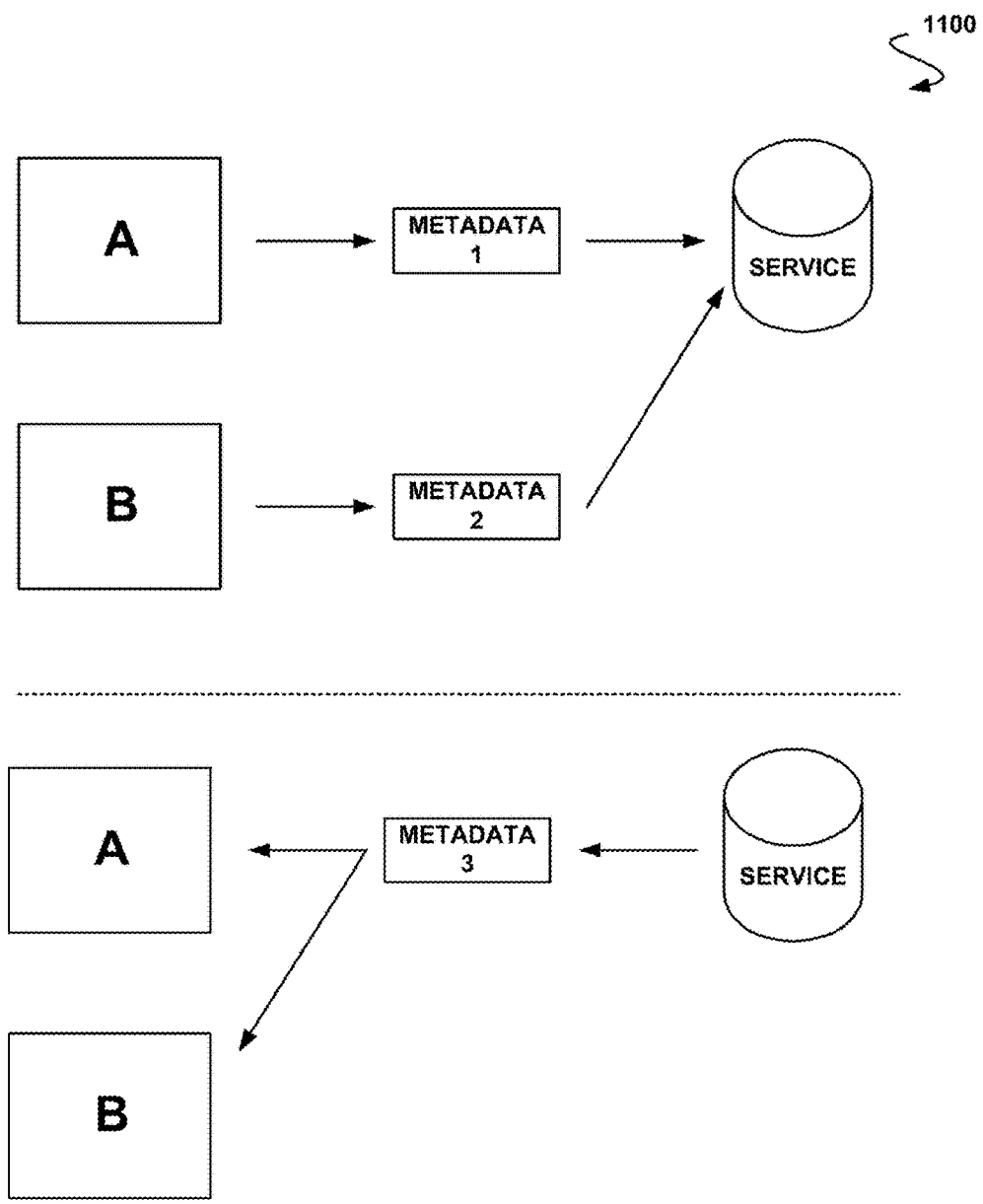
FIG. 11 shows an exemplary system flow for sharing metadata and media objects, in accordance with another embodiment.

FIG. 11 shows an exemplary system flow 1100 for sharing metadata and media objects, in accordance with another embodiment. As an option, the system flow 1100 may be implemented in the context of the architecture and environment of the previous Figures or any subsequent Figure(s). Of course, however, the system flow 1100 may be implemented in the context of any desired environment. It should also be noted that the aforementioned definitions may apply during the present description.

As shown, User A may send metadata associated with User A to a service system. Further, User B may send metadata associated with User B to the service system. In one embodiment, the service system may incorporate the new metadata sent by User A and User B into the service system. Additionally, in one embodiment, the service system may send new and/or updated aggregate metadata to User A and/or User B.

For example, in one embodiment, the service system may merge metadata associated with User A and User B into one set of metadata and send the one set of metadata to User A and/or User B. Of course, in one embodiment, the service system may send a delta of the metadata and/or a metadata identifier to User A and/or User B. Additionally, in one embodiment, User A and/or User B may send a delta of the metadata and/or a metadata identifier to the service system.

Figure 12:
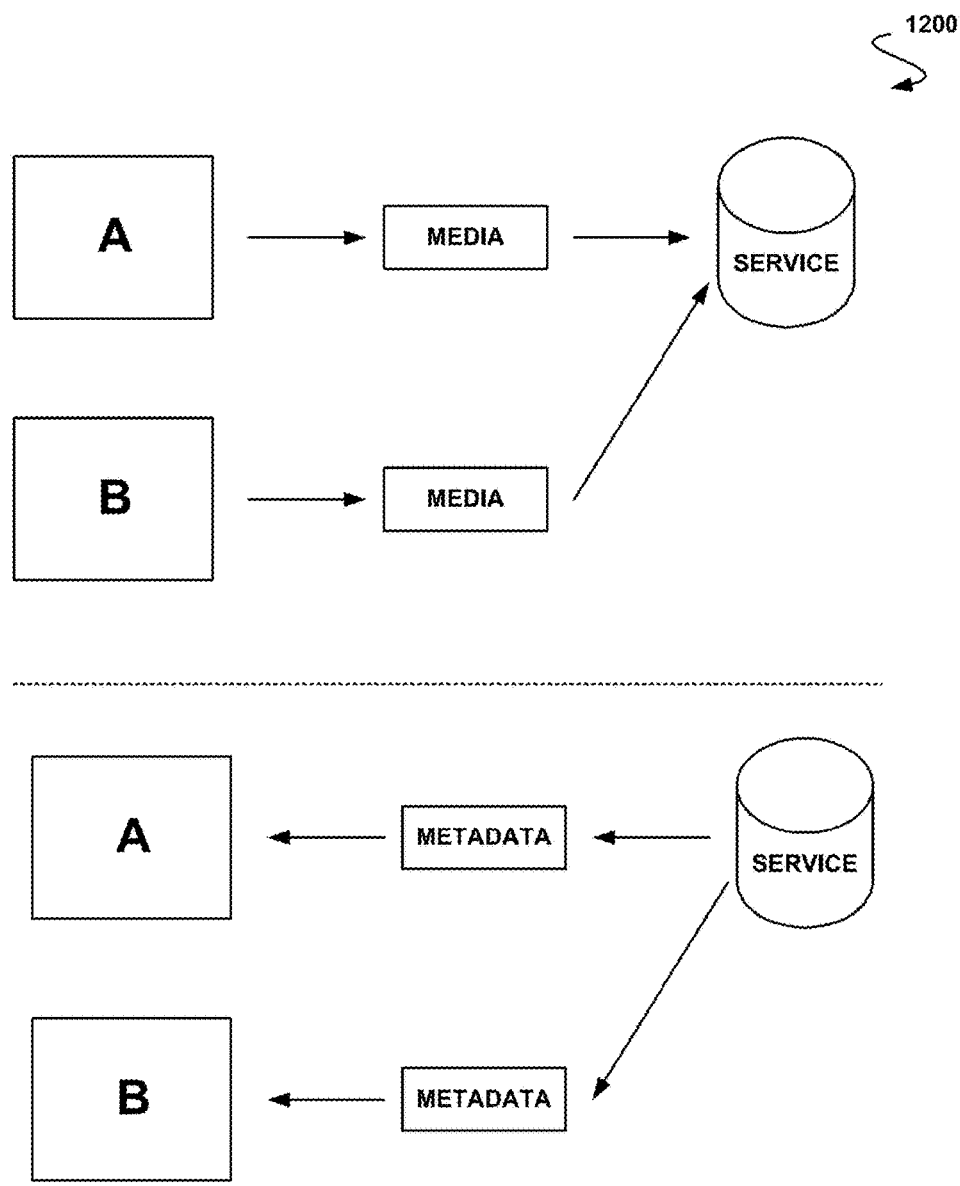
FIG. 12 shows an exemplary system flow for sharing metadata and media objects, in accordance with another embodiment.

FIG. 12 shows an exemplary system flow 1200 for sharing metadata and media objects, in accordance with another embodiment. As an option, the system flow 1200 may be implemented in the context of the architecture and environment of the previous Figures or any subsequent Figure(s). Of course, however, the system flow 1200 may be implemented in the context of any desired environment. It should also be noted that the aforementioned definitions may apply during the present description.

As shown, User A may send one or more media objects associated with User A to a service system. Additionally, User B may send one or more media objects associated with User B to the service system. In one embodiment, the service system may determine metadata for each media object. Further, the service system may send the updated/new metadata associated with each media object to User A and User B.

For example, with respect to User A media, the service system may associate Metadata_A1 with Media_A. In one embodiment, Metadata_A1 may include face identification data associated with Media_A (e.g. a face may have been identified in Media_A by the service and the identification information may be included in Metadata_A1, etc.).

Further, with respect to User B, the service system may associate Metadata_B1 with Media_B. In one embodiment, Metadata_B1 may include face identification data associated with Media_B (e.g. a face may have been identified in Media_B by the service and the identification information may be included in Metadata_B1, etc.).

In various embodiments, the creation of Metadata_A1 and/or Metadata_B1 may be in response to the receipt of Media_A and/or Media_B from the service system, a result of a periodic update, a response to request from a user, and/or a response to updated metadata by the service system, etc. As an example, if User C sends Media_C to the service system, and the service system identifies a face that was included in Media_A and has improved metadata Metadata_A2, the service may send the improved metadata Metadata_A2 to User A.

In one embodiment, the service system may automatically generate the metadata, based on the media objects, etc. Further, in one embodiment, users may have the ability to provide feedback for the automatic identification of the metadata. For example, the user may provide feedback including a corrected facial identification, a name spelling correction, and/or various other information.

Although many of the Figures have been described in the context of the media object including an image, the media object may include any type of media (e.g. an application, etc.). Additionally, the metadata may include any type of data associated with the media. For example, in one embodiment, the metadata may include information capable of being used to filter, select, prioritize, and/or otherwise display media objects.

FIG. 13A shows a media object display list 1300, in accordance with another embodiment. As an option, the list 1300 may be implemented in the context of the architecture and environment of the previous Figures or any subsequent Figure(s). Of course, however, the list 1300 may be implemented in the context of any desired environment. It should also be noted that the aforementioned definitions may apply during the present description.

As shown, an application list may be filtered based on a variety of parameters and/or metadata associated with the applications. In this case, a user device may include a plurality of applications that may be displayed in list format and/or filtered based on metadata associated with the applications. For example, in one embodiment, a user may have the option to filter based on metadata such as device type, device name, genre, rating, size, number of uses, a time last used, total time used, installed/not installed/never installed, never run, shared, shared expiration time, uses remaining, and/or any other type of parameter and/or metadata. In one embodiment, any preference and/or metadata associated with the application may be subject of the filter. Further, in one embodiment, the columns listed may be moved, reordered, and/or selected from metadata, etc. Of course, any type of media object may be filtered in this manner (e.g. images, videos, music, etc.).

FIG. 13B shows an exemplary parameter selection interface 1320 for selecting filter criteria associated with the interface 1300, in accordance with another embodiment. As an option, the interface 1320 may be implemented in the context of the architecture and environment of the previous Figures or any subsequent Figure(s). Of course, however, the interface 1320 may be implemented in the context of any desired environment. It should also be noted that the aforementioned definitions may apply during the present description.

In one embodiment, the interface 1320 may be utilized to select metadata parameters for prioritizing the display of media objects (e.g. in the interface 1300, etc.). In various embodiments, the interface 1320 may be displayed on the top of the interface 1300, above the interface 1300, as a pop out, to the side to the side of the interface 1300, in a separate window, and/or in various other locations, depending on the implementation, etc. In one embodiment, the interface 1320 may be utilized for filtering media objects to determine which media objects to make available for sharing.

Figure 14:
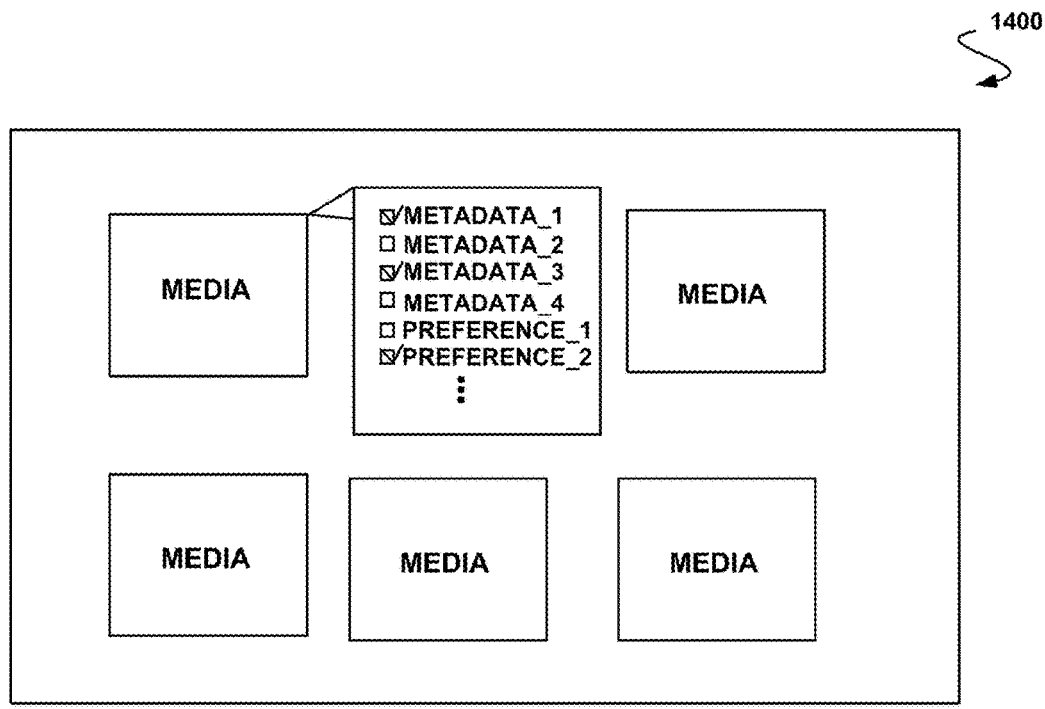
FIG. 14 shows an interface for viewing metadata and media objects, in accordance with another embodiment.

FIG. 14 shows an interface 1400 for viewing metadata and media objects, in accordance with another embodiment. As an option, the interface 1400 may be implemented in the context of the architecture and environment of the previous Figures or any subsequent Figure(s). Of course, however, the interface 1400 may be implemented in the context of any desired environment. It should also be noted that the aforementioned definitions may apply during the present description.

As shown, the interface 1400 is capable of displaying a media object grid view with a sharing box pop-out. In one embodiment, if the media objects (e.g. photos, applications, etc.) are selected to be viewed in a grid view, selecting the media object may cause the display of metadata and/or preferences associated with the selected media object such that the user may be permitted to update and/or view the preferences and/or metadata. In various embodiments, the metadata and/or preference information may be displayed as a pop-out, a popover, a separate window, and/or in any other suitable fashion. Furthermore, in various embodiments, the metadata and/or the preference information may be presented as a scrollable list, a set list, and/or utilizing various other techniques.

Figure 15:
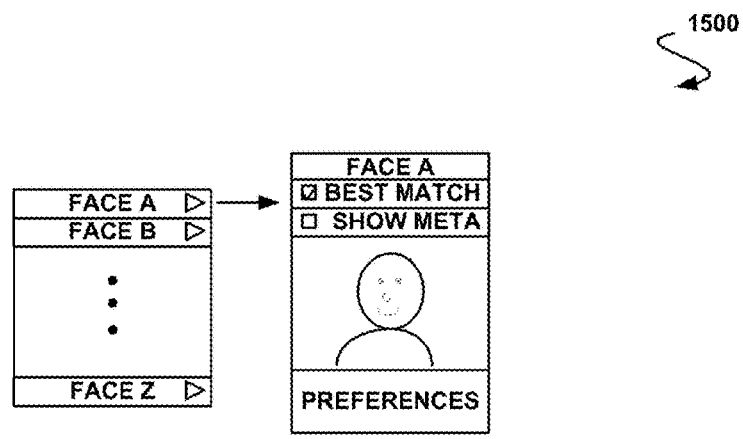
FIG. 15 shows an interface for viewing metadata and media objects, in accordance with another embodiment.

FIG. 15 shows an interface 1500 for viewing metadata and media objects, in accordance with another embodiment. As an option, the interface 1500 may be implemented in the context of the architecture and environment of the previous Figures or any subsequent Figure(s). Of course, however, the interface 1500 may be implemented in the context of any desired environment. It should also be noted that the aforementioned definitions may apply during the present description.

As shown, the interface 1500 may be capable of displaying a list of faces and associated names identified in media/metadata. In one embodiment, the interface 1500 may be capable of displaying a best picture example associated with the identified face, as well as a mesh and/or metadata overlay. For example, after a picture is taken, the user may indicate that the picture is a best representation of person captured in the picture. This information may be stored as metadata associated with the picture.

In one embodiment, the facial metadata associated with the best picture(s) may carry more significance/weight than a picture that is not indicated as a best picture. In one embodiment, the user may have a list with an entry for each identified user, and each user may have at least one best picture that is more heavily weighted in the creation/update of the facial metadata.

Figure 16:
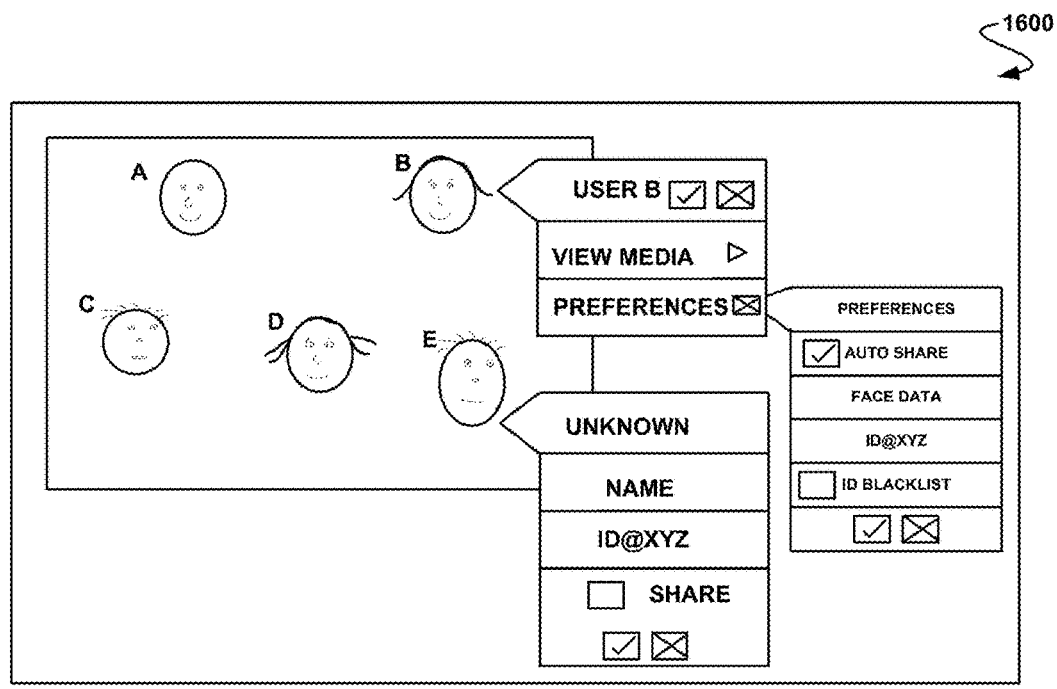
FIG. 16 shows an interface for viewing metadata and media objects, in accordance with another embodiment.

FIG. 16 shows an interface 1600 for viewing metadata and media objects, in accordance with another embodiment. As an option, the interface 1600 may be implemented in the context of the architecture and environment of the previous Figures or any subsequent Figure(s). Of course, however, the interface 1600 may be implemented in the context of any desired environment. It should also be noted that the aforementioned definitions may apply during the present description.

As shown, the interface 1600 may be utilized to view photos, view face data associated with the photos, edit existing metadata, and/or add new metadata, etc. For example, in one embodiment, the interface 1600 may be utilized to display faces identified in an image. In one embodiment, when the identified faces are selected by the user, preferences and/or options, etc., associated with the media and/or the metadata for the selected face may be displayed and/or presented for editing.

In one embodiment, the interface 1600 may allow for the metadata associated with unknown faces to be entered and/or selected from existing metadata, etc. Further, in one embodiment, newly identified faces (e.g. that are not part of a current group/sharing, etc.) may be invited during and/or after identifying that face. In one embodiment, the identified users may be invited automatically. In another embodiment, the identified users may receive an invitation from a user associated with the interface 1600.

Additionally, in one embodiment, preferences associated with an identified user may be edited. Further, in one embodiment, users may be blacklisted based on preference selection. In one embodiment, if a user is blacklisted, a service system and/or a device associated with a user may remove any media associated with the blacklisting user from a device of the blacklisted user.

Figure 17:
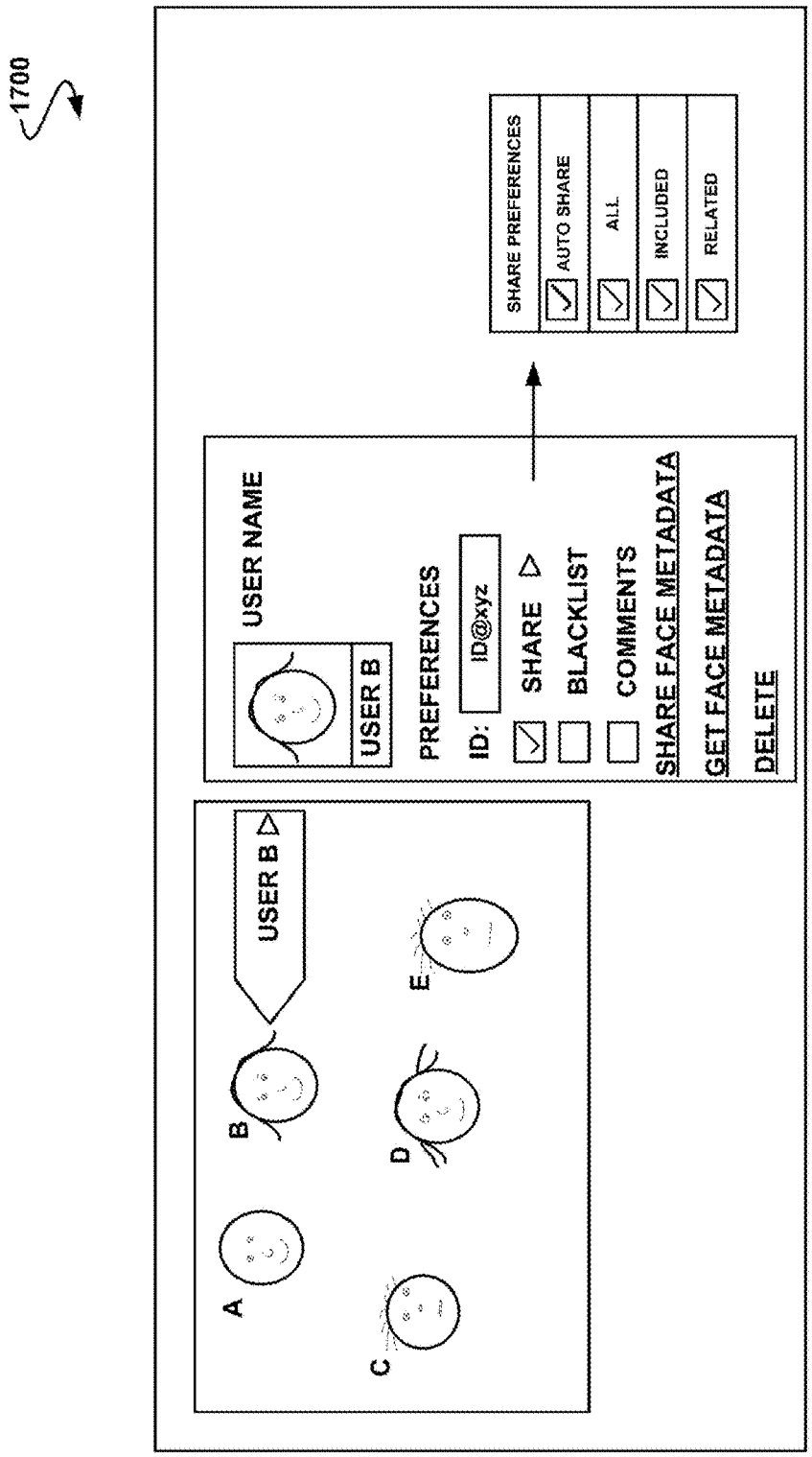
FIG. 17 shows an interface for viewing metadata and media objects, in accordance with another embodiment.

FIG. 17 shows an interface 1700 for viewing metadata and media objects, in accordance with another embodiment. As an option, the interface 1700 may be implemented in the context of the architecture and environment of the previous Figures or any subsequent Figure(s). Of course, however, the interface 1700 may be implemented in the context of any desired environment. It should also be noted that the aforementioned definitions may apply during the present description.

As shown, the interface 1700 may be utilized to view users, select user faces, and/or select preferences for users. For example, when viewing a photo, a user may select a face and, in response, receive an indication of the name associated with the face. Further, in one embodiment, selecting the name display may display a detailed view of the user.

In one embodiment, showing a detailed view of the user may include showing a face picture, a user name associated with the picture, a description associated with the user and/or the picture, and/or preference information associated with the user. In various embodiments, the preference information may include at least one user identifier, a sharing preference, an indication as to whether the user is blacklisted, an indication as to whether the user is enabled to comment, an indication as to the ability to share face metadata of that user with another user, an indication as to the ability to request face metadata from the user, service information, and/or any other type of information. In one embodiment, the interface 1700 may present the viewing user an option to delete an identified user. Further, in various embodiments, the sharing preferences may include options such as auto share, share all media, share media where the user is included, share media that is related to the user, and/or various other options, etc.

Figure 18:
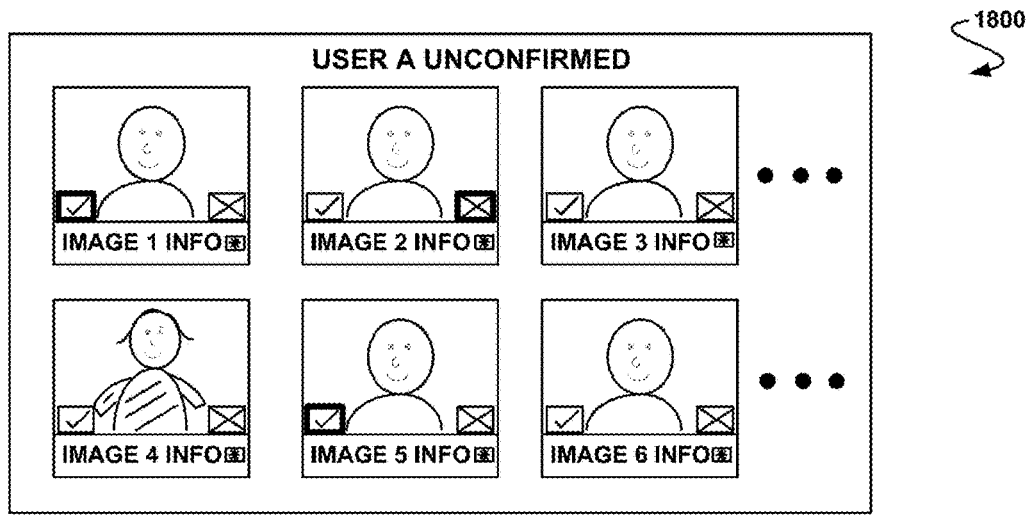
FIG. 18 shows an interface for viewing metadata and media objects, in accordance with another embodiment.

FIG. 18 shows an interface 1800 for viewing metadata and media objects, in accordance with another embodiment. As an option, the interface 1800 may be implemented in the context of the architecture and environment of the previous Figures or any subsequent Figure(s). Of course, however, the interface 1800 may be implemented in the context of any desired environment. It should also be noted that the aforementioned definitions may apply during the present description.

In one embodiment, the interface 1800 may be utilized to display media potentially related to User A. Additionally, in one embodiment, the interface 1800 may provide a viewing user (e.g. User A, etc.) with the ability to confirm and/or deny whether the media is associated with User A. In one embodiment, the user may indicate whether there is match or no match utilizing the interface 1800, and each indication may be highlighted, emphasized, etc. Further, in on embodiment, a user may have the option to enter a name in a field or select a name via a drop list to associate with one or more of the images.

In one embodiment, names to associate with the faces may be presented with an auto fill. For example, in one embodiment, a user may select a face and a name may be suggested and auto-filled into the name field, based on existing metadata. Additionally, in one embodiment, the suggested names may be presented in a drop list that is sorted in name order, best guess order, and/or based on other criteria. In one embodiment, the user may select an icon associated with each piece of media to display additional details associated with the media (e.g. as in FIG. 30, etc.).

Figure 19:
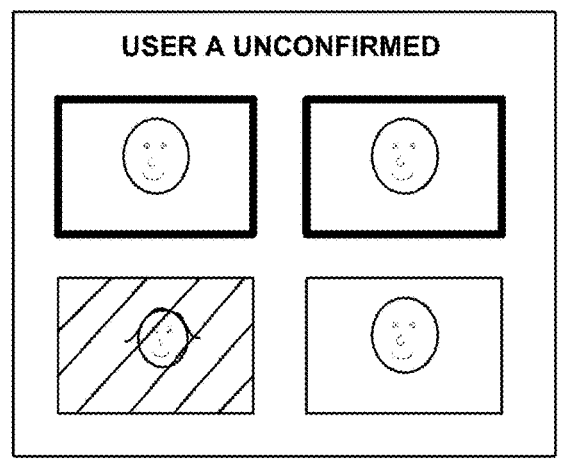
FIG. 19 shows an interface for confirming media object associations, in accordance with another embodiment.

FIG. 19 shows an interface 1900 for confirming media object associations, in accordance with another embodiment. As an option, the interface 1900 may be implemented in the context of the architecture and environment of the previous Figures or any subsequent Figure(s). Of course, however, the interface 1900 may be implemented in the context of any desired environment. It should also be noted that the aforementioned definitions may apply during the present description.

In one embodiment, the interface 1900 may be utilized for confirming or denying user/media associations. In one embodiment, a user may confirm that an image is associated with the user by touching, selecting, and/or clicking the image. In another embodiment, the user may deny that an image is associated with the user by touching and holding the touch for a predetermined amount of time. In another embodiment, multiple clicks and/or touches may indicate a denial that an image is associated with the user.

Further, in one embodiment, the interface 1900 may indicate confirmation status of a photo (or other media object) via a coloring, a shading, a fill pattern, a border, an overlay, and/or utilizing various other techniques. Further, in one embodiment, in response to the user confirming and/or denying one or more photos as including a face of a specific user (e.g. User A, etc.), the metadata describing the specific user may be updated. In one embodiment, the metadata may be communicated to a service and/or at least one other user associated with the specific user.

Figure 20:
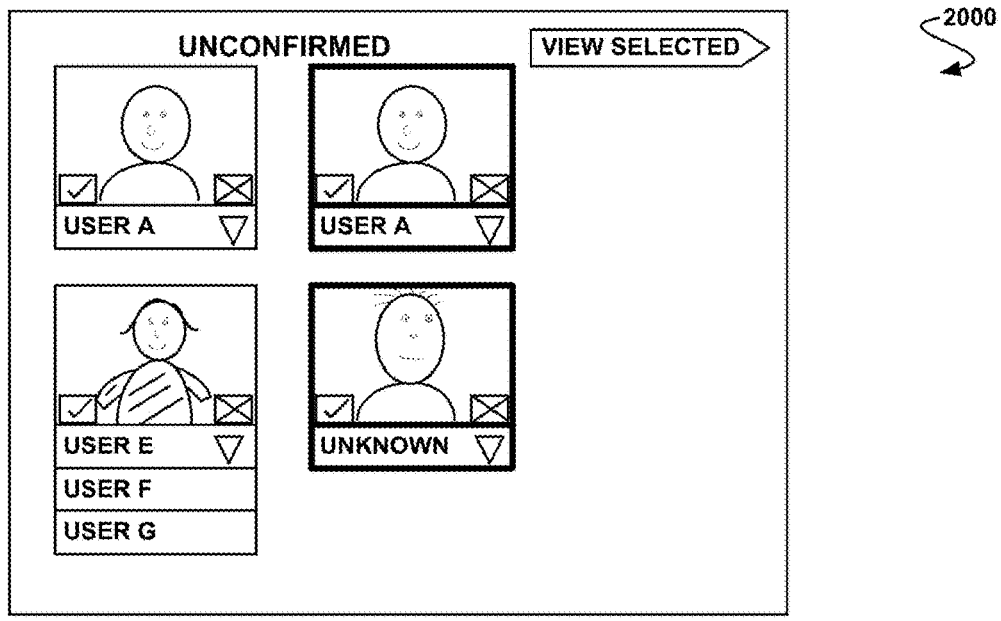
FIG. 20 shows an interface for confirming media object associations, in accordance with another embodiment.

FIG. 20 shows an interface 2000 for confirming media object associations, in accordance with another embodiment. As an option, the interface 2000 may be implemented in the context of the architecture and environment of the previous Figures or any subsequent Figure(s). Of course, however, the interface 2000 may be implemented in the context of any desired environment. It should also be noted that the aforementioned definitions may apply during the present description.

In one embodiment, the interface 2000 may display media or portions of media including unconfirmed faces. In one embodiment, the interface 2000 may display an unconfirmed face of a user along with a best guess name association listed. In one embodiment, a facial recognition algorithm may be utilized to determine a best guess name association. Further, in various embodiments, the interface 2000 may allow a user to confirm the name association via touches, selections, voice input, icons, and/or various other techniques.

Additionally, in one embodiment, a user may have the ability to enter a name (e.g. with auto fill, explicit typing, etc.) or select a name via drop list showing names, best guess names, etc. In one embodiment, the user may utilize the interface 2000 to focus on media for confirming and/or denying selected names associated with a face or selected faces. Further, in one embodiment, the user may utilize the interface 2000 to select media to be viewed in greater detail.

Figure 21:
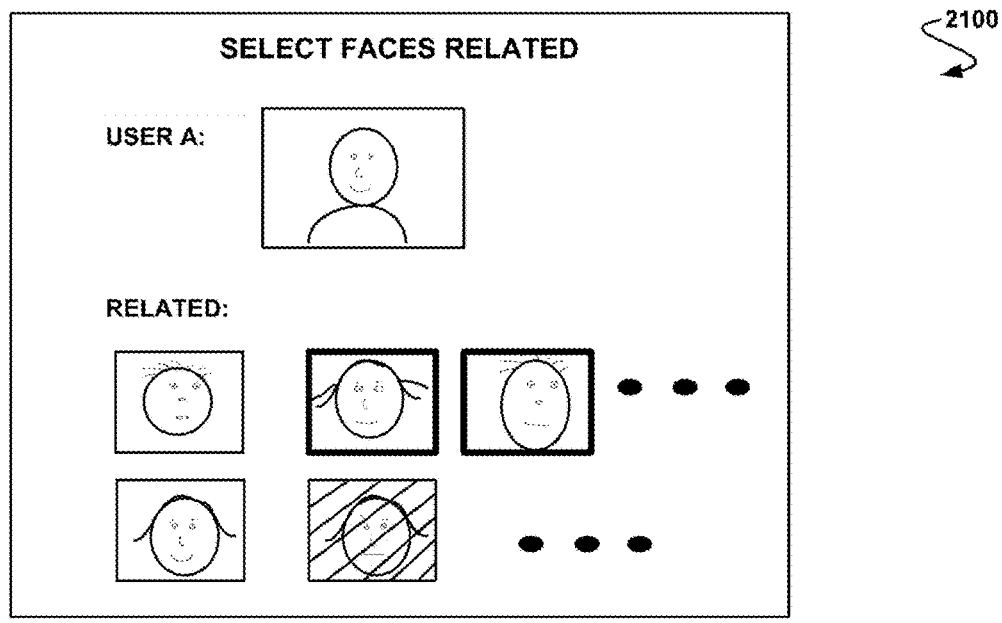
FIG. 21 shows an interface for selecting media object associations, in accordance with another embodiment.

FIG. 21 shows an interface 2100 for selecting media object associations, in accordance with another embodiment. As an option, the interface 2100 may be implemented in the context of the architecture and environment of the previous Figures or any subsequent Figure(s). Of course, however, the interface 2100 may be implemented in the context of any desired environment. It should also be noted that the aforementioned definitions may apply during the present description.

As shown, the interface 2100 may be utilized to select faces/users related to a particular user (e.g. User A, etc.). In one embodiment, the user may utilize the interface 2100 to select a user icon or photo, etc., to indicate whether the associated user is related or not related (or neutral, etc.) to the particular user (e.g. User A, etc.). In one embodiment, multiple selections of the user media, face, and/or representation may cycle through the states of related, not related, and/or neutral.

Figure 22:
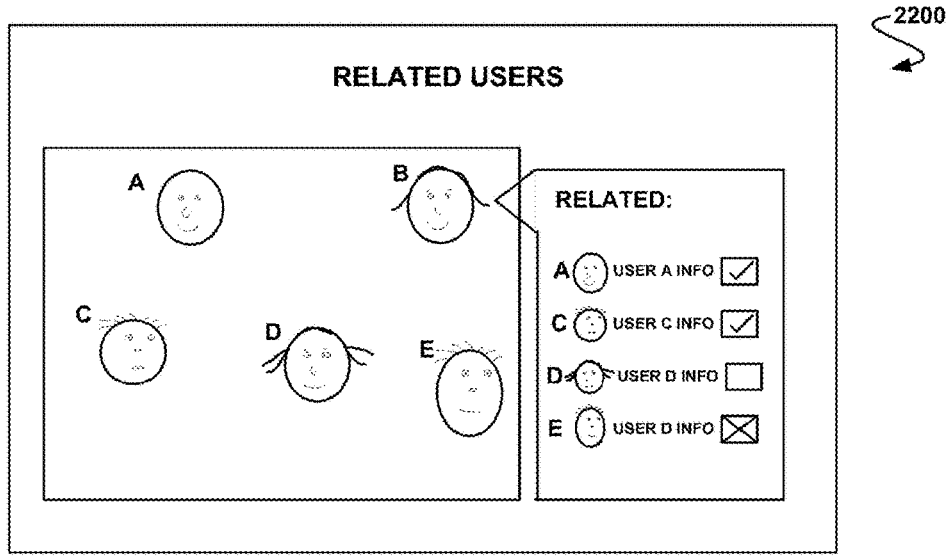
FIG. 22 shows an interface for viewing media object associations, in accordance with another embodiment.

FIG. 22 shows an interface 2200 for viewing media object associations, in accordance with another embodiment. As an option, the interface 2200 may be implemented in the context of the architecture and environment of the previous Figures or any subsequent Figure(s). Of course, however, the interface 2200 may be implemented in the context of any desired environment. It should also be noted that the aforementioned definitions may apply during the present description.

As shown, a user may utilize the interface 2200 to view a photo, select a face, and/or indicate a relationship to other identified users in a photo. In one embodiment, after selecting a user in the media, a display including other users in the media may be displayed. In this case, in one embodiment, the user may then indicate a relationship to the users in the media to set sharing preferences. For example, a user may select User B. In this case, User B is related to User A and User C. Additionally, User B is neutral on User D. Finally, as shown, User B is not related to User E. Of course, in various other embodiments, any technique may be utilized to indicate relationships between users.

Figure 23:
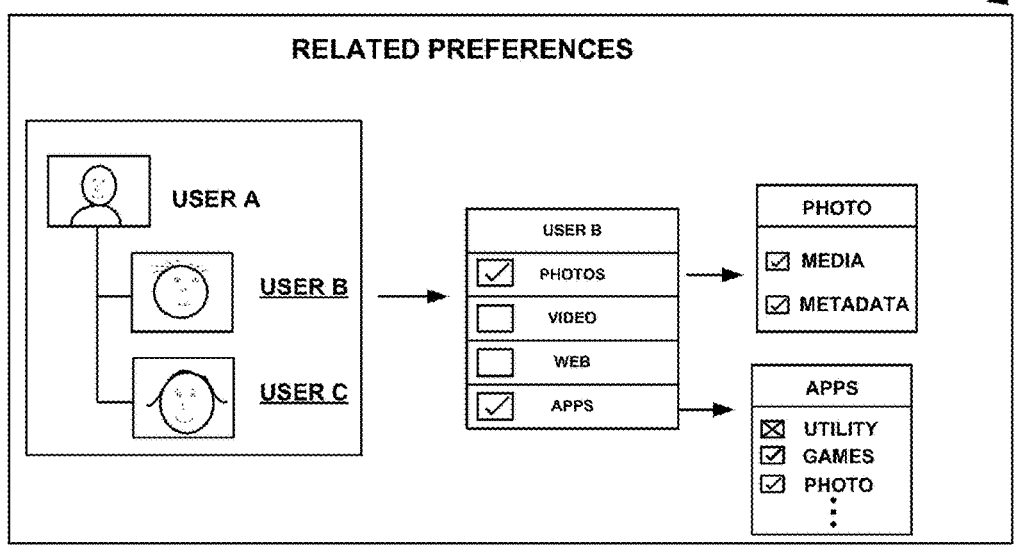
FIG. 23 shows an interface for viewing media object associations, in accordance with another embodiment.

FIG. 23 shows an interface 2300 for viewing media object associations, in accordance with another embodiment. As an option, the interface 2300 may be implemented in the context of the architecture and environment of the previous Figures or any subsequent Figure(s). Of course, however, the interface 2300 may be implemented in the context of any desired environment. It should also be noted that the aforementioned definitions may apply during the present description.

As shown, the interface 2300 is capable of displaying user relationship lists. As an example, the interface 2300 shows a related user list for User A. In this case, the related user list for User A includes User B and User C. In one embodiment, the interface 2300 may allow User A to select a profile, image, icon, or name associated with User B and to set preferences for User B. In various embodiments, the preferences may include photo sharing, video sharing, web sharing, application sharing, and/or any other preferences.

In one embodiment, clicking on or selecting a preference (e.g. a preference name, icon, etc.) may display additional preferences. For example, in one embodiment, selecting a photo preference may cause the display of additional options to share media and/or metadata associated with the media. In another embodiment, selecting an application preference may cause the display of additional preferences associated with the category of applications. Still yet, in one embodiment, selecting a profile, image, icon, and/or name associated with a user displayed on the interface 2300 may allow for metadata associated with a profile, image, and/or user to be edited. Of course, in another embodiment, the selection of any type of media may allow for editing of metadata associated with that media.

Figure 24:
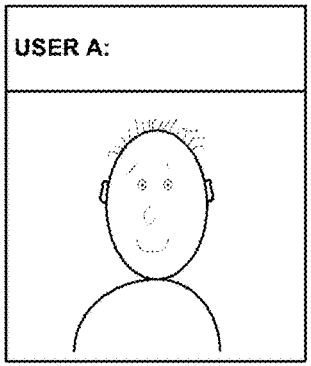
FIG. 24 shows an interface for editing metadata associated with media objects, in accordance with another embodiment.

FIG. 24 shows an interface 2400 for editing metadata associated with media objects, in accordance with another embodiment. As an option, the interface 2400 may be implemented in the context of the architecture and environment of the previous Figures or any subsequent Figure(s). Of course, however, the interface 2400 may be implemented in the context of any desired environment. It should also be noted that the aforementioned definitions may apply during the present description.

As shown, the interface 2400 may allow specific modification/editing of facial metadata. In one embodiment, the modified/edited metadata may be used to augment, replace, and/or refine, etc., a specific set of metadata for a face. In one embodiment, the resulting metadata may be shared with one or more other users.

Figure 25:
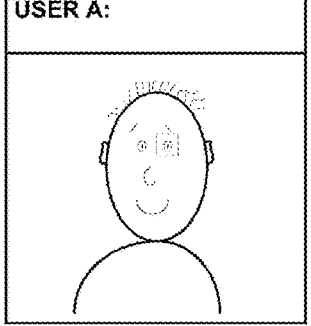
FIG. 25 shows an interface for editing metadata associated with media objects, in accordance with another embodiment.

Utilizing the interface 2400, in one embodiment, the user may select a specific region for each feature and define its border and/or position, etc. In one embodiment, selecting the approve icon may confirm the position of a corresponding facial feature. Further, in one embodiment, selecting the edit icon may enable and/or disable the edit mode for that feature (e.g. as shown in FIG. 25, etc.). Additionally, in one embodiment, the delete icon may delete the metadata related to that feature. In various embodiments, the metadata may include, but is not limited to, data associated with a left eye, right eye, left eyebrow, right eyebrow, nose, upper lip, lower lip, left ear, right ear, hair color(s), skin color, marks, tattoos, and/or any other feature of a person. In one embodiment, the interface 2400 may offer the user the ability to add and/or define at least one other mark associated with a user. Once the editing of the metadata has concluded, in one embodiment, the metadata may be created/refined based on the user entered data.

FIG. 25 shows an interface 2500 for editing metadata associated with media objects, in accordance with another embodiment. As an option, the interface 2500 may be implemented in the context of the architecture and environment of the previous Figures or any subsequent Figure(s). Of course, however, the interface 2500 may be implemented in the context of any desired environment. It should also be noted that the aforementioned definitions may apply during the present description.

As shown, the interface 2500 may allow for editing of a specific attribute of the facial metadata. For example, when editing the left eye, the user may edit the position of the eye, the size, shape, color, marks, and/or any other feature that defines the eye. In one embodiment, each face feature may have a corresponding set of data points/criteria that may be utilized to define that feature. Further, in one embodiment, the features and the positions relative to the other features may be utilized in constructing metadata that defines the face of a particular user (e.g. User A in this example, etc.). In various embodiments, the modified metadata may be shared, a metadata identifier may be shared, a delta of the metadata may be shared, and/or a link to the metadata may be shared. Additionally, in one embodiment, the metadata may be shared based on at least one rule.

Figure 26:
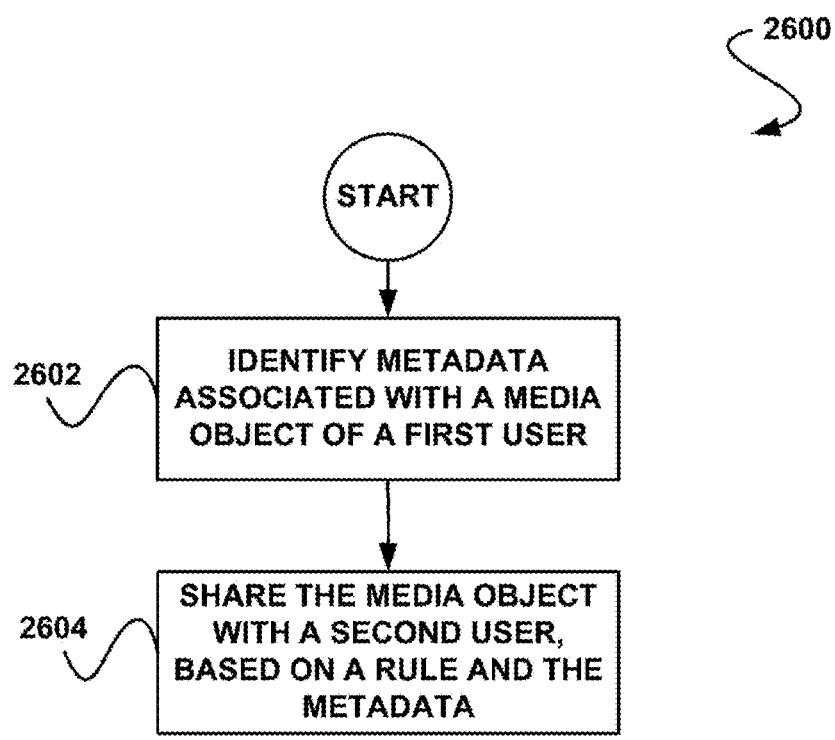
FIG. 26 shows a method for sharing metadata associated with a media object, in accordance with another embodiment.

FIG. 26 shows a method 2600 for sharing metadata associated with a media object, in accordance with another embodiment. As an option, the method 2600 may be implemented in the context of the previous Figures or any subsequent Figure(s). Of course, however, the method 2600 may be carried out in any desired environment. It should also be noted that the aforementioned definitions may apply during the present description.

As shown, metadata associated with a media object of a first user is identified. See operation 2602. Additionally, the media object is shared with a second user, based on a rule and the metadata. See operation 2604.

For example, in one embodiment, at least one person may be identified in the media object (e.g. an image, a video, etc.). Further, it may be determined whether the identified at least one person is associated with the second user in accordance with the rule. In one embodiment, the rule may indicate that the at least one person is associated with the second user when the at least one person is the second user. In another embodiment, the rule may indicate that the at least one person is associated with the second user when the at least one person has a relationship with the second user. In another embodiment, the rule may indicate that the at least one person is associated with the second user when the at least one person has a relationship with a third user that has a ship with the second user. Still yet, in one embodiment, the sharing of the media object may be conditioned on the identification of the at least one person in the media object.

Figure 27:
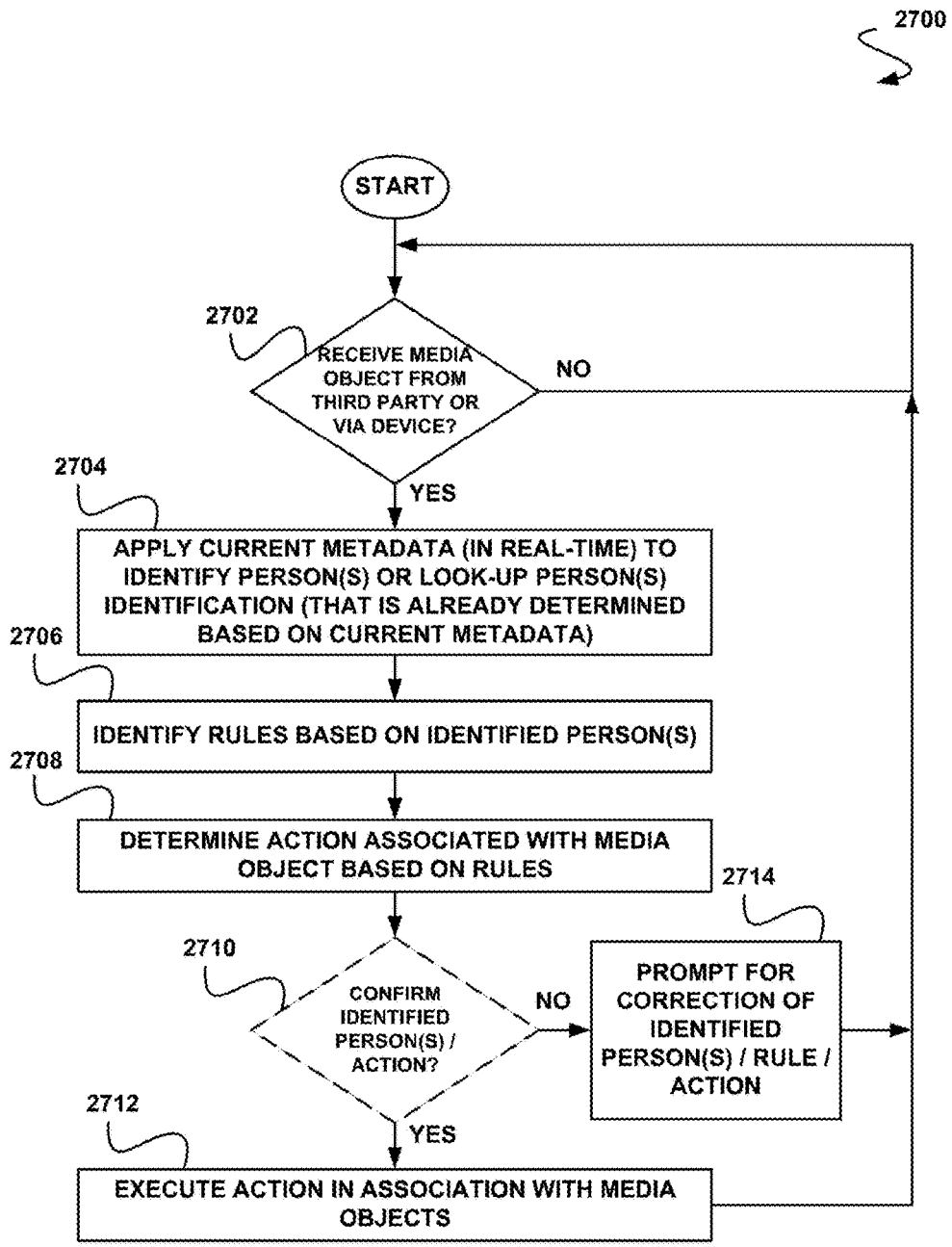
FIG. 27 shows a method for sharing metadata associated with a media object, in accordance with another embodiment.

FIG. 27 shows a method 2700 for sharing metadata associated with a media object, in accordance with another embodiment. As an option, the method 2700 may be implemented in the context of the previous Figures or any subsequent Figure(s). Of course, however, the method 2700 may be carried out in any desired environment. It should also be noted that the aforementioned definitions may apply during the present description.

As shown, it is determined whether a media object is received from a third party and/or from a user device, such as a camera (e.g. or a mobile phone, a tablet computer, etc.). See decision 2702. If it is determined that a media object is received from a third party and/or from a user device, current metadata is applied to identify at least one person in the media object. See operation 2704. In the case that an identity of the at least one person in the media object has already been determined, the identity of the at least one person is looked up in current metadata associated with the media object.

Further, rules are identified based on the at least one person identified in the media object. See operation 2706. In one embodiment, the rules may be included in the metadata. In another embodiment, rule identifiers may be included in the metadata. In another embodiment, a link to the rules may be included in the metadata. In another embodiment, the rules may be included in a service system. In another embodiment, the rules may be stored on a user device. Further, in one embodiment, a user identifier may be utilized to look up associated rules. Of course, in various embodiments, the rules may be stored in any suitable location and/or may be accessed utilizing any suitable identifier. In one embodiment, the rules may accompany the media object and/or the metadata.

Additionally, an action associated with the media object based on the rules is determined. See operation 2708. The action based on the rules may include a variety of actions. For example, in one embodiment, the action may include a sharing action. In various embodiments, the sharing action may include sharing with users identified in the media object, sharing with users associated with users identified in the media object, sharing with specific users identified in the media object, sharing with users defined as friends, sharing with a group of users, sharing with a service, and/or any other type of sharing. In various embodiments, the sharing may include sharing metadata, media objects, and/or rules.

In another embodiment, the action may include a notification action. For example, in one embodiment, notifications may be sent to identified users, indicating that the users have been associated with a media object. In another embodiment, the action may include sending an invitation to view the media object (e.g. to identified users, etc.). Of course, the action may include any action associated with and/or defined by the rules. In one embodiment, a user may define the rules. In another embodiment, a service may define the rules. In another embodiment, the rules may be generated automatically, based on user actions. For example, in one embodiment, a rule may be inferred based on repetitive actions of a user.

Once an action associated with the media object based on the rules is determined, it is determined whether the action associated with the identified person is confirmed. See decision 2710. In one embodiment, a user may confirm the action (e.g. a user identified in the media, a user of an interface associated with the media object viewing, etc.). In another embodiment, the action may be confirmed automatically (e.g. by a service system, etc.).

If it is determined that the action has been confirmed, the action is executed in association with the media objects. See operation 2712. If it is determined that the action is not confirmed, a viewing user is prompted for a correction of the identified one or more people, the rule, and/or the action. See operation 2714.

Figure 28:
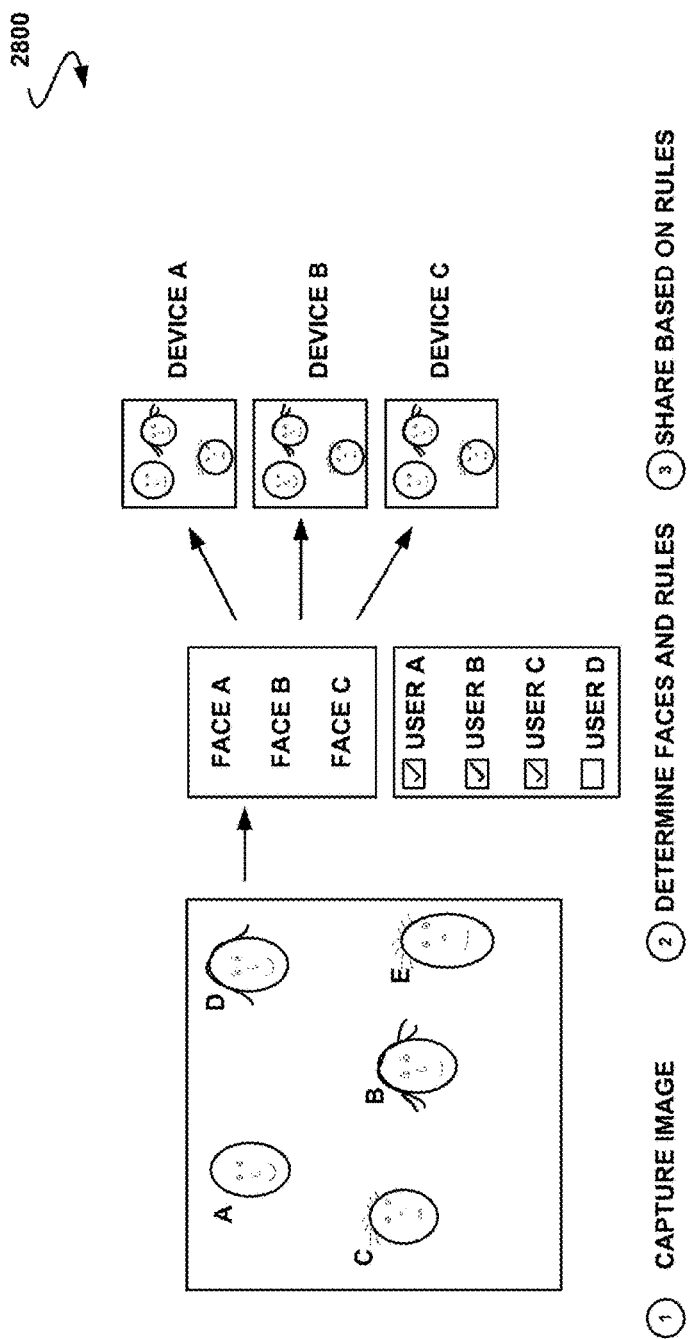
FIG. 28 shows an interface flow for sharing media objects based on rules, in accordance with another embodiment.

FIG. 28 shows an interface flow 2800 for sharing media objects based on rules, in accordance with another embodiment. As an option, the interface flow 2800 may be implemented in the context of the architecture and environment of the previous Figures or any subsequent Figure(s). Of course, however, the interface flow 2800 may be implemented in the context of any desired environment. It should also be noted that the aforementioned definitions may apply during the present description.

In one embodiment, users may establish sharing preferences for media objects. Furthermore, in one embodiment, users may establish sharing preferences for particular devices. For example, User A, User B, and User C may be known and have a sharing preference associated with themselves and their devices. On the other hand, User D and User E may not be known and may not or have known sharing preferences.

In this example, when a picture of the users is captured, faces A, B, and C may be identified (along faces D and E, in one embodiment, based on facial recognition, etc.). In one embodiment, rules may indicate to share media and/or metadata with the users associated with faces A, B, and C. Accordingly, media and/or metadata may be sent to devices of User A, User B, and User C for viewing, etc.

In one embodiment, the application on the device of the user (and/or a service, etc.) may identify the users based on the rules. In one embodiment, the rules may be stored locally (e.g. on the user device, etc.) and/or at service system (e.g. a network system, etc.). In one embodiment, the user devices and the service system may be synchronized such that updated rules (e.g. and metadata, etc.) are present at the user devices and the service system. In one embodiment, the service system may determine whether to send the media, the metadata, a link to the media or metadata, and/or a reference to the media or metadata to the user devices.

Figure 29:
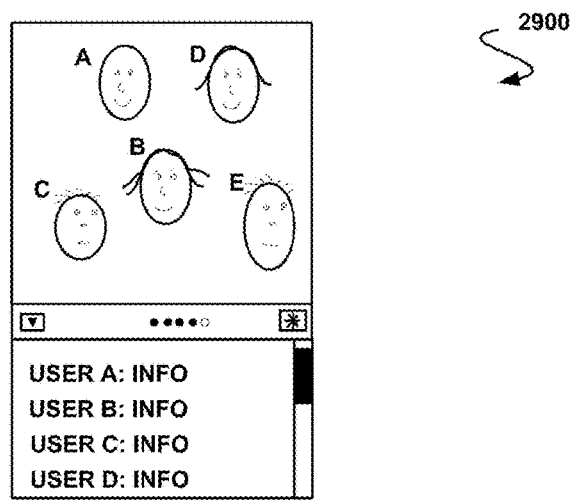
FIG. 29 shows an interface for viewing shared media objects, in accordance with another embodiment.

FIG. 29 shows an interface 2900 for viewing shared media objects, in accordance with another embodiment. As an option, the interface 2900 may be implemented in the context of the architecture and environment of the previous Figures or any subsequent Figure(s). Of course, however, the interface 2900 may be implemented in the context of any desired environment. It should also be noted that the aforementioned definitions may apply during the present description.

As shown, the interface 2900 may be utilized to view shared media objects. In one embodiment, a user may add metadata to shared media, including comments, a rating, face metadata, filters, and/or any other type of metadata. In various embodiments, additional metadata may be shown on top, below, over, etc., the media. In other embodiments, the metadata may be hidden, displayed in scroll interface, displayed in a manner that allows editing, etc. In one embodiment, an icon displayed on the interface 2900 may allow the user to perform additional actions, set additional preferences, and/or set metadata, etc., associated with the media object.

Figure 30:
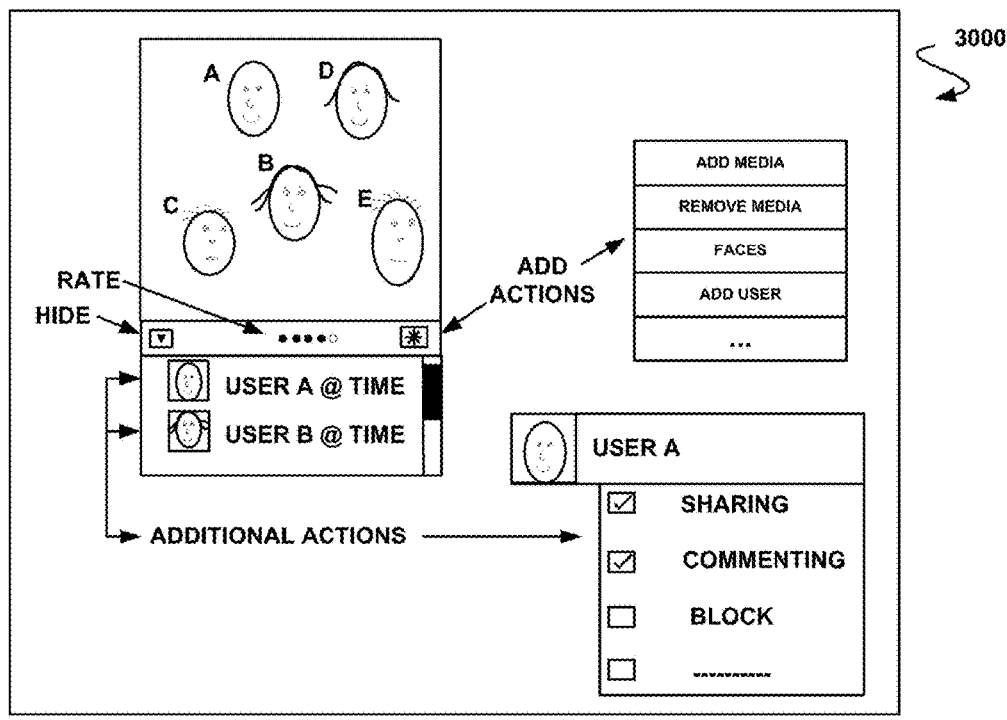
FIG. 30 shows an interface for viewing shared media objects, in accordance with another embodiment.

FIG. 30 shows an interface 3000 for viewing shared media objects, in accordance with another embodiment. As an option, the interface 3000 may be implemented in the context of the architecture and environment of the previous Figures or any subsequent Figure(s). Of course, however, the interface 3000 may be implemented in the context of any desired environment. It should also be noted that the aforementioned definitions may apply during the present description.

As shown, the interface 3000 may be utilized for viewing media or media as part of a shared group. In one embodiment, the media may be associated with additional metadata such as user comments and/or ratings, etc. Further, in one embodiment, a user may have the ability to display or hide the additional metadata. Additionally, in one embodiment, the user may have the ability to perform other actions such as saving locally, adding/removing media, updating facial meta, indicating facial identifications are incorrect, inviting/disinviting users, adding/removing comments, disabling comments (e.g. for the media, a specific user, a set of users, all users, a group, etc.), and/or various other actions. In one embodiment, clicking on a user picture, name, and/or comment, etc., may cause the display of additional actions such as the display of additional preferences, allowing share/comment, blocking, and/or various other actions.

Figure 31:
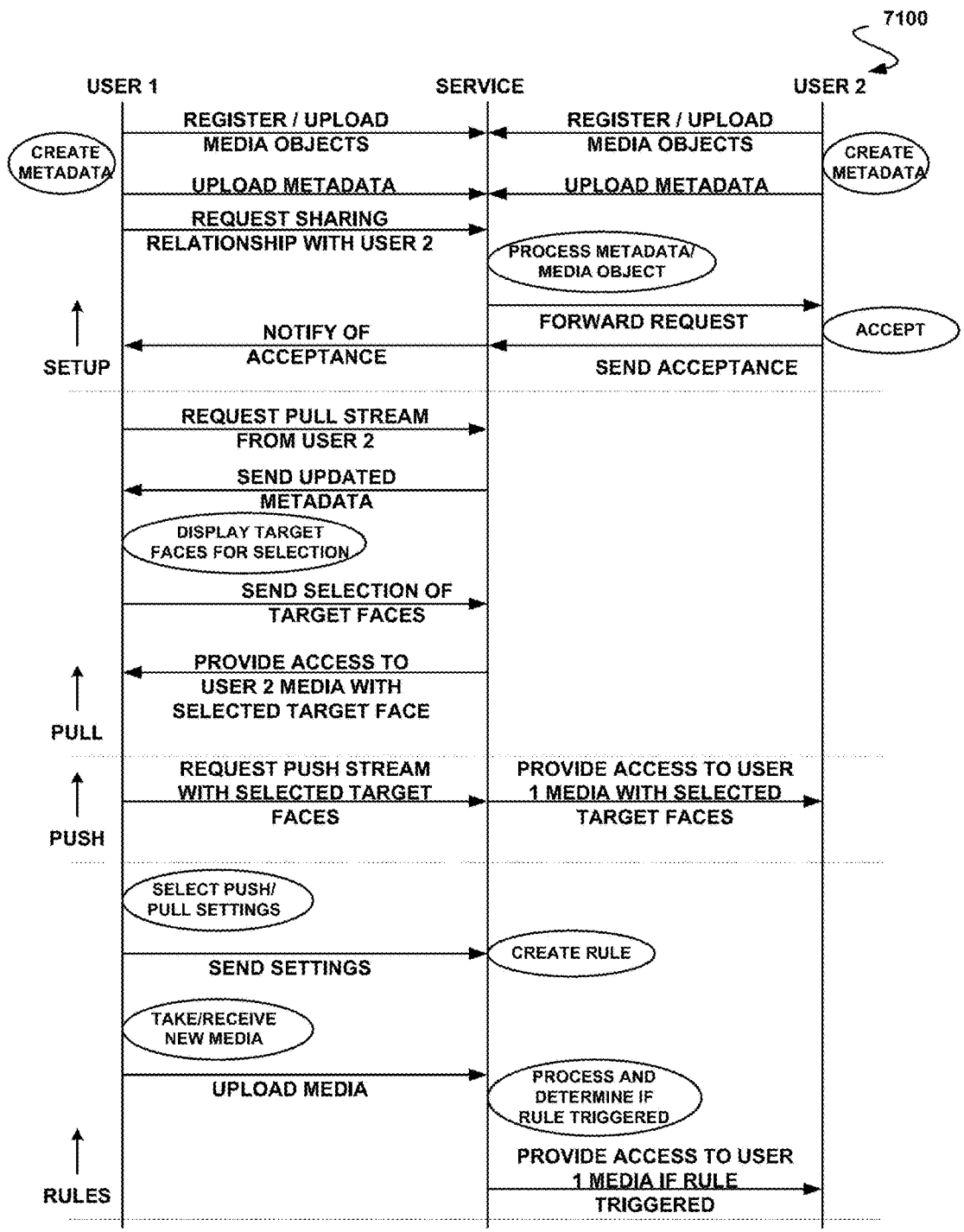
FIG. 31 shows system flow diagram for sharing metadata associated with media objects, in accordance with another embodiment.

FIG. 31 shows system flow diagram 7100 for sharing metadata associated with media objects, in accordance with another embodiment. As an option, the system flow diagram 7100 may be implemented in the context of the architecture and environment of the previous Figures or any subsequent Figure(s). Of course, however, the system flow diagram 7100 may be implemented in the context of any desired environment. It should also be noted that the aforementioned definitions may apply during the present description.

As shown, a first user registers and/or uploads one or more media objects to a service system. Additionally, a second user may or may not register and/or upload one or more media objects to a service system. In one embodiment, the first and possibly the second user may create metadata associated with their corresponding media objects and the metadata may be sent to the service system, utilizing any of the techniques disclosed herein.

Further, the first user may request a sharing relationship with the second user. In one embodiment, the first user may send the sharing request via the service system. Such request may, in one embodiment, be prompted, caused, received, etc. via an application (e.g. mobile application installed on a mobile device) that manages media objects (and/or the sharing thereof). Of course, however, such request may be prompted, caused, received, etc. via a browser or any other application.

In one embodiment, the first user may select a sharing-related icon which, in turn, may result in a display of an interface for receiving textual input identifying the second user [e.g. by name, by address (such as email address, IM address, phone number, etc.), etc.]. Of course, a contact database may be used to facilitate auto-population in connection with the textual input, as desired. As a further option, any settings (e.g. selection of media objects (or a file/folder/grouping thereof), restriction(s), etc.) may be included as input in connection with the interface.

In one embodiment, thereafter, the service system may forward the request to the second user using an associated mode of delivery (e.g. email, IM, text message, in-application message, etc.). In one embodiment, the service system may process metadata and/or the media object, prior to forwarding the request to the second user. In one embodiment, if the second user accepts the invitation, the acceptance may be sent to the service system and the service system may send a notification of acceptance to the first user (by similar or differing mechanisms (such as those disclosed above) with which the request was forwarded, etc.).

While not shown, in connection with (or in response to) any request (and possible acceptance), the second user may or may not be prompted to request a reciprocal sharing relationship of the first user whereby metadata and/or media objects of the second user may be shared with the first user. Upon acceptance of such prompt, a similar (or different) request may be caused to be sent to the first user, as set forth hereinabove.

After a one-way or two-way sharing relationship has been established, any desired technique (e.g. for example, those set forth hereinabove, etc.) may be utilized to initiate, refine, focus, restrict, etc. any sharing of metadata and/or media objects. Again, see, for example, any of such techniques disclosed hereinabove. Such techniques may, in various optional embodiments, include manually-initiated pull mechanisms (which may or may not be automated thereafter), manually-initiated push mechanisms (which may or may not be automated thereafter), rules defined for automatic sharing of metadata and/or media objects, etc.

In one embodiment, the first user may request a pull stream from the second user. In one embodiment, the first user may send the request to the service system. This request may or may not involve identification of the second user (or a subset group including the second user) among a plurality (e.g. list, etc.) of other users already registered as having a sharing relationship with the first user (and/or an indirect sharing relationship). For example, such indirect sharing relationship of the first user may involve a sharing relationship with the second user who has a sharing relationship with a third user who has accepted a general sharing relationship with any person (e.g. first user, etc.) who has a sharing relationship with the second user.

In response to such request, the service system may send updated metadata to the first user. For example, the first user may display potential target faces for selection by the first user. In one embodiment, this may be accomplished via an application associated with a device of the first user, etc. As an option, an interface showing a list or group of such faces may take the form of any of those set forth in any of the previous figures (e.g. FIG. 18, FIG. 29, etc.), but may be configured for selecting target faces for the purpose of requesting/sharing, pushing/pulling, etc. additional pictorial/video media objects associated with such faces.

As an option, the faces shown in the abovementioned interface may include a first set of faces recognized in connection with pictorial/video media objects that reside in the first user's library of media objects (for which metadata has been registered), and/or a second set of faces recognized in connection with pictorial/video media objects that reside in the second user's library of media objects (for which metadata has been registered). In other embodiments, the faces shown in the above interface may be a Boolean operation (e.g. OR operation, AND operation, etc.) associated with the aforementioned first and second set. Of course, the faces shown in the above interface may be reduced (e.g. limited, etc.) based on any restrictions, rules, filters, etc. defined by the first and/or second user. For example, in the context of the present pull embodiment, faces that do not correlate with any pictorial/video media objects that reside in the second user's library of media objects may be filtered out (since there are no such pictorial/video media objects that reside in the second user's library to pull).

Thereafter, the first user may select the target faces (e.g. by clicking, touching, and/or otherwise selecting the pictorial indicia or related indicia, etc.). Still yet, the selection of target faces may then be sent to the service system. In turn, the service system may provide access to photos of the second user that include the selected target faces.

In various embodiments, this may be accomplished by applying the metadata associated with the selected target faces against the pictorial/video media object library of the second user to identify the pictorial/video media objects that match the metadata associated with the selected target faces. In another embodiment, this may be accomplished by comparing names and/or aliases of the metadata associated with the selected target faces against names and/or aliases of metadata already processed in connection with the pictorial/video media object library of the second user, to identify the subject of pictorial/video media objects that have matching names and/or aliases.

In another embodiment, the first user may request a push stream with selected target faces. Of course, any of the techniques disclosed hereinabove with respect to the aforementioned pull system may be employed in connection with the present push mechanism.

In one embodiment, the push request may be sent to the service system. This request may or may not involve identification of the second user (or a subset group including the second user) among a plurality (e.g. list, etc.) of other users already registered as having a sharing relationship with the first user (and/or an indirect sharing relationship). For example, such indirect sharing relationship of the first user may involve a sharing relationship with the second user who has a sharing relationship with a third user who has accepted a general sharing relationship with any person (e.g. first user, etc.) who has a sharing relationship with the second user.

In response to such request, the service system may send updated metadata to the first user. For example, the first user may display potential target faces for selection by the first user. In one embodiment, this may be accomplished via an application associated with a device of the first user, etc. As an option, an interface showing a list or group of such faces may take the form of any of those set forth in any of the previous figures (e.g. FIG. 18, FIG. 29, etc.), but may be configured for selecting target faces for the purpose of requesting/sharing, pushing/pulling, etc. additional pictorial/video media objects associated with such faces.

As an option, the faces shown in the abovementioned interface may include a first set of faces recognized in connection with pictorial/video media objects that reside in the first user's library of media objects (for which metadata has been registered), and/or a second set of faces recognized in connection with pictorial/video media objects that reside in the second user's library of media objects (for which metadata has been registered). In other embodiments, the faces shown in the above interface may be a Boolean operation (e.g. OR operation, AND operation, etc.) associated with the aforementioned first and second set. Of course, the faces shown in the above interface may be reduced (e.g. limited, etc.) based on any restrictions, rules, filter, etc. defined by the first and/or second user. For example, in the context of the present push embodiment, faces that do not correlate with any pictorial/video media objects that reside in the first user's library of media objects may be filtered out (since there are no such pictorial/video media objects that reside in the first user's library to push).

Thereafter, the first user may select the target faces (e.g. by clicking, touching, and/or otherwise selecting the pictorial indicia or related indicia, etc.). Still yet, the selection of target faces may then be sent to the service system. In turn, the service system may provide access to photos of the first user that include the selected target faces, to the second user.

In various embodiments, this may be accomplished by applying the metadata associated with the selected target faces against the pictorial/video media object library of the first user to identify the pictorial/video media objects that match the metadata associated with the selected target faces. In another embodiment, this may be accomplished by comparing names and/or aliases of the metadata associated with the selected target faces against names and/or aliases of metadata already processed in connection with the pictorial/video media object library of the first user, to identify the subject of pictorial/video media objects that have matching names and/or aliases.

To this end, the service system may allow (or provide) the second user access to photos of the first user with the selected faces.

Further, in one embodiment, the first user may select push and/or pull settings and send the settings to the service system. In one embodiment, the service system may create a rule utilizing these settings. Subsequently, the first user may take and/or receive a new picture, and upload the picture to the service system (possibly automatically via a cloud storage service). The service system may then process the photo and determine if the rule is triggered. If the rule is triggered, the service system may provide access to the photo(s) of the first user.

In one embodiment, the media object may be received from a third party or from a camera. For example, in one embodiment, the media object may be received from a data store associated with a camera (e.g. the camera stores to a picture store, then the media object is shared from the media object in the picture store, etc.). In one embodiment, if the media object is received directly from the camera, the media data may be sent to the service directly and may not be not read from the data store (e.g. from buffer memory to asset library, etc.).

In various embodiments, the communication and/or data flow associated with the techniques described herein may be implemented utilizing a variety of system configurations, etc. For example, in various embodiments, media and/or metadata sharing may be implemented by communicating directly from one user to another user, from a user to a service system to another user, utilizing one way communication, via a request, and/or utilizing various other techniques.

It should be noted that, in various optional embodiments, the aforementioned techniques (e.g. pull/push/rule-based sharing mechanisms, etc.) may be implemented as an additional option in connection with a photo-sharing service (e.g. a stream service, etc.). in which case the sharing requests may operate to add photos to an already-existing stream of shared photos that were manually selected for sharing. In such case, various possible features may be implemented to accommodate such environment. For example, a technique may be employed to filter any photos (identified via the aforementioned push/pull/rule-based techniques) when such photos are already included in a particular stream (e.g. to avoid redundancy, etc.). Further, notifications may be sent to receiver of a sharing stream when the stream has been updated. As an option, such notifications may identify and/or highlight: the newly added photos, the names and/or aliases of faces identified in such newly added photos, and/or the names and/or aliases of target faces associated with the push/pull/rule-based sharing mechanism put into place earlier, etc.

As a further option, a plurality of different shared streams of photos may be aggregated, utilizing metadata. For example, a user (of a device which has access to such multiple streams) may be capable of: simply combining a select number of such streams, utilize Boolean operators (e.g. OR operation, AND operation, etc.) to aggregate multiple streams, utilize selected target face selections alone or in combination with other operators (e.g. Boolean) to extract photos having desired subjects, etc. For example, a user may be capable of selecting 3 of 6 available photo sharing streams, select (for inclusion) 3 of 10 target faces (using, for example, the techniques set forth hereinabove), select (for exclusion) 1 of 10 target faces (using, again, the techniques set forth hereinabove); for generating a new photo sharing stream from the contents of just the aforementioned 3 streams and includes only photos that meet the foregoing criteria. Of course, the foregoing techniques may be employed in connection with a generic photo library, as well.

As an example of sharing existing media and/or metadata, an Originating User (O-User) may share metadata and/or media with a Destination User (D-User) by selecting a share option associated with the media/media capturing/display application and then selecting a D-User option. The media/metadata may be sent from the O-User device to the D-User device, and the D-User device may display the media, add to a group, album, etc., for later viewing. The D-User may change/add/remove metadata associated with the shared media, and the D-User device may communicate the changed metadata back to the O-User. Based on preferences, the O-User may incorporate/add/import/etc. the changed metadata in association with the media.

As one example of automatically sharing media/metadata that was just generated, an O-User may take a photo that includes D-User. The device of O-User may identify known faces in the photo and may identify D-User in the photo. Based on a preference associated with photos and D-User, the device of the O-User may automatically send the media/metadata to the device of the D-User. Additionally, preferences associated with taking new photos may indicate that the photo should be shared with other users that are included in the photo, related to the photo, or set to receive all new photos from the user. Further, prior to sharing, the O-User may have to confirm the users/groups that the media/metadata will be sent to prior to sending. The O-User may have an option to add additional metadata (e.g. comments, notes, rating, identified users, etc.), prior to sending.

As one example of requesting metadata from a user, an O-User may send a request to known/previously associated users requesting updated metadata associated with photos. The O-User request may include a request for at least one user identifier (e.g. a request for face metadata for identifying Joe User, etc.). The O-User may request metadata for a set of users, for a given photo, a set of photos, etc. The users who receive the request may automatically send the metadata to the O-User based on a preference, based on a manual confirmation, etc. The O-User may receive each response and incorporate that metadata into the overall set of metadata for a particular user associated with the media/request.

As an example of requesting metadata from a service, an O-User may send a request to a service for a set of metadata matching a requested user or set of users, set of media, etc. The service may respond with a set of metadata describing any matching requests, and the O-User may incorporate that metadata into the overall set of metadata for a particular user associated with the media/request.

As an example of sharing metadata with a service, an O-User may share a set of metadata with a service. For example, the O-User may train facial recognition metadata that may be utilized to identify a particular user. The O-User may utilize a selected set of media, selected set of faces associated with the media, and manually edit the metadata, etc., in order to generate the facial recognition metadata. Once updated, the device associated with the O-User may send the facial recognition metadata associated with a user to the service for incorporation into the service's store of facial recognition metadata. The facial recognition metadata may include the user identifier, and be transmitted with a user identifier, etc. The user identifier may be generated by the service, or by the O-User, etc. The user identifier may be associated with other sets of facial recognition metadata stored at the service (e.g. two users create facial recognition metadata for Joe User, and the service links those two sets together and may create an hybrid/best facial recognition metadata for Joe User, which may then be shared with the contributing users, etc.).

As one example of sharing media/metadata with a group, an O-User may share media/metadata with at least one group based on preferences associated with the media. For example, an O-User may have a preference associated with a photo media type that indicates any new photos taken at/around a specified location/time should be added to a specific group. Additionally, another preference may indicate that a photo including Joe User should be added to a group that includes Joe User. Thus, when O-User takes a photo, the photo may be automatically added to the specified groups via a notification (including photo/metadata) to a service of a new photo, and the service may add the photo to the groups. Further, if the O-User has requested, the photo may be encrypted and a sharing key may be stored with the service. Additionally, based on a preference of the receiving user that is a member of the specified group, the photo may be copied to the receiving user's device. Further, if encrypted, the key may be copied as well. The receiving user may also have a preference to receive a link to the resource, and the service may deliver the photo to the receiving user when requested for delay. In this situation, the service may handle the decrypting of the photo. At any time, the O-User may indicate that the photo should be made private, deleted, not shared, removed from group, etc. and the service may delete the decryption key/and the media. In one embodiment, it may be suggested that the receiving device check the service for a revoked decryption key prior to displaying (e.g. per display, session, time period, etc,) to ensure that photos requested for deletion are not displayed.

As an example of searching for media/metadata, User A may search another user's (e.g. User B, etc.) media/metadata for media/metadata matching a search. The User B media may be located on a service or on a device associated with User B. The User B may have indicated a search/sharing preference associated with the User A Media that may be stored on the User A device or the service. When User B searches, the service/device may confirm the sharing of User A's media (e.g. included, related, all, etc.) with User B, and then User B may be able to search for matching media. Matching media may be added to a shared group, and/or copied to the User B device. Additionally, User B may add metadata associated with the searched media, etc.

As another example, if a photo is taken of a new user, the service system and/or an application on a user device may search contacts/relationships of an existing user for matches. In one embodiment, this may include utilizing a service (e.g. send media to service, receive back some suggestions based on existing relationships, etc.) to identify the user. In various embodiments, contacts in social media applications/services, emails, address book information, phone history information, text/SMS history information, and/or any information source that may include a name/identifier for a person may be utilized for suggest an identification associated with a new face. In one embodiment, the user may override the automatic suggestion and enter the name manually. Once the face is identified, the service and/or other sources may be updated with metadata associated with the identification.

It should be noted that, in the context of FIG. 31, and any other figures, for that matter, sending and/or receiving metadata and/or media objects may involve sending and/or receiving any signal (including or not including the metadata and/or media objects) that results in making the metadata and/or media objects available to desired user.

FIGS. 71A-71N show a variety of user interfaces for sharing media objects and/or related information (e.g. metadata, etc.), in accordance with a variety of embodiments. As an option, any combination of one more user interfaces (or portion(s) thereof) shown in such figures may or may not be implemented in the context of any one or more features shown in FIGS. 71A-71N, the previous Figures, and/or any subsequent Figure(s).

Figure 31A:
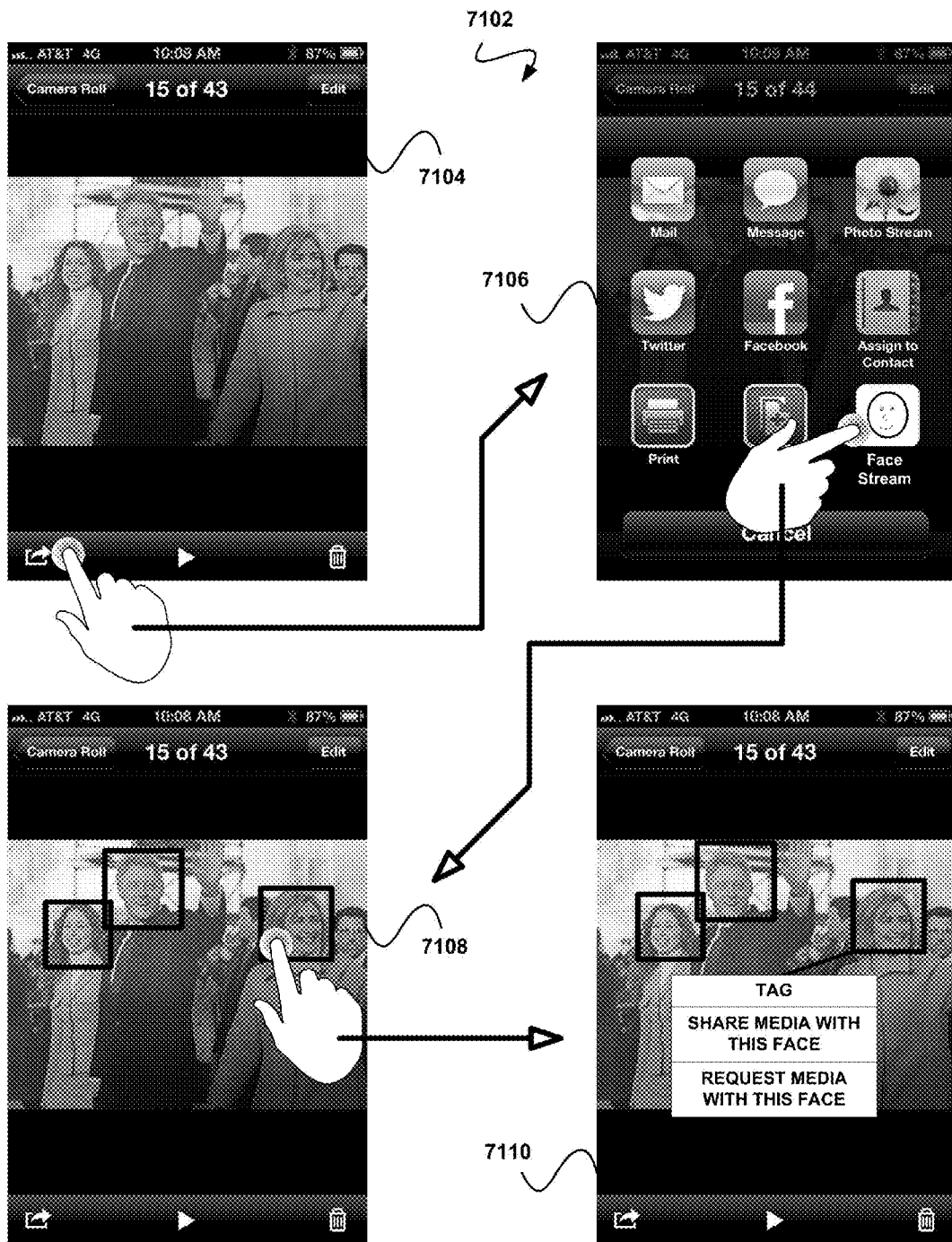
FIG. 31A shows a user interface for sharing metadata associated with media objects, in accordance with another embodiment.

FIG. 31A shows a user interface 7102 for sharing metadata associated with media objects, in accordance with another embodiment. As an option, the user interface 7102 may be implemented in the context of the architecture and environment of the previous Figures or any subsequent Figure(s). Of course, however, the user interface 7102 may be implemented in the context of any desired environment. It should also be noted that the aforementioned definitions may apply during the present description.

As shown, a photo interface 7104 may be displayed. In various embodiments, the photo interface may include displaying one or more photos (e.g. from a gallery of photos, from an application, etc.). In one embodiment, one photo may be displayed. In another embodiment, more than one photo may be displayed (e.g. as thumbnails, variable sized images, etc.). Additionally, sharing options associated with the one or more photos may be the same. In other embodiments, the sharing options may be dependent on the context of the photo (s). For example, in one embodiment, a sharing option of one photo may include an immediate ability to edit and send (e.g. via email, chat, online service, etc.) the photo. In another embodiment, a sharing option of two or more photos may include an ability first to select the applicable photos desired to share (e.g. all, individually selected photos, etc.).

In one embodiment, the one or more photos may be displayed in a grid, as a list (e.g. text only list, thumbnail preview next to text, etc.), or in any manner. In another embodiment, the one or more photos may be associated with a local (e.g. cached on the phone, etc.) photo application (e.g. camera roll, camera, gallery, etc.), with a non-local photo application (e.g. Flickr, Facebook, Snapseed, etc.), and/or with any other application which may include a camera and/or may relate to photos in any manner.

As shown, a user may select to share the displayed one or more photo, and a sharing interface 7106 may be displayed. In various embodiments, the sharing interface may include ability to mail, message, photo stream (e.g. online synchronization of captured images, etc.), interact with Twitter, interact with Facebook, assign to a contact, print (e.g. to local or networked printer, etc.), copy, ability to face stream, bump (e.g. send via Direct WiFi and/or NFC to another device, etc.), ePrint (e.g. print to remote printer, etc.), backup (e.g. Dropbox, etc.), and/or share the photo in any other manner.

In one embodiment, the ability to face stream may include the ability to identify one or more faces in a photo or photos. Additionally, face stream may provide the ability to edit metadata associated with each of the identified faces, ability to identify unconfirmed and/or unrecognized faces, ability to share one or more media with a face, ability to request media with a face, ability to tag a face (e.g. input other relevant criteria associated with the photo and/or the face, etc.), and/or input any other information which may relate to the one or more faces.

As shown, face stream may be selected and a first face stream interface 7108 may be displayed. In various embodiments, one or more faces may be detected based on facial recognition training data. For example, in various embodiments, the metadata may include data associated with a matrix, a heuristic, a vector, a face mesh, a geometry of data points, proportions of data points, color of a face and/or hair and/or eyes, skin features, and/or other identifying features, etc. In various embodiments, the data points may include at least one of a location of each eye, a nose location, a mouth location, and/or eye brow locations, etc.

Additionally, in one embodiment, the user of the interface 800 may be capable of defining a boundary of an undetected face. For example, in one embodiment, the user may have the ability to draw a box (or circle, irregular shape, any shape, etc.) around a face to define the face boundary. In one embodiment, the user may have the ability to resize the boundary. In another embodiment, the user may have the ability to resize the face captured by the boundary. Further, in various embodiments, the boundaries of an face may be detected using at least one of an app, an OS/Platform native utility, an algorithm, heuristics, an online service, etc.

In various embodiments, the one or more faces may be identified from metadata associated with the user's device (e.g. cached metadata, etc.), from metadata associated with another device (e.g. cached metadata on a friend's device, metadata on a central device, etc.), from metadata associated with an online service (e.g. Facebook, Flickr, etc.), from metadata associated with an app (e.g. downloaded and installed on the user's device, etc.), and/or from any other source. In another embodiment, metadata may be requested (e.g. upon opening the photo, etc.) from one or more devices near (e.g. within a set geographic proximity, etc.) the user. Additionally, in another embodiment, metadata may be received from one or more devices based on a trigger. For example, a trigger may include coming within a set geographic proximity (e.g. 20 feet, etc.) of the user, taking a photo, editing a photo, editing metadata (e.g. associated with the user, content, app, etc.), interacting in some manner (e.g. bump, etc.) with the user's device, and/or taking any other action which would cause metadata to be pushed to the user's device. Of course, any action may be preconfigured to act as a trigger to pushing metadata. In other embodiments, triggers and/or actions may be customized as desired by the user.

As shown, after one or more face boundaries have been identified, a face may be selected and one or more options 7110 relating to the face may be displayed. In various embodiments, the one or more options may include an ability to tag, ability to share media with the selected face, ability to request media with the selected face, and/or select any other option relating to a selected face. In one embodiment, the selected face may be associated with an individual (e.g. an actual person, etc.). In other embodiments, the selected face may be associated with inanimate objects (e.g. statues, figurines, etc.). As such, based off of the context of the image (e.g. geocaching, location, surroundings, etc.), the one or more options may include an ability to identify the inanimate object, receive information associated with the inanimate object (e.g. history, tour, etc.), and/or interact with the inanimate object in any manner.

In a separate embodiment, face boundary detection tools may be used to identify objects without a face (e.g. known structures, inanimate objects, etc.). For example, in one embodiment, the Taj Mahal may be identified (e.g. based on physical characteristics, etc.). After identification and selection, one or more options may be presented to the user, including the ability to learn more about the Taj Mahal, ability to navigate around the Taj Mahal (e.g. by an augmented reality tour, etc.) and/or interact with the object in any manner.

Further, in various embodiments, metadata associated with an object (e.g. Taj Mahal, etc.) may be improved by user interaction. For example, users may take photos of the Taj Mahal (or detailed photos of some aspect of it), identify the features associated with the object (e.g. turret, dome, etc.), and save the metadata. In one embodiment, metadata associated with public objects (e.g. available to all, etc.) may be uploaded to a central database (e.g. online service, wiki, etc.).

Of course, in other embodiments, metadata associated with the photo may include permission settings (e.g. private designation, public designation, etc.), ability for another user to modify the metadata, and/or ability to control in any manner the inputted information.

Figure 31B:
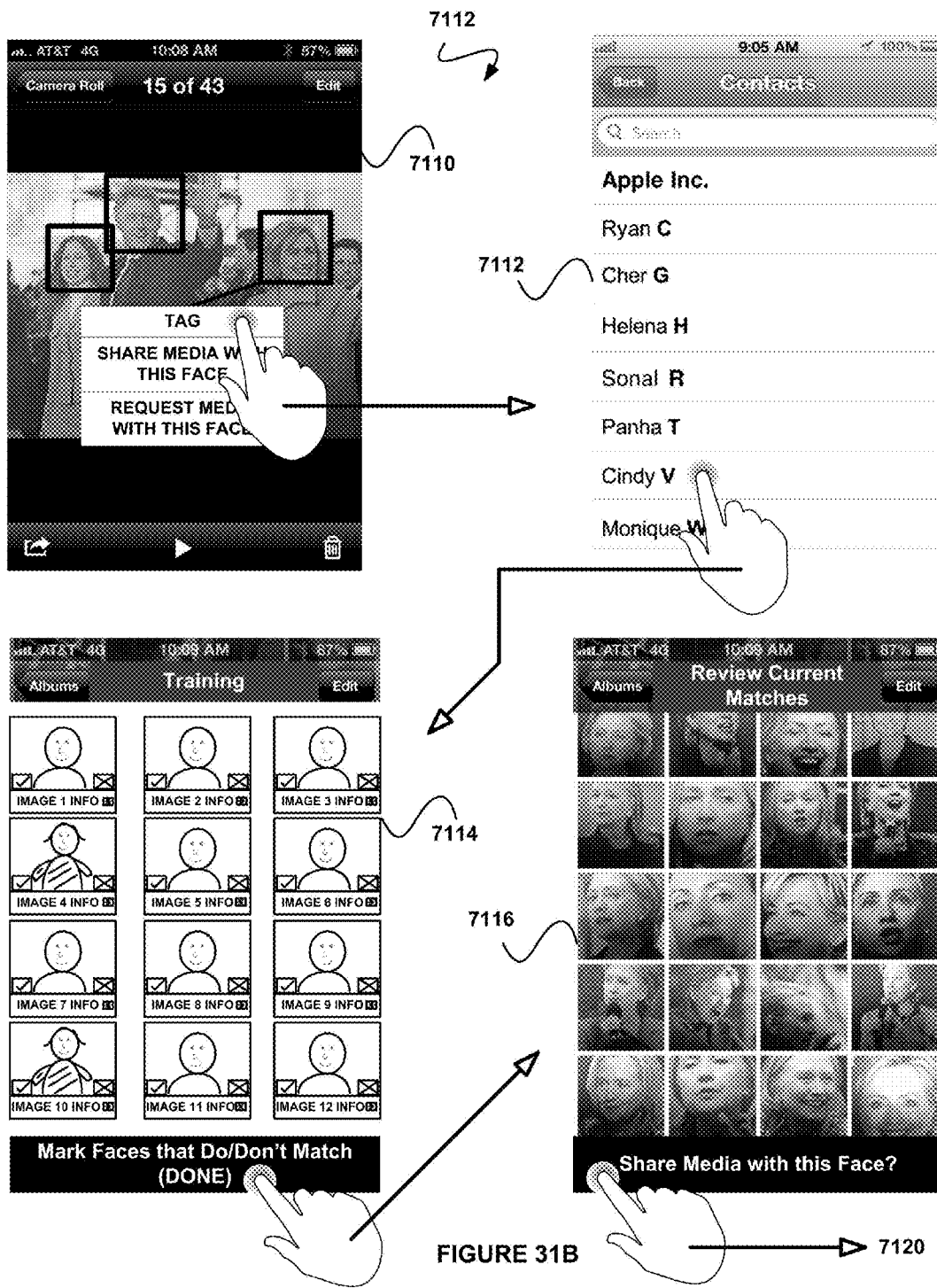
FIG. 31B shows a user interface for sharing metadata associated with media objects, in accordance with another embodiment.

FIG. 31B shows a user interface 7112 for sharing metadata associated with media objects, in accordance with another embodiment. As an option, the user interface 7112 may be implemented in the context of the architecture and environment of the previous Figures or any subsequent Figure(s). Of course, however, the user interface 7112 may be implemented in the context of any desired environment. It should also be noted that the aforementioned definitions may apply during the present description.

As shown, a face may be selected and one or more options 7110 relating to the face may be displayed. In various embodiments, the one or more options may include an ability to tag, ability to share media with the selected face, ability to request media with the selected face, and/or select any other option relating to a selected face. In one embodiment, the selected face may be associated with an individual (e.g. an actual person, etc.). Additionally, a tag option may be selected and a contact interface 7113 may be displayed.

In one embodiment, a contact associated with the user (e.g. of the mobile device, of the desktop, etc.) may be selected to be associated with the selected face. In various embodiments, a contact may be selected from an online database (e.g. Facebook, etc.), from one or more secondary devices (e.g. another device connected to the user's mobile device, a central network database, etc.), etc. In one embodiment, the list of displayed contacts may be organized by relevancy. For example, in one embodiment, the contacts first displayed may include users who are currently connected or near (e.g. via Bluetooth, via Direct Wifi, via GPS positioning, etc.) the user's mobile device. Of course, the contacts may be displayed in any manner.

As shown, after selecting a contact to tag to a face, a training interface 7114 may be displayed. In various embodiments, the training interface may include providing multiple facets of metadata, including facial recognition training data. For example, in various embodiments, the metadata may include data associated with a matrix, a heuristic, a vector, a face mesh, a geometry of data points, proportions of data points, color of a face and/or hair and/or eyes, skin features, and/or other identifying features, etc. In various embodiments, the data points may include at least one of a location of each eye, a nose location, a mouth location, and/or eye brow locations, etc.

In various embodiments, the user may be presented with one or more photos associated with the selected contact. In one embodiment, the displayed photos may be aggregated based on photos the user of the mobile device has taken. In other embodiments, the displayed photos may be pulled from an online database, a search engine, a wiki, a social network (e.g. Facebook, etc.), one or more secondary devices, and/or from any other source.

In one embodiment, the user may select to confirm or decline each displayed photo. In various embodiments, after the user selects to confirm or decline, confirmation of the selection may include bolding the box associated with the confirm or decline selections, shading the photo (e.g. if selected, the photo may be highlighted; if declined, the photo may be darkened; etc.), creating a list of approved photos, and/or interacting with the photos in any manner.

In various embodiments, any number of photos may be displayed to the user for training. In some embodiments, the number of photos may be limited due to a lack of photos (e.g. on the user's mobile device, on the online server, etc.). In other embodiments, the user may scroll through any number of photos to confirm and/or decline. In various embodiments, information may be displayed associated with each photo, including the name of the photo, metadata (e.g. location, name of face, time, date, photographer, etc.) associated with the photo, and/or any other information associated with the photos.

In some embodiments, the training interface may be interactive. For example, in one embodiment, after a user selects to decline one or more photos, such declined photos may be automatically replaced with another potential photo. In other embodiments, the training may be composed of more than one interface wherein each subsequent interface after the initial interface further refines the metadata characteristics of the face (e.g. an interface may be dedicated to select photos of the ear or another part of the head, etc.).

Additionally, in another embodiment, the training interface may be integrated into an online portal. For example, in various embodiments, the online portal may include a portal associated with a website address, a portal access through a mobile device app, a portal integrated into the mobile device platform, and/or any other portal which may be associated with the internet.

As shown, after confirming and/or declining the one or more displayed images, the done button may be selected and a review current matches interface 7116 may be displayed. In various embodiments, the review current matches interface may include one or more confirmed photos (e.g. those confirmed from the training interface, etc.), an aggregate of all confirmed photos (e.g. a scattered collage, etc.), a representative photo (e.g. the best photo of the contact, etc.), and/or any other display of the contact.

In one embodiment, the review current matches interface may provide a button to edit the photos. In such an embodiment, the edit button may go back to the training interface where the user can further confirm and/or decline the photos. In another embodiment, the user may remain on the review current matches interface and decline photos that are displayed.

Figure 31C:
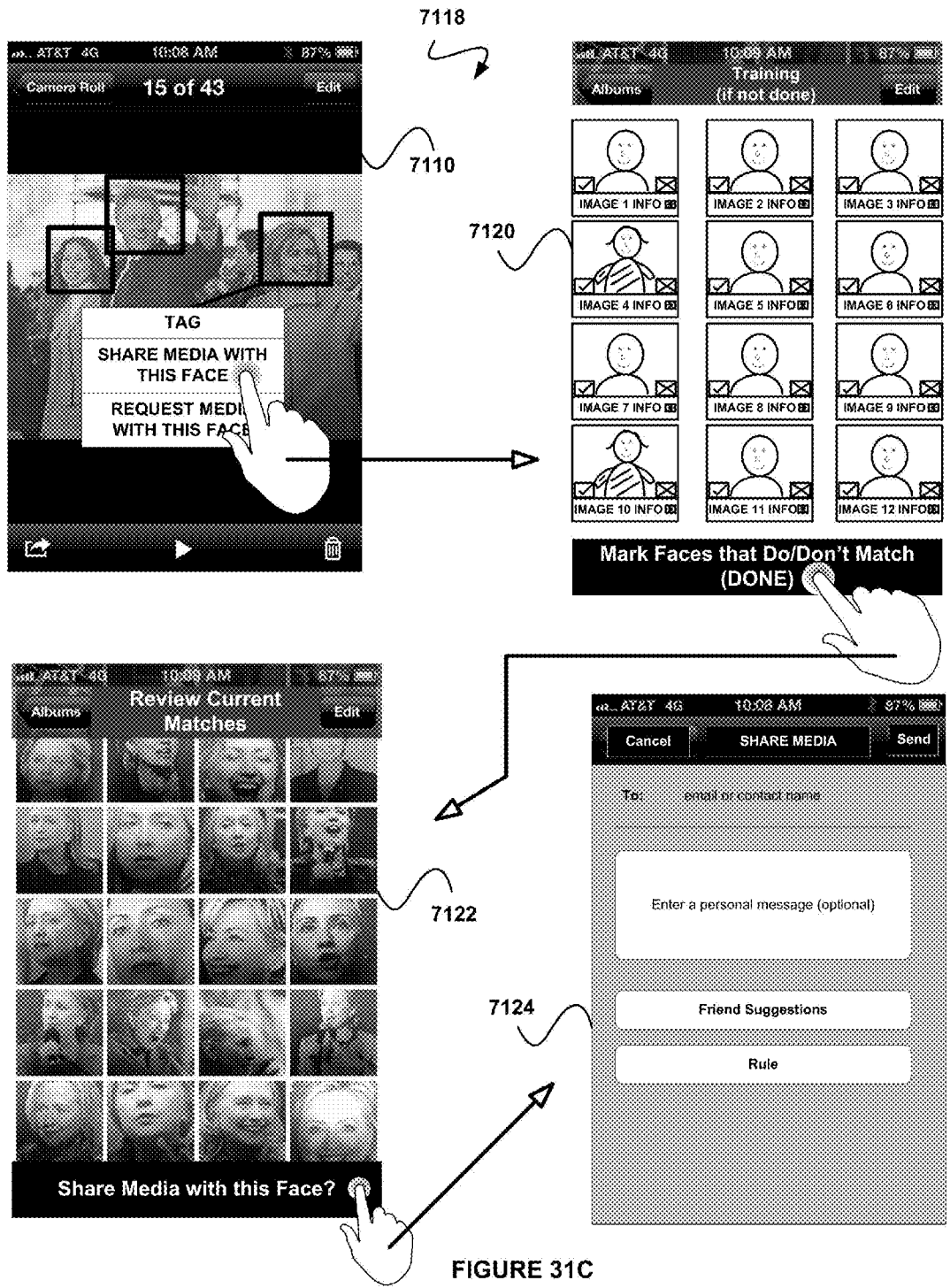
FIG. 31C shows a user interface for sharing metadata associated with media objects, in accordance with another embodiment.

If the displayed photos are acceptable to the user (e.g. the photos correlate with the contact, etc.), a "share media with this face" option may be selected, and a share media interface 7124 of FIG. 31C may be displayed.

FIG. 31C shows a user interface 7118 for sharing metadata associated with media objects, in accordance with another embodiment. As an option, the user interface 7118 may be implemented in the context of the architecture and environment of the previous Figures or any subsequent Figure(s). Of course, however, the user interface 7118 may be implemented in the context of any desired environment. It should also be noted that the aforementioned definitions may apply during the present description.

As shown, a face may be selected and one or more options 7110 relating to the face may be displayed. In various embodiments, the one or more options may include an ability to tag, ability to share media with the selected face, ability to request media with the selected face, and/or select any other option relating to a selected face. In one embodiment, the selected face may be associated with an individual (e.g. an actual person, etc.). Additionally, a share media with this face option may be selected and a training interface 7120 may be displayed.

In one embodiment, the training may be dependent on whether the user has previously given input relating to the face. For example, in one embodiment, the user may have already confirmed and/or declined relevant photos associated with the face. In other embodiments, training may be completed by the user or by another contact. For example, user A may have completed the training for contact B, confirming the relevant and applicable photos. At a later time period, user C may take a photo of contact B, and select to share media with the face. The training relating to contact B may be optional if user C has access (e.g. is associated with, has access to a shared online database, etc.) to the metadata completed by user A.

In another embodiment, even if training has been previously completed, the user may still go through the training to select more relevant photos associated with the contact. In some embodiments, the user may override metadata previously selected by another user. In one embodiment, the user's selection of relevant photos may be associated with a timestamp for relevancy (e.g. relevant photos may be dependent on the age of the contact, etc.). In a further embodiment, completing additional training associated with a face may help to further refine the accuracy of matching a face to a contact identity.

In various embodiments, the training interface may include providing multiple facets of metadata, including facial recognition training data. For example, in various embodiments, the metadata may include data associated with a matrix, a heuristic, a vector, a face mesh, a geometry of data points, proportions of data points, color of a face and/or hair and/or eyes, skin features, and/or other identifying features, etc. In various embodiments, the data points may include at least one of a location of each eye, a nose location, a mouth location, and/or eye brow locations, etc.

In various embodiments, the user may be presented with one or more photos associated with the selected contact. In one embodiment, the displayed photos may be aggregated based on photos the user of the mobile device has taken. In other embodiments, the displayed photos may be pulled from an online database, a search engine, a wiki, a social network (e.g. Facebook, etc.), one or more secondary devices, and/or from any other source.

In one embodiment, the user may select to confirm or decline each displayed photo. In various embodiments, after the user selects to confirm or decline, confirmation of the selection may include bolding the box associated with the confirm or decline selections, shading the photo (e.g. if selected, the photo may be highlighted; if declined, the photo may be darkened; etc.), creating a list of approved photos, and/or interacting with the photos in any manner.

In various embodiments, any number of photos may be displayed to the user for training. In some embodiments, the number of photos may be limited due to a lack of photos (e.g. on the user's mobile device, on the online server, etc.). In other embodiments, the user may scroll through any number of photos to confirm and/or decline. In various embodiments, information may be displayed associated with each photo, including the name of the photo, metadata (e.g. location, name of face, time, date, photographer, etc.) associated with the photo, and/or any other information associated with the photos.

In some embodiments, the training interface may be interactive. For example, in one embodiment, after a user selects to decline one or more photos, such declined photos may be automatically replaced with another potential photo. In other embodiments, the training may be composed of more than one interface wherein each subsequent interface after the initial interface further refines the metadata characteristics of the face (e.g. an interface may be dedicated to select photos of the ear or another part of the head, etc.).

Additionally, in another embodiment, the training interface may be integrated into an online portal. For example, in various embodiments, the online portal may include a portal associated with a website address, a portal access through a mobile device app, a portal integrated into the mobile device platform, and/or any other portal which may be associated with the internet.

As shown, after confirming and/or declining the one or more displayed images, the done button may be selected and a review current matches interface 7122 may be displayed. In various embodiments, the review current matches interface may include one or more confirmed photos (e.g. those confirmed from the training interface, etc.), an aggregate of all confirmed photos (e.g. a scattered collage, etc.), a representative photo (e.g. the best photo of the contact, etc.), and/or any other display of the contact.

In one embodiment, the review current matches interface may provide a button to edit the photos. In such an embodiment, the edit button may go back to the training interface where the user can further confirm and/or decline the photos. In another embodiment, the user may remain on the review current matches interface and decline photos that are displayed.

If the displayed photos are acceptable to the user (e.g. the photos correlate with the contact, etc.), a "share media with this face" option may be selected, and a share media interface 7124 may be displayed. In one embodiment, the share media interface may include ability to select an email, contact name, and/or any identification means associated with a contact (e.g. screen name, etc.). Additionally, in one embodiment, a personal message may be inputted. In other embodiments, a data item (e.g. file, document, photo, video, voice message, etc.) may be attached to the share media item (or to the personal message, etc.).

In various embodiments, a friend suggestions option may be displayed, which may include a recommendation of possible relevant contacts (e.g. those whose image is included in the photo, etc.), a suggestion of a networked friend (e.g. a friend the user may be connected to through one or more other friends, etc.), a suggestion based off of a nearby device (e.g. associated with a contact or friend, etc.), and/or any other recommendation which may be associated with a friend.

In another embodiment, a rule option may be displayed, which may include the ability to select a relationship (e.g. user A is related to user B and user C, etc.). In other embodiments, a rule may permit a user to select a profile, image, icon, or name associated with another user and to set preferences associated with the other user. In various embodiments, the preferences may include photo sharing, video sharing, web sharing, application sharing, and/or any other preferences.

In one embodiment, clicking on or selecting a preference (e.g. a preference name, icon, etc.) may display additional preferences. For example, in one embodiment, selecting a photo preference may cause the display of additional options to share media and/or metadata associated with the media. In another embodiment, selecting an application preference may cause the display of additional preferences associated with the category of applications. Still yet, in one embodiment, selecting a profile, image, icon, and/or name associated with a user displayed on the interface may allow for metadata associated with a profile, image, and/or user to be edited. Of course, in another embodiment, the selection of any type of media may allow for editing of metadata associated with that media.

In one embodiment, at least one person may be identified in the media object (e.g. an image, a video, etc.). Further, it may be determined whether the identified at least one person is associated with a second user in accordance with the rule. In one embodiment, the rule may indicate that the at least one person is associated with the second user when the at least one person is the second user. In another embodiment, the rule may indicate that the at least one person is associated with the second user when the at least one person has a relationship with the second user. In another embodiment, the rule may indicate that the at least one person is associated with the second user when the at least one person has a relationship with a third user that has a relationship with the second user. Still yet, in one embodiment, the sharing of the media object may be conditioned on the identification of the at least one person in the media object.

In one embodiment, the rules may be included in the metadata. In another embodiment, rule identifiers may be included in the metadata. In another embodiment, a link to the rules may be included in the metadata. In another embodiment, the rules may be included in a service system. In another embodiment, the rules may be stored on a user device. Further, in one embodiment, a user identifier may be utilized to look up associated rules. Of course, in various embodiments, the rules may be stored in any suitable location and/or may be accessed utilizing any suitable identifier. In one embodiment, the rules may accompany the media object and/or the metadata.

Further, in one embodiment, after the user completes inputting a personal message and/or selecting a friend suggestion or configuring a rule, the user may select to send the media and/or message. In one embodiment, the media may be sent to an email address, a screen name (e.g. chat name, etc.), a blog, an online database (e.g. Dropbox, etc.) and/or shared in any other manner. In another embodiment, the media may be shared using another app (e.g. social media app, file sharing app, email app, etc.). Of course, the media and/or message may be shared in any manner.

Figure 31D:
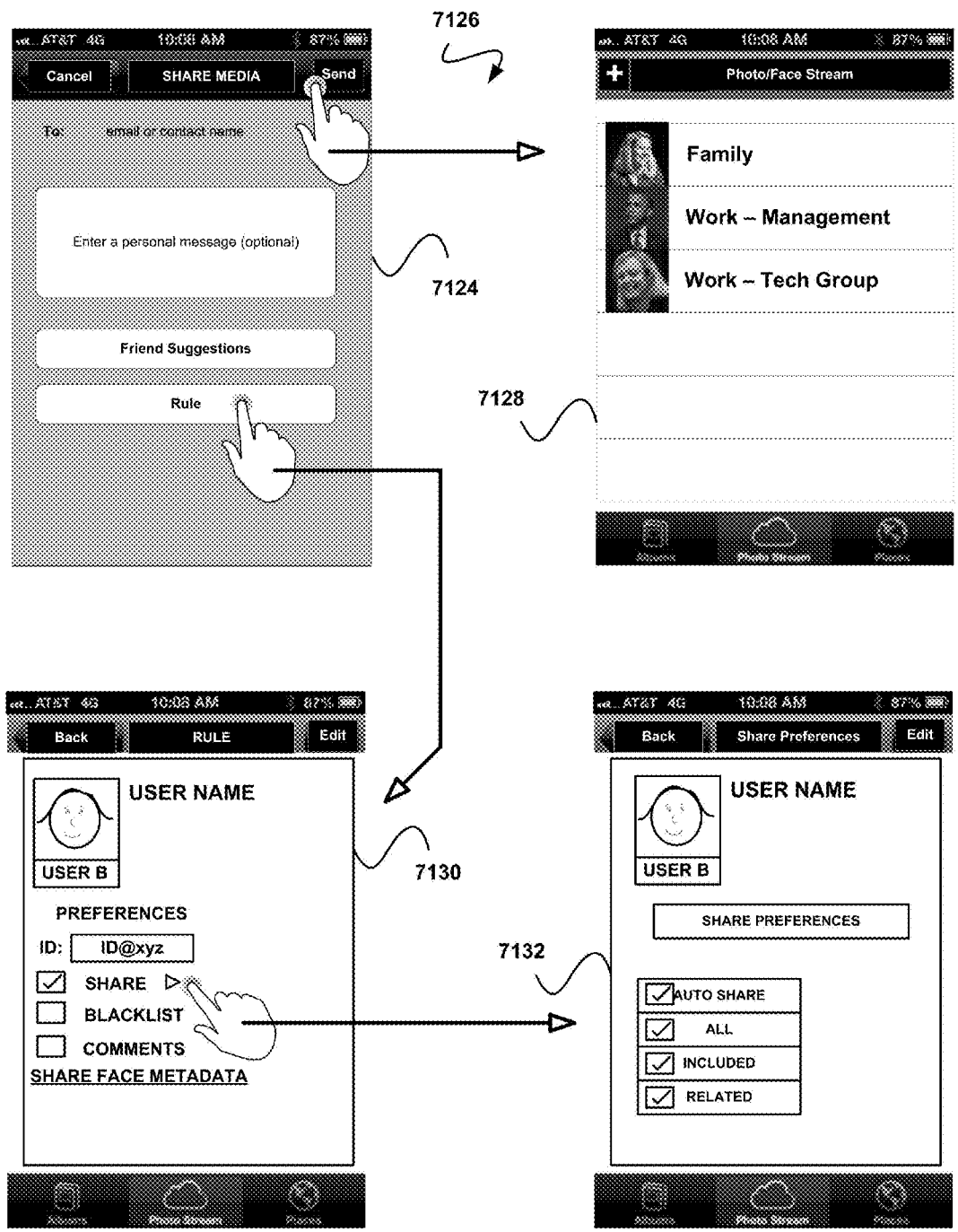
FIG. 31D shows a user interface for sharing metadata associated with media objects, in accordance with another embodiment.

FIG. 31D shows a user interface 7126 for sharing metadata associated with media objects, in accordance with another embodiment. As an option, the user interface 7126 may be implemented in the context of the architecture and environment of the previous Figures or any subsequent Figure(s). Of course, however, the user interface 7126 may be implemented in the context of any desired environment. It should also be noted that the aforementioned definitions may apply during the present description.

As shown, in one embodiment, a share media interface 7124 may be displayed. Additionally, a "send" option may be selected resulting in photo/face stream interface 7128. In one embodiment, the photo/face stream interface may include a list of individual contacts, a group of contacts (e.g. predetermined groups, automatic group configuration based on relevancy and/or metadata tags, etc.), and/or any other grouping of one or more contacts.

In one embodiment, it may be determined that a photo contains the face of an individual associated with the user's work place. After selecting to send the photo, the user may be presented with a group entitled "Work-Management" or "Work-Tech Group" and/or any other relevant group. In one embodiment, the presenting of such groups may be based off of a determination that the selected face is, for example, an executive at the user's work company. Metadata associated with the face (e.g. management team, tech group, work, etc.) therefore may be used to create ad-hoc groups. In various embodiments, ad-hoc groups may be created on demand, may last for a temporary period of time (e.g. as needed by the demand, etc.), and/or may be used in any manner by the user.

As shown in share media interface 7124, a rule option may be selected, and a rule interface 7130 may be displayed. In one embodiment, the rule may include setting an id (e.g. email, chat name, social networking name, alias, etc.), setting sharing permissions, placing the user on a blacklist, regulating comments (e.g. made by the user, uploaded to the user's account, etc.), ability to share metadata associated with the selected face, and/or take any other action associated with the selected face.

In one embodiment, a rule option may include the ability to select a relationship (e.g. user A is related to user B and user C, etc.). In other embodiments, a rule may permit a user to select a profile, image, icon, or name associated with another user and to set preferences associated with the other user. In various embodiments, the preferences may include photo sharing, video sharing, web sharing, application sharing, and/or any other preferences.

In one embodiment, clicking on or selecting a preference (e.g. a preference name, icon, etc.) may display additional preferences. For example, in one embodiment, selecting a photo preference may cause the display of additional options to share media and/or metadata associated with the media. In another embodiment, selecting an application preference may cause the display of additional preferences associated with the category of applications. Still yet, in one embodiment, selecting a profile, image, icon, and/or name associated with a user displayed on the interface may allow for metadata associated with a profile, image, and/or user to be edited. Of course, in another embodiment, the selection of any type of media may allow for editing of metadata associated with that media.

Additionally, in one embodiment, at least one person may be identified in the media object (e.g. an image, a video, etc.). Further, it may be determined whether the identified at least one person is associated with a second user in accordance with the rule. In one embodiment, the rule may indicate that the at least one person is associated with the second user when the at least one person is the second user. In another embodiment, the rule may indicate that the at least one person is associated with the second user when the at least one person has a relationship with the second user. In another embodiment, the rule may indicate that the at least one person is associated with the second user when the at least one person has a relationship with a third user that has a relationship with the second user. Still yet, in one embodiment, the sharing of the media object may be conditioned on the identification of the at least one person in the media object.

Still yet, in one embodiment, the rules may be included in the metadata. In another embodiment, rule identifiers may be included in the metadata. In another embodiment, a link to the rules may be included in the metadata. In another embodiment, the rules may be included in a service system. In another embodiment, the rules may be stored on a user device. Further, in one embodiment, a user identifier may be utilized to look up associated rules. Of course, in various embodiments, the rules may be stored in any suitable location and/or may be accessed utilizing any suitable identifier. In one embodiment, the rules may accompany the media object and/or the metadata.

As shown, an option to set "share" permissions may be selected, and a share preferences interface 7132 may be displayed. In one embodiment, one or more sharing options may be displayed, including the ability to automatically share content (e.g. with the user, associated with the user, etc.), share all media, share media where the user is included, share media that is related to the user, and/or various other options, etc.

In one embodiment, users may establish sharing preferences for media objects. Furthermore, in one embodiment, users may establish sharing preferences for particular devices. For example, User A, User B, and User C may be known and have a sharing preference associated with themselves and their devices. On the other hand, User D and User E may not be known and may not or have known sharing preferences.

In this example, when a picture of the users is captured, faces A, B, and C may be identified (along faces D and E, in one embodiment, based on facial recognition, etc.). In one embodiment, rules may indicate to share media and/or metadata with the users associated with faces A, B, and C. Accordingly, media and/or metadata may be sent to devices of User A, User B, and User C for viewing, etc.

In one embodiment, the application on the device of the user (and/or a service, etc.) may identify the users based on the rules. In one embodiment, the rules may be stored locally (e.g. on the user device, etc.) and/or at service system (e.g. a network system, etc.). In one embodiment, the user devices and the service system may be synchronized such that updated rules (e.g. and metadata, etc.) are present at the user devices and the service system. In one embodiment, the service system may determine whether to send the media, the metadata, a link to the media or metadata, and/or a reference to the media or metadata to the user devices.

In one embodiment, the sharing preferences may be synced and/or uploaded to an online sharing database system. For example, in various embodiments, the sharing preferences may be associated with a social media site (e.g. Facebook, etc.), an online file sharing and/or backup platform (e.g. Dropbox, etc.), a sharing management site or app, and/or any other system which may manage one or more sharing preferences.

Figure 31E:
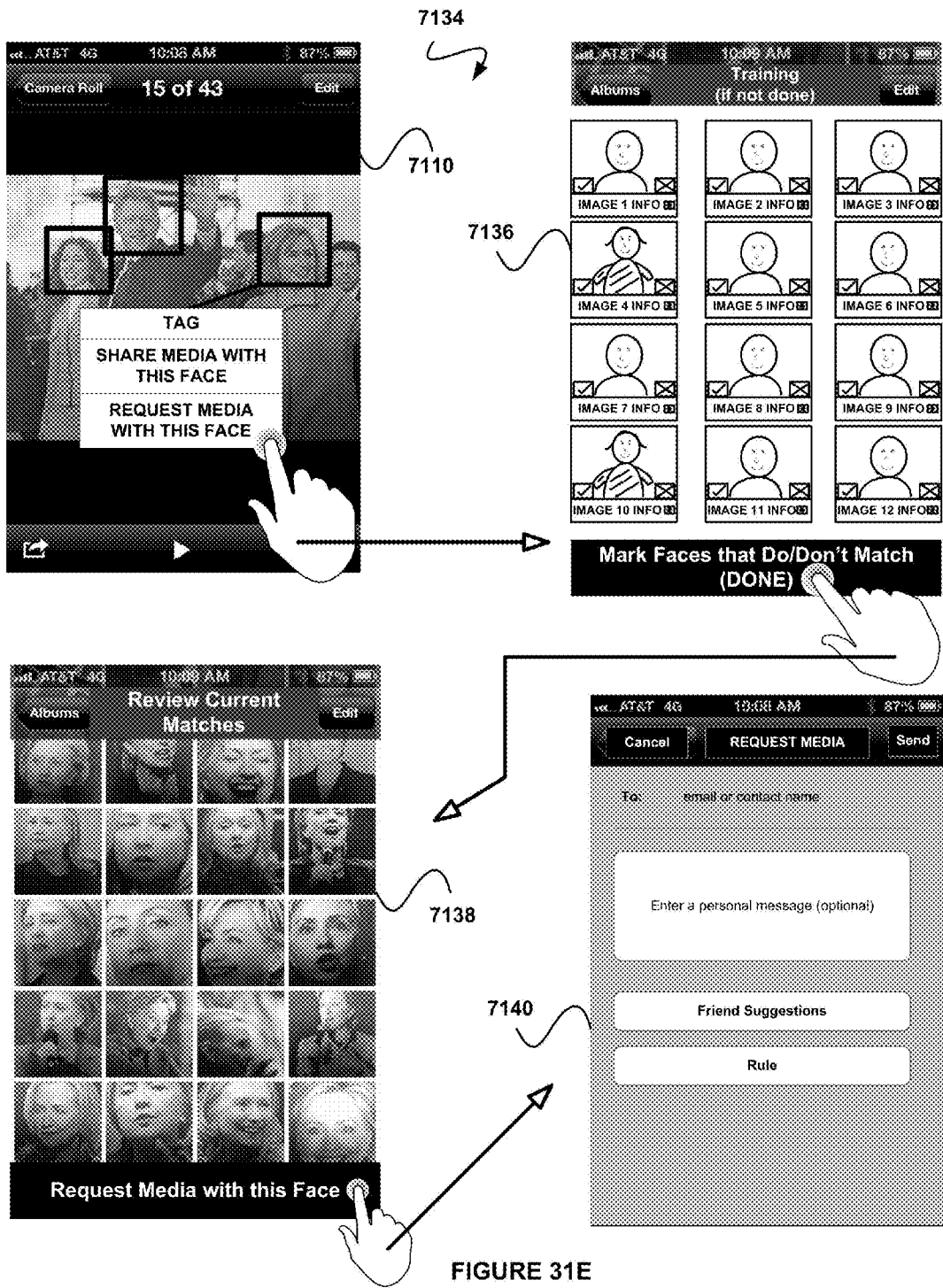
FIG. 31E shows a user interface for sharing metadata associated with media objects, in accordance with another embodiment.

FIG. 31E shows a user interface 7134 for sharing metadata associated with media objects, in accordance with another embodiment. As an option, the user interface 7134 may be implemented in the context of the architecture and environment of the previous Figures or any subsequent Figure(s). Of course, however, the user interface 7134 may be implemented in the context of any desired environment. It should also be noted that the aforementioned definitions may apply during the present description.

As shown, a face may be selected and one or more options 7110 relating to the face may be displayed. In various embodiments, the one or more options may include an ability to tag, ability to share media with the selected face, ability to request media with the selected face, and/or select any other option relating to a selected face. In one embodiment, the selected face may be associated with an individual (e.g. an actual person, etc.). Additionally, request to share media with this face option may be selected and a training interface 7136 may be displayed.

In one embodiment, the training may be dependent on whether the user has previously given input relating to the face. For example, in one embodiment, the user may have already confirmed and/or declined relevant photos associated with the face. In other embodiments, training may be completed by the user or by another contact. For example, user A may have completed the training for contact B, confirming the relevant and applicable photos. At a later time period, user C may take a photo of contact B, and select to share media with the face. The training relating to contact B may be optional if user C has access (e.g. is associated with, has access to a shared online database, etc.) to the metadata completed by user A.

In another embodiment, even if training has been previously completed, the user may still go through the training to select more relevant photos associated with the contact. In some embodiments, the user may override metadata previously selected by another user. In one embodiment, the user's selection of relevant photos may be associated with a timestamp for relevancy (e.g. relevant photos may be dependent on the age of the contact, etc.). In a further embodiment, completing additional training associated with a face may help to further refine the accuracy of matching a face to a contact identity.

In various embodiments, the training interface may include providing multiple facets of metadata, including facial recognition training data. For example, in various embodiments, the metadata may include data associated with a matrix, a heuristic, a vector, a face mesh, a geometry of data points, proportions of data points, color of a face and/or hair and/or eyes, skin features, and/or other identifying features, etc. In various embodiments, the data points may include at least one of a location of each eye, a nose location, a mouth location, and/or eye brow locations, etc.

In various embodiments, the user may be presented with one or more photos associated with the selected contact. In one embodiment, the displayed photos may be aggregated based on photos the user of the mobile device has taken. In other embodiments, the displayed photos may be pulled from an online database, a search engine, a wiki, a social network (e.g. Facebook, etc.), one or more secondary devices, and/or from any other source.

In one embodiment, the user may select to confirm or decline each displayed photo. In various embodiments, after the user selects to confirm or decline, confirmation of the selection may include bolding the box associated with the confirm or decline selections, shading the photo (e.g. if selected, the photo may be highlighted; if declined, the photo may be darkened; etc.), creating a list of approved photos, and/or interacting with the photos in any manner.

In various embodiments, any number of photos may be displayed to the user for training. In some embodiments, the number of photos may be limited due to a lack of photos (e.g. on the user's mobile device, on the online server, etc.). In other embodiments, the user may scroll through any number of photos to confirm and/or decline. In various embodiments, information may be displayed associated with each photo, including the name of the photo, metadata (e.g. location, name of face, time, date, photographer, etc.) associated with the photo, and/or any other information associated with the photos.

In some embodiments, the training interface may be interactive. For example, in one embodiment, after a user selects to decline one or more photos, such declined photos may be automatically replaced with another potential photo. In other embodiments, the training may be composed of more than one interface wherein each subsequent interface after the initial interface further refines the metadata characteristics of the face (e.g. an interface may be dedicated to select photos of the ear or another part of the head, etc.).

Additionally, in another embodiment, the training interface may be integrated into an online portal. For example, in various embodiments, the online portal may include a portal associated with a website address, a portal access through a mobile device app, a portal integrated into the mobile device platform, and/or any other portal which may be associated with the internet.

As shown, after confirming and/or declining the one or more displayed images, the done button may be selected and a review current matches interface 7138 may be displayed. In various embodiments, the review current matches interface may include one or more confirmed photos (e.g. those confirmed from the training interface, etc.), an aggregate of all confirmed photos (e.g. a scattered collage, etc.), a representative photo (e.g. the best photo of the contact, etc.), and/or any other display of the contact.

In one embodiment, the review current matches interface may provide a button to edit the photos. In such an embodiment, the edit button may go back to the training interface where the user can further confirm and/or decline the photos. In another embodiment, the user may remain on the review current matches interface and decline photos that are displayed.

If the displayed photos are acceptable to the user (e.g. the photos correlate with the contact, etc.), a "request media with this face" option may be selected, and a request media interface 7140 may be displayed. In one embodiment, the request media interface may include ability to select an email, contact name, and/or any identification means associated with a contact (e.g. screen name, etc.). Additionally, in one embodiment, a personal message may be inputted. In other embodiments, a data item (e.g. file, document, photo, video, voice message, etc.) may be attached to the request media item (or to the personal message, etc.).

Further, in various embodiments, the ability to request media may include sending a text communication (e.g. SMS message, email, chat, etc.), a multimedia message, and/or any other type of communication. In various embodiments, the request media may be made to a specific one or more individuals (e.g. selected, etc.). In another embodiment, a request media with this face may occur without specifying an email and/or contact name. For example, in various embodiments, a request may be made to an online photo database (e.g. Google images, Flickr, etc.), to one or more nearby devices (e.g. associated with a contact, associated with another entity, etc.), and/or to any system which may have media associated with the selected face.

As an example, a user A may select a face associated with user B and request media associated with the selected face. The request may be sent out to any contact which may have media associated with the selected face. In various embodiments, selection of applicable contacts may be dependent on one or more metadata properties, including an indication of a user B id (e.g. name, id, etc.) and/or any other information which may help to identify the selected face.

In one embodiment, the ability to request media may be automatic. For example, if training has already been completed (e.g. face matching, etc.), the user may select preferences and setting such that when "request media with this face" is selected as an option on a photo, a request may be made out to all relevant contacts which may have one or more photos associated with the selected face. In other embodiments, a confirmation page may be displayed indicating which contacts or entities the request for media will be sent, and the user may edit and/or modify the displayed contacts as desired.

In a further embodiment, the request for media with a selected face may be associated with a request to pull information from another source. For example, one or more permissions (e.g. access content, etc.) may have previously been granted (or may be granted ad-hoc, etc.) to a user. When the user requests media with a selected face, the app may search a database to determine which contacts associated with the user have one or more media associated with the selected face. Based off of permissions given to the user, the database may search content associated with other contacts. Once searching is complete, an output (e.g. screen, email, etc.) may be given and/or sent back to the user.

In one embodiment, the request for media may be associated with an object (e.g. building, landmark, etc.). For example, in one embodiment, the user may take a photo of the Lincoln Memorial and select the object on the captured photo. Based on the selection, an option to request media with this object may be displayed, whereupon if the user selects the option, results associated with the selected object may be displayed. In such an embodiment, content associated with the user, any contact associated with the user, and/or any publicly available databases (e.g. associated with a wiki, internet search, etc.), may be searched to assist in retrieving and providing relevant results.

In various embodiments, a friend suggestions option may be displayed, which may include a recommendation of possible relevant contacts (e.g. those whose image is included in the photo, etc.), a suggestion of a networked friend (e.g. a friend the user may be connected to through one or more other friends, etc.), a suggestion based off of a nearby device (e.g. associated with a contact or friend, etc.), and/or any other recommendation which may be associated with a friend.

In another embodiment, a rule option may be displayed, which may include the ability to select a relationship (e.g. user A is related to user B and user C, etc.). In other embodiments, a rule may permit a user to select a profile, image, icon, or name associated with another user and to set preferences associated with the other user. In various embodiments, the preferences may include photo sharing, video sharing, web sharing, application sharing, and/or any other preferences.

In one embodiment, clicking on or selecting a preference (e.g. a preference name, icon, etc.) may display additional preferences. For example, in one embodiment, selecting a photo preference may cause the display of additional options to share media and/or metadata associated with the media. In another embodiment, selecting an application preference may cause the display of additional preferences associated with the category of applications. Still yet, in one embodiment, selecting a profile, image, icon, and/or name associated with a user displayed on the interface may allow for metadata associated with a profile, image, and/or user to be edited. Of course, in another embodiment, the selection of any type of media may allow for editing of metadata associated with that media.

In one embodiment, at least one person may be identified in the media object (e.g. an image, a video, etc.). Further, it may be determined whether the identified at least one person is associated with a second user in accordance with the rule. In one embodiment, the rule may indicate that the at least one person is associated with the second user when the at least one person is the second user. In another embodiment, the rule may indicate that the at least one person is associated with the second user when the at least one person has a relationship with the second user. In another embodiment, the rule may indicate that the at least one person is associated with the second user when the at least one person has a relationship with a third user that has a relationship with the second user. Still yet, in one embodiment, the sharing of the media object may be conditioned on the identification of the at least one person in the media object.

In one embodiment, the rules may be included in the metadata. In another embodiment, rule identifiers may be included in the metadata. In another embodiment, a link to the rules may be included in the metadata. In another embodiment, the rules may be included in a service system. In another embodiment, the rules may be stored on a user device. Further, in one embodiment, a user identifier may be utilized to look up associated rules. Of course, in various embodiments, the rules may be stored in any suitable location and/or may be accessed utilizing any suitable identifier. In one embodiment, the rules may accompany the media object and/or the metadata.

Figure 31F:
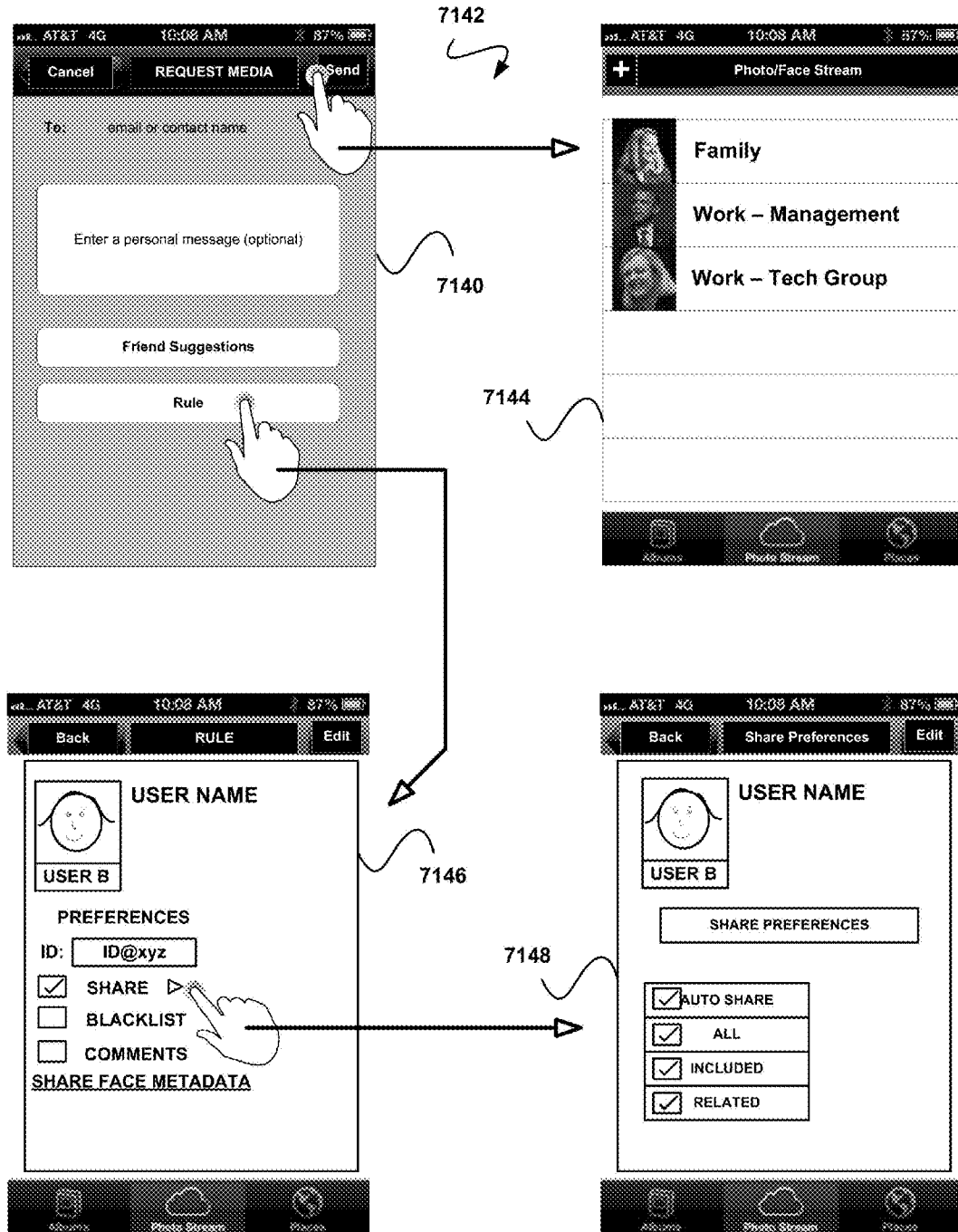
FIG. 31F shows a user interface for sharing metadata associated with media objects, in accordance with another embodiment.

FIG. 31F shows a user interface 7142 for sharing metadata associated with media objects, in accordance with another embodiment. As an option, the user interface 7142 may be implemented in the context of the architecture and environment of the previous Figures or any subsequent Figure(s). Of course, however, the user interface 7142 may be implemented in the context of any desired environment. It should also be noted that the aforementioned definitions may apply during the present description.

As shown, in one embodiment, a request media interface 7140 may be displayed. Additionally, a "send" option may be selected, and a photo/face stream interface 7144 may be displayed. In one embodiment, the photo/face stream interface may include a list of individual contacts, a group of contacts (e.g. predetermined groups, automatic group configuration based on relevancy and/or metadata tags, etc.), and/or any other grouping of one or more contacts.

In one embodiment, it may be determined that a photo contains the face of an individual associated with the user's work place. After selecting to send the photo, the user may be presented with a group entitled "Work-Management" or "Work-Tech Group" and/or any other relevant group. In one embodiment, the presenting of such groups may be based off of a determination that the selected face is, for example, an executive at the user's work company. Metadata associated with the face (e.g. management team, tech group, work, etc.) therefore may be used to create ad-hoc groups. In various embodiments, ad-hoc groups may be created on demand, may last for a temporary period of time (e.g. as needed by the demand, etc.), and/or may be used in any manner by the user.

Additionally, in one embodiment, a request for media may be made without a photo/face stream interface. For example, selecting "send" may send the request to any relevant contact if no email or contact name is provided. Of course, the request may function in any manner.

As shown in share media interface 7140, a rule option may be selected, and a rule interface 7146 may be displayed. In one embodiment, the rule may include setting an id (e.g. email, chat name, social networking name, alias, etc.), setting sharing permissions, placing the user on a blacklist, regulating comments (e.g. made by the user, uploaded to the user's account, etc.), ability to share metadata associated with the selected face, and/or take any other action associated with the selected face.

In one embodiment, a rule option may include the ability to select a relationship (e.g. user A is related to user B and user C, etc.). In other embodiments, a rule may permit a user to select a profile, image, icon, or name associated with another user and to set preferences associated with the other user. In various embodiments, the preferences may include photo sharing, video sharing, web sharing, application sharing, and/or any other preferences.

In one embodiment, clicking on or selecting a preference (e.g. a preference name, icon, etc.) may display additional preferences. For example, in one embodiment, selecting a photo preference may cause the display of additional options to share media and/or metadata associated with the media. In another embodiment, selecting an application preference may cause the display of additional preferences associated with the category of applications. Still yet, in one embodiment, selecting a profile, image, icon, and/or name associated with a user displayed on the interface may allow for metadata associated with a profile, image, and/or user to be edited. Of course, in another embodiment, the selection of any type of media may allow for editing of metadata associated with that media.

Additionally, in one embodiment, at least one person may be identified in the media object (e.g. an image, a video, etc.). Further, it may be determined whether the identified at least one person is associated with a second user in accordance with the rule. In one embodiment, the rule may indicate that the at least one person is associated with the second user when the at least one person is the second user. In another embodiment, the rule may indicate that the at least one person is associated with the second user when the at least one person has a relationship with the second user. In another embodiment, the rule may indicate that the at least one person is associated with the second user when the at least one person has a relationship with a third user that has a relationship with the second user. Still yet, in one embodiment, the sharing of the media object may be conditioned on the identification of the at least one person in the media object.

Still yet, in one embodiment, the rules may be included in the metadata. In another embodiment, rule identifiers may be included in the metadata. In another embodiment, a link to the rules may be included in the metadata. In another embodiment, the rules may be included in a service system. In another embodiment, the rules may be stored on a user device. Further, in one embodiment, a user identifier may be utilized to look up associated rules. Of course, in various embodiments, the rules may be stored in any suitable location and/or may be accessed utilizing any suitable identifier. In one embodiment, the rules may accompany the media object and/or the metadata.

As shown, an option to set "share" permissions may be selected, and a share preferences interface 7148 may be displayed. In one embodiment, one or more sharing options may be displayed, including the ability to automatically share content (e.g. with the user, associated with the user, etc.), share all media, share media where the user is included, share media that is related to the user, and/or various other options, etc.

In one embodiment, users may establish sharing preferences for media objects. Furthermore, in one embodiment, users may establish sharing preferences for particular devices. For example, User A, User B, and User C may be known and have a sharing preference associated with themselves and their devices. On the other hand, User D and User E may not be known and may not or have known sharing preferences.

In this example, when a picture of the users is captured, faces A, B, and C may be identified (along faces D and E, in one embodiment, based on facial recognition, etc.). In one embodiment, rules may indicate to share media and/or metadata with the users associated with faces A, B, and C. Accordingly, media and/or metadata may be sent to devices of User A, User B, and User C for viewing, etc.

In one embodiment, the application on the device of the user (and/or a service, etc.) may identify the users based on the rules. In one embodiment, the rules may be stored locally (e.g. on the user device, etc.) and/or at service system (e.g. a network system, etc.). In one embodiment, the user devices and the service system may be synchronized such that updated rules (e.g. and metadata, etc.) are present at the user devices and the service system. In one embodiment, the service system may determine whether to send the media, the metadata, a link to the media or metadata, and/or a reference to the media or metadata to the user devices.

In one embodiment, the sharing preferences may be synced and/or uploaded to an online sharing database system. For example, in various embodiments, the sharing preferences may be associated with a social media site (e.g. Facebook, etc.), an online file sharing and/or backup platform (e.g. Dropbox, etc.), a sharing management site or app, and/or any other system which may manage one or more sharing preferences.

Figure 31G:
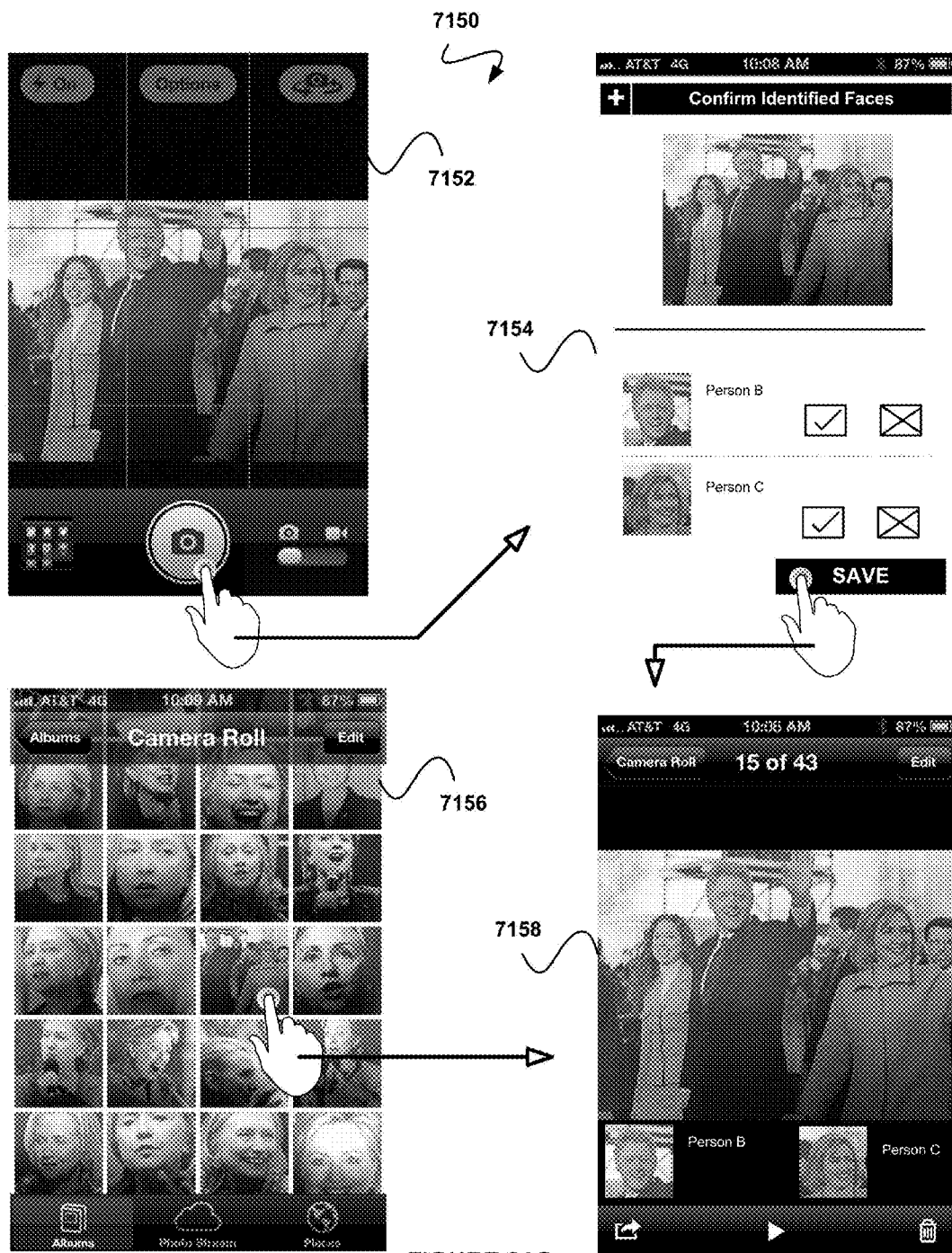
FIG. 31G shows a user interface for sharing metadata associated with media objects, in accordance with another embodiment.

FIG. 31G shows a user interface 7150 for sharing metadata associated with media objects, in accordance with another embodiment. As an option, the user interface 7150 may be implemented in the context of the architecture and environment of the previous Figures or any subsequent Figure(s). Of course, however, the user interface 7150 may be implemented in the context of any desired environment. It should also be noted that the aforementioned definitions may apply during the present description.

As shown, a camera interface 7152 may be displayed. In one embodiment, after selecting to capture an image (take a photo), a confirm identified faces interface 7154 may be displayed.

In one embodiment, the identified faces may be displayed in separate rows, where each row provides one or more options associated with the identified face. For example, in one embodiment, identified face A may be displayed with a name associated with the face and a confirm or decline button may also be displayed. Subsequent identified faces may be listed in row format below the identified face A row. Of course, in other embodiments, the identified faces may be displayed in any manner, including a grid format (e.g. thumbnail images of the identified faces may be displayed, etc.), a list of matches (e.g. a number may be associated with each face and the number row may include one or more options, etc.), and/or in any other manner.

Further, in one embodiment, a confirm identified faces interface may be dependent on a confidence ranking. For example, in one embodiment, it may be determined (e.g. based on facial recognition algorithms, etc.) that the identified faces in a captured image are ranked at an 85% level of confidence. In some embodiments, if the confidence level is over a threshold (e.g. 70%, etc.), then the confirm identified faces interface may not be displayed and metadata associated with the identification will automatically be added to the captured image.

In other embodiments, one or more sensors may be used to assess the confidence ranking. For example, in one embodiment, the user's mobile device may recognize (e.g. via GPS path, via network discovery, via device discovery, etc.) that one or more devices (e.g. device associated with a contact, etc.) are near the user's device. In some embodiments, based off of the discovery of one or more devices, the user's mobile device may assign a higher confidence ranking to the captured image based off of the presence of other contact's devices. In one embodiment, the one or more discovered devices may have previously been saved (e.g. known device connection, etc.). In a further embodiment, the one or more discovered devices may have not previously been connected (discovered, etc.) by the user's mobile device. However, contact metadata (e.g. devices, device ids, etc.) associated with the user's contacts may help to establish the identity of the one or more discovered devices.

As shown, in one embodiment, a gallery app interface 7156 may be displayed. In various embodiments, one or more photos may be displayed (e.g. grid format, thumbnail images, list format, etc.). Of course, any app may be used to display in some manner a photo. As an example, in one embodiment, an email may be received with a photo attachment and the email app may display in some manner (e.g. thumbnail preview, etc.) the photo attachment.

As shown, a photo may be selected from gallery app interface 7156 and a photo interface 7158 may be displayed. Additionally, a save option may be selected from confirm identified faces interface 7154, and a photo interface 7158 may be displayed.

In one embodiment, the one or more identified faces may be displayed below the photo with a name associated with each of the identified faces. In other embodiments, the names associated with the identified faces may be displayed in any manner, including displaying the text on the photo (e.g. next to the identified name, etc.) causing the text to be displayed when a cursor is hovered over a face (or if a face is briefly selected [but not long enough to cause one or more options to appear], etc.), displaying a list of identified faces as a list (e.g. if a name is touched, a face is highlighted and/or otherwise selected, etc.), etc.

In one embodiment, if after selecting an image no identified faces are found, the user may go through one or more tutorials to correctly identify each of the faces. In one embodiment, the user may go through a contact tutorial for each of the contacts to assist the app in correctly identifying the friend. In another embodiment, the user may simply identify the faces, and based off of input over a period of time (e.g. a year, etc.), the input may be sufficient that accurate identification of faces may occur. Of course, the user may interact with the face identification software in any manner.

Figure 31H:
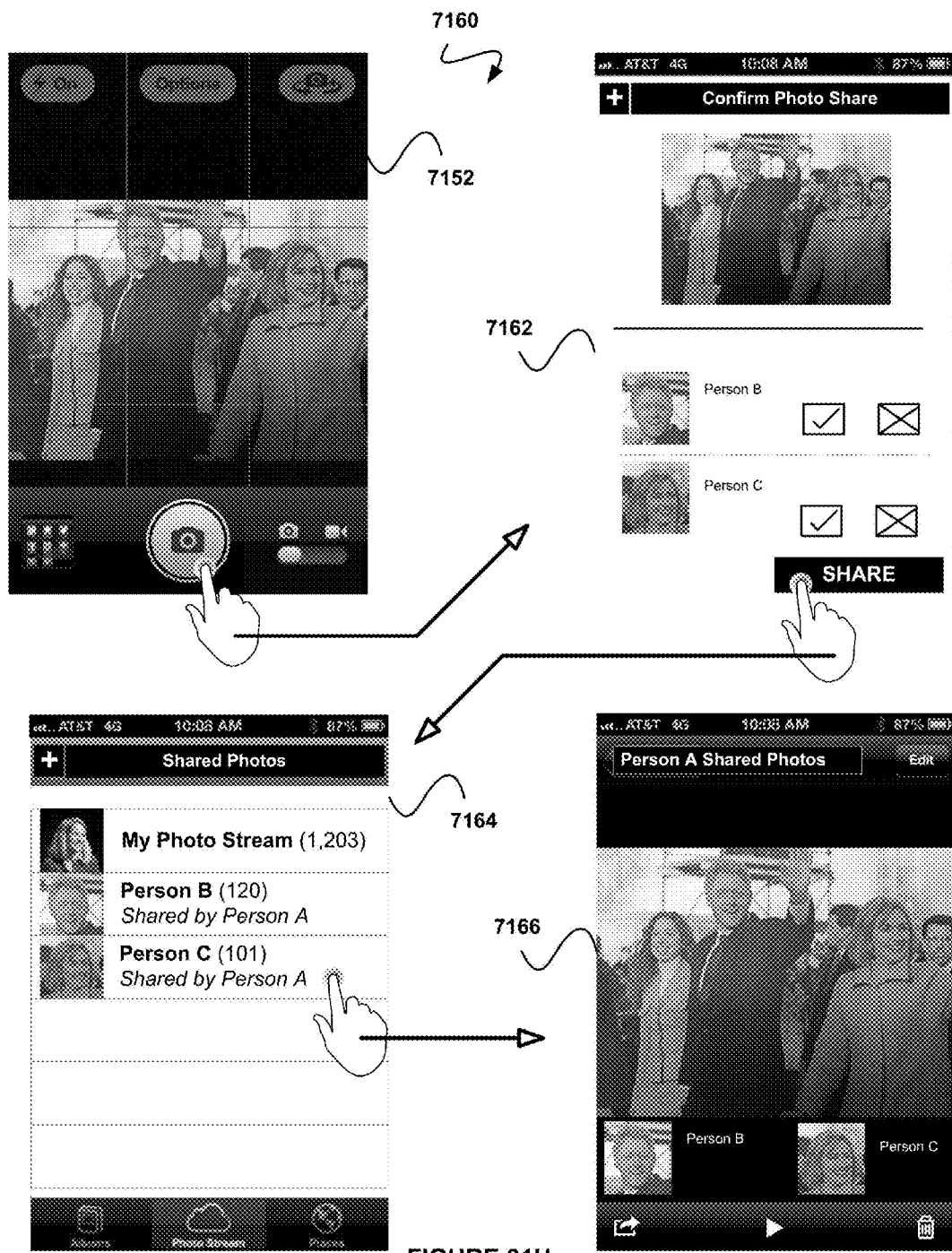
FIG. 31H shows a user interface for sharing metadata associated with media objects, in accordance with another embodiment.

FIG. 31H shows a user interface 7160 for sharing metadata associated with media objects, in accordance with another embodiment. As an option, the user interface 7160 may be implemented in the context of the architecture and environment of the previous Figures or any subsequent Figure(s). Of course, however, the user interface 7160 may be implemented in the context of any desired environment. It should also be noted that the aforementioned definitions may apply during the present description.

As shown, a camera interface 7152 may be displayed. In one embodiment, after selecting to capture an image (take a photo), a confirm photo share interface 7162 may be displayed.

In one embodiment, the confirm photo share may display one or more identified faces. In various embodiments, the identified faces may be displayed in separate rows, where each row provides one or more options associated with the identified face. For example, in one embodiment, identified face A may be displayed with a name associated with the face and a confirm or decline button may also be displayed. Subsequent identified faces may be listed in row format below the identified face A row. Of course, in other embodiments, the identified faces may be displayed in any manner, including a grid format (e.g. thumbnail images of the identified faces may be displayed, etc.), a list of matches (e.g. a number may be associated with each face and the number row may include one or more options, etc.), and/or in any other manner.

Additionally, in one embodiment, a confirm photo share interface may be used to identify one or more faces (e.g. select a face and associate the face with a contact, etc.). In other embodiments, the confirm photo share interface may be used to confirm pre-identified faces (e.g. faces which have already been associated with a contact, etc.).

As shown, after confirming the one or more identified faces, the user may select to share the captured image, and a shared photos interface 7164 may be displayed. In one embodiment, one or more shared photo albums may be presented, including one or more photo albums associated with the user, one or more albums associated with one of the identified contacts (e.g. based on the identified face(s), etc.), one or more albums associated with a non-identified contact (e.g. album was previously shared to the user, etc.), one or more online photo albums (e.g. Flickr, Picasa, etc.), one or more social media photo albums (e.g. Facebook, etc.), and/or any album.

In various embodiments, sharing permissions may be associated with the one or more shared photo albums. For example, in one embodiment, the user of the mobile device may grant to one or more contacts the ability to access the user's photos. As such, permissions may be based on a contact-by-contact basis. In another embodiment, sharing permissions may be granted to an app (e.g. album sharing app, etc.), to a database (e.g. online database, central database, etc.), to a management service (e.g. photo sharing service, etc.), and/or to any other entity or system which may manage in some manner sharing permissions.

In one embodiment, a Person A may share "My Photo Stream," or an album which belongs to Person A. Additionally, Person A may create and share an album relating to Person B, and/or Person C, each of which contain photos relating to Person B or Person C, respectively. In one embodiment, Person A may categorize and organize the photos to be shared within a specific folder (e.g. Person B folder, etc.). In another embodiment, Person A may configure automatic settings so that a shared folder is created relating to Person B and all relevant photos (e.g. of Person B, etc.) are put in the created shared folder. In a further embodiment, Person A may configure sharing settings such that all photos may be shared and categorized automatically according to metadata (e.g. person, place, time, etc.). Of course, any level of sharing and/or permission may be associated with a photo, an album, an entity (e.g. contact, individual, store, etc.), etc.

In a further embodiment, a Person A may "opt-in" to receive (or have access to) photos shared by a user. For example, in one embodiment, Person A may be interested in any photo containing Person D. As such, whenever the user uploads a photo (e.g. to Photo Stream, online database, shared folder, etc.) associated with Person D, Person A may receive notification of such an upload and have access to the photo (e.g. in the shared photo stream folder, etc.). In other embodiments, a Person A may "opt-in" to a shared album. The shared album may be created and/or managed by any user. In one embodiment, "opting-in" to a shared album may enable Person A to edit, share, delete, and/or manage photos on the shared album. Of course, in other embodiments, a shared folder may be controlled by one or more permissions (e.g. ability to manipulate, edit, delete, view, etc.).

As shown, in one embodiment, a user may select "Person C" shared album, and a shared photo interface 7166 may be displayed. In one embodiment, selecting a shared folder may display one or more photos (e.g. in grid form, in list form, as thumbnails, etc.). In other embodiments, the first photo in the album may be displayed. Additionally, in another embodiment, one or more features may be provided to manipulate and/or edit the view of the photos. For example, in one embodiment, a thumbnail size bar may be used to increase or shrink the size of the thumbnails, a dropdown menu (or any menu type) may be used to switch the view (e.g. grid, list, etc.) of the photos, one or more filters may be displayed to restrict (e.g. location, date, online database, local cache, etc.) in some manner the displayed photos, etc. Of course, in other embodiments, any filter and/or restriction may be applied to the one or more displayed photos.

In another embodiment, a shared photo may include an identification of the identified faces in the photo. For example, in one embodiment, a photo may include the faces of Person B and Person C, and below the photo a thumbnail image of the face(s) may be displayed with text alongside, including, for example, Person B or Person C. In other embodiments, a textual list of identified faces may be displayed and when the text is selected, the identified face may be highlighted (e.g. brightened, circle appears around the face, etc.). In another embodiment, briefly selecting a face (but not long enough to cause options to appears) may identify the face (e.g. text may be displayed next to the face, etc.). In a further embodiment, selecting a face may include displaying the name associated with the face and/or one or more options associated with the face (e.g. tag, shared media with this face, request media with this face, etc.). Additionally, selecting a face may cause an audible response (e.g. selecting a face may cause "Person B" to be spoken, etc.). Of course, in another embodiment, the user may interact with the photo in any manner to identify the identified faces.

In one embodiment, the display of the identified faces may be through an app on the phone (e.g. photo sharing app, etc.), a native utility app (e.g. gallery, etc.), an online portal (e.g. through a website, etc.), and/or through any other system.

Figure 31I:
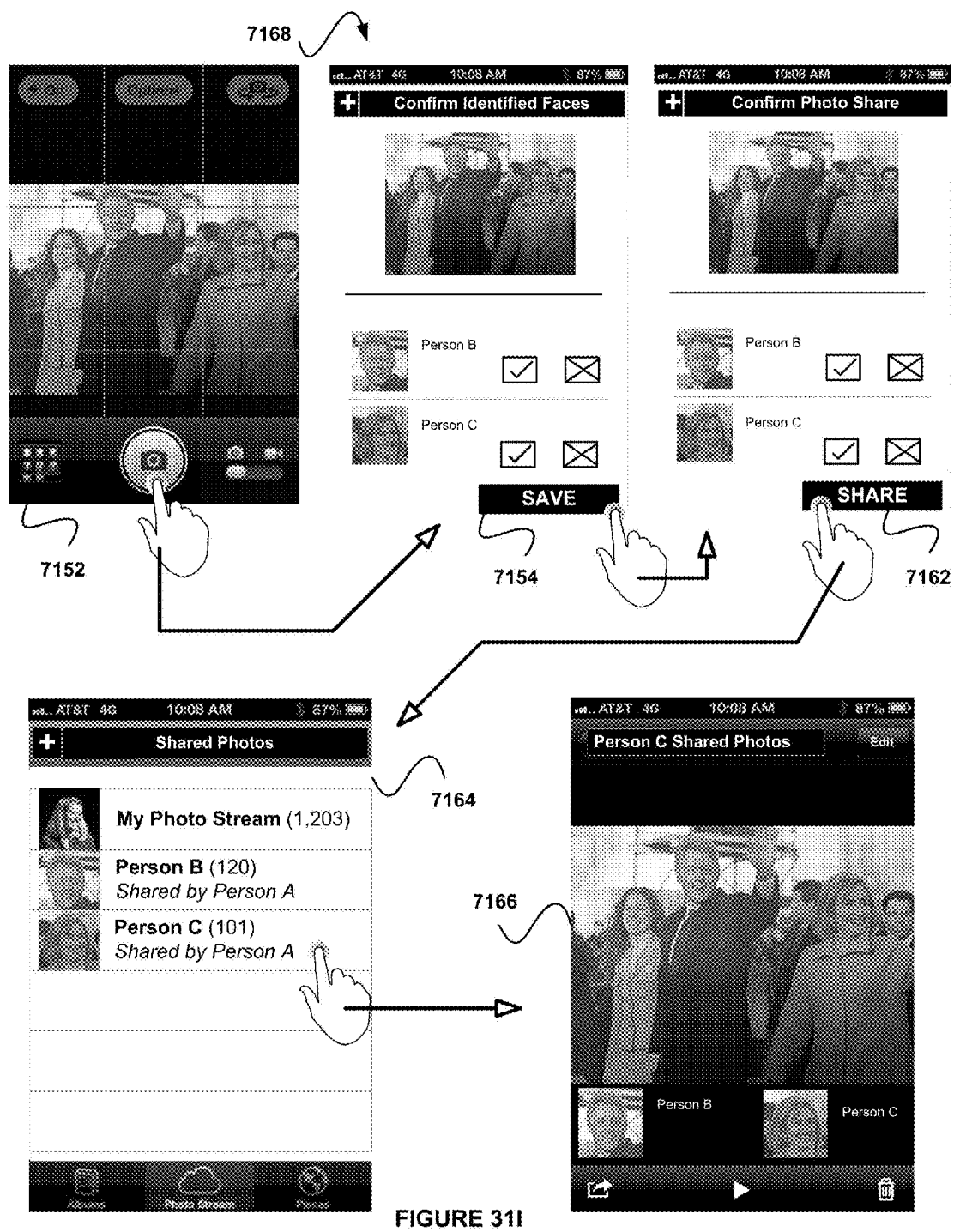
FIG. 31I shows a user interface for sharing metadata associated with media objects, in accordance with another embodiment.

FIG. 31I shows a user interface 7168 for sharing metadata associated with media objects, in accordance with another embodiment. As an option, the user interface 7168 may be implemented in the context of the architecture and environment of the previous Figures or any subsequent Figure(s). Of course, however, the user interface 7168 may be implemented in the context of any desired environment. It should also be noted that the aforementioned definitions may apply during the present description.

As shown, a camera interface 7152 may be displayed. In one embodiment, after selecting to capture an image (take a photo), a confirm identified faces interface 7154 may be displayed.

In one embodiment, the identified faces may be displayed in separate rows, where each row provides one or more options associated with the identified face. For example, in one embodiment, identified face A may be displayed with a name associated with the face and a confirm or decline button may also be displayed. Subsequent identified faces may be listed in row format below the identified face A row. Of course, in other embodiments, the identified faces may be displayed in any manner, including a grid format (e.g. thumbnail images of the identified faces may be displayed, etc.), a list of matches (e.g. a number may be associated with each face and the number row may include one or more options, etc.), and/or in any other manner.

Further, in one embodiment, a confirm identified faces interface may be dependent on a confidence ranking. For example, in one embodiment, it may be determined (e.g. based on facial recognition algorithms, etc.) that the identified faces in a captured image are ranked at an 85% level of confidence. In some embodiments, if the confidence level is over a threshold (e.g. 70%, etc.), then the confirm identified faces interface may not be displayed and metadata associated with the identification will automatically be added to the captured image.

In other embodiments, one or more sensors may be used to assess the confidence ranking. For example, in one embodiment, the user's mobile device may recognize (e.g. via GPS path, via network discovery, via device discovery, etc.) that one or more devices (e.g. device associated with a contact, etc.) are near the user's device. In some embodiments, based off of the discovery of one or more devices, the user's mobile device may assign a higher confidence ranking to the captured image based off of the presence of other contact's devices. In one embodiment, the one or more discovered devices may have previously been saved (e.g. known device connection, etc.). In a further embodiment, the one or more discovered devices may have not previously been connected (discovered, etc.) by the user's mobile device. However, contact metadata (e.g. devices, device ids, etc.) associated with the user's contacts may help to establish the identity of the one or more discovered devices.

As shown, after confirming the identified faces, the save option may be selected, and a confirm photo share interface 7162 may be displayed.

In one embodiment, the confirm photo share may display one or more identified faces. In various embodiments, the identified faces may be displayed in separate rows, where each row provides one or more options associated with the identified face. For example, in one embodiment, identified face A may be displayed with a name associated with the face and a confirm or decline button may also be displayed. Subsequent identified faces may be listed in row format below the identified face A row. Of course, in other embodiments, the identified faces may be displayed in any manner, including a grid format (e.g. thumbnail images of the identified faces may be displayed, etc.), a list of matches (e.g. a number may be associated with each face and the number row may include one or more options, etc.), and/or in any other manner.

Additionally, in one embodiment, a confirm photo share interface may be used to identify one or more faces (e.g. select a face and associate the face with a contact, etc.). In other embodiments, the confirm photo share interface may be used to confirm pre-identified faces (e.g. faces which have already been associated with a contact, etc.).

As shown, after confirming the one or more identified faces, the user may select to share the captured image, and a shared photos interface 7164 may be displayed. In one embodiment, one or more shared photo albums may be presented, including one or more photo albums associated with the user, one or more albums associated with one of the identified contacts (e.g. based on the identified face(s), etc.), one or more albums associated with a non-identified contact (e.g. album was previously shared to the user, etc.), one or more online photo albums (e.g. Flickr, Picasa, etc.), one or more social media photo albums (e.g. Facebook, etc.), and/or any album.

In various embodiments, sharing permissions may be associated with the one or more shared photo albums. For example, in one embodiment, the user of the mobile device may grant to one or more contacts the ability to access the user's photos. As such, permissions may be based on a contact-by-contact basis. In another embodiment, sharing permissions may be granted to an app (e.g. album sharing app, etc.), to a database (e.g. online database, central database, etc.), to a management service (e.g. photo sharing service, etc.), and/or to any other entity or system which may manage in some manner sharing permissions.

In one embodiment, a Person A may share "My Photo Stream," or an album which belongs to Person A. Additionally, Person A may create and share an album relating to Person B, and/or Person C, each of which contain photos relating to Person B or Person C, respectively. In one embodiment, Person A may categorize and organize the photos to be shared within a specific folder (e.g. Person B folder, etc.). In another embodiment, Person A may configure automatic settings so that a shared folder is created relating to Person B and all relevant photos (e.g. of Person B, etc.) are put in the created shared folder. In a further embodiment, Person A may configure sharing settings such that all photos may be shared and categorized automatically according to metadata (e.g. person, place, time, etc.). Of course, any level of sharing and/or permission may be associated with a photo, an album, an entity (e.g. contact, individual, store, etc.), etc.

In a further embodiment, a Person A may "opt-in" to receive (or have access to) photos shared by a user. For example, in one embodiment, Person A may be interested in any photo containing Person D. As such, whenever the user uploads a photo (e.g. to Photo Stream, online database, shared folder, etc.) associated with Person D, Person A may receive notification of such an upload and have access to the photo (e.g. in the shared photo stream folder, etc.). In other embodiments, a Person A may "opt-in" to a shared album. The shared album may be created and/or managed by any user. In one embodiment, "opting-in" to a shared album may enable Person A to edit, share, delete, and/or manage photos on the shared album. Of course, in other embodiments, a shared folder may be controlled by one or more permissions (e.g. ability to manipulate, edit, delete, view, etc.).

As shown, in one embodiment, a user may select "Person C" shared album, and a shared photo interface 7166 may be displayed. In one embodiment, selecting a shared folder may display one or more photos (e.g. in grid form, in list form, as thumbnails, etc.). In other embodiments, the first photo in the album may be displayed. Additionally, in another embodiment, one or more features may be provided to manipulate and/or edit the view of the photos. For example, in one embodiment, a thumbnail size bar may be used to increase or shrink the size of the thumbnails, a dropdown menu (or any menu type) may be used to switch the view (e.g. grid, list, etc.) of the photos, one or more filters may be displayed to restrict (e.g. location, date, online database, local cache, etc.) in some manner the displayed photos, etc. Of course, in other embodiments, any filter and/or restriction may be applied to the one or more displayed photos.

In another embodiment, a shared photo may include an identification of the identified faces in the photo. For example, in one embodiment, a photo may include the faces of Person B and Person C, and below the photo a thumbnail image of the face(s) may be displayed with text alongside, including, for example, Person B or Person C. In other embodiments, a textual list of identified faces may be displayed and when the text is selected, the identified face may be highlighted (e.g. brightened, circle appears around the face, etc.). In another embodiment, briefly selecting a face (but not long enough to cause options to appears) may identify the face (e.g. text may be displayed next to the face, etc.). In a further embodiment, selecting a face may include displaying the name associated with the face and/or one or more options associated with the face (e.g. tag, shared media with this face, request media with this face, etc.). Additionally, selecting a face may cause an audible response (e.g. selecting a face may cause "Person B" to be spoken, etc.). Of course, in another embodiment, the user may interact with the photo in any manner to identify the identified faces.

In one embodiment, the display of the identified faces may be through an app on the phone (e.g. photo sharing app, etc.), a native utility app (e.g. gallery, etc.), an online portal (e.g. through a website, etc.), and/or through any other system.

Figure 31J:
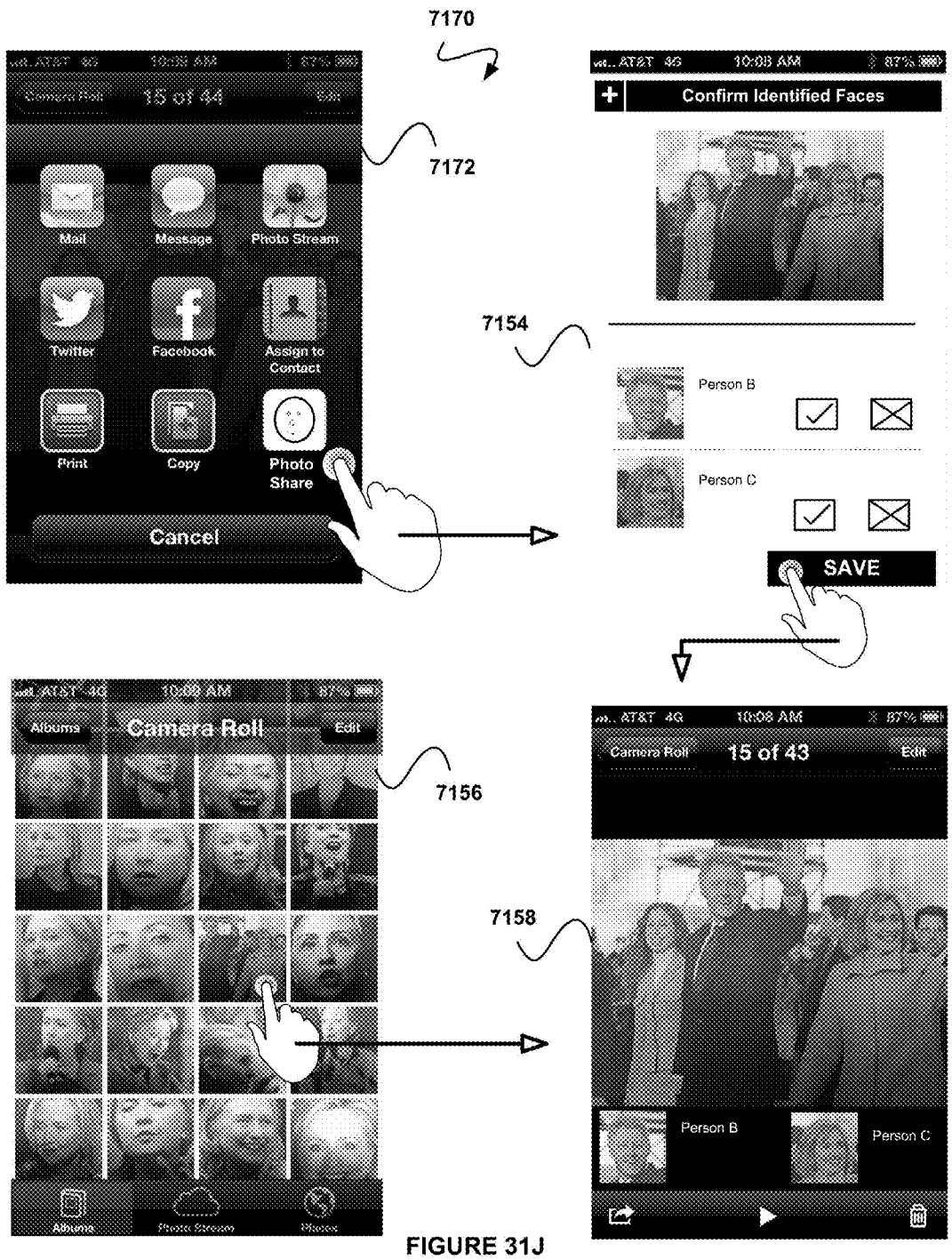
FIG. 31J shows a user interface for sharing metadata associated with media objects, in accordance with another embodiment.

FIG. 31J shows a user interface 7170 for sharing metadata associated with media objects, in accordance with another embodiment. As an option, the user interface 7170 may be implemented in the context of the architecture and environment of the previous Figures or any subsequent Figure(s). Of course, however, the user interface 7170 may be implemented in the context of any desired environment. It should also be noted that the aforementioned definitions may apply during the present description.

As shown, an existing photo may include an options interface 7172. In one embodiment, the options interface may include the ability to interact with the photo in some manner, including the ability to mail (e.g. email, etc.), message (e.g. via chat, real-time collaboration, etc.), photo stream (e.g. upload to an online photo database, upload to a synced server, etc.), upload to Twitter, upload to Facebook, assign (e.g. the photo, the identified faces, etc.) to a contact (or multiple contacts possibly if more than one face, etc.), print, copy, photo share (e.g. share the photo, etc.), and/or take any other action relating to the existing photo.

In various embodiments, the photo share option may be displayed with respect to any photo and/or image. For example, in one embodiment, a photo may be received as an attachment to an email. The photo may be viewed within the email app and an option associated with the photo (e.g. by selecting the photo, etc.) may include the ability to photo share.

In one embodiment, after selecting a photo share option, a confirm identified faces interface 7154 may be displayed. In one embodiment, the identified faces may be displayed in separate rows, where each row provides one or more options associated with the identified face. For example, in one embodiment, identified face A may be displayed with a name associated with the face and a confirm or decline button may also be displayed. Subsequent identified faces may be listed in row format below the identified face A row. Of course, in other embodiments, the identified faces may be displayed in any manner, including a grid format (e.g. thumbnail images of the identified faces may be displayed, etc.), a list of matches (e.g. a number may be associated with each face and the number row may include one or more options, etc.), and/or in any other manner.

Further, in one embodiment, a confirm identified faces interface may be dependent on a confidence ranking. For example, in one embodiment, it may be determined (e.g. based on facial recognition algorithms, etc.) that the identified faces in a captured image are ranked at an 85% level of confidence. In some embodiments, if the confidence level is over a threshold (e.g. 70%, etc.), then the confirm identified faces interface may not be displayed and metadata associated with the identification will automatically be added to the captured image.

In other embodiments, one or more sensors may be used to assess the confidence ranking. For example, in one embodiment, the user's mobile device may recognize (e.g. via GPS path, via network discovery, via device discovery, etc.) that one or more devices (e.g. device associated with a contact, etc.) are near the user's device. In some embodiments, based off of the discovery of one or more devices, the user's mobile device may assign a higher confidence ranking to the captured image based off of the presence of other contact's devices. In one embodiment, the one or more discovered devices may have previously been saved (e.g. known device connection, etc.). In a further embodiment, the one or more discovered devices may have not previously been connected (discovered, etc.) by the user's mobile device. However, contact metadata (e.g. devices, device ids, etc.) associated with the user's contacts may help to establish the identity of the one or more discovered devices.

As shown, in one embodiment, a gallery app interface 7156 may be displayed. In various embodiments, one or more photos may be displayed (e.g. grid format, thumbnail images, list format, etc.). Of course, any app may be used to display in some manner a photo. As an example, in one embodiment, an email may be received with a photo attachment and the email app may display in some manner (e.g. thumbnail preview, etc.) the photo attachment.

As shown, a photo may be selected from gallery app interface 7156 and a photo interface 7158 may be displayed.

Additionally, a save option may be selected from confirm identified faces interface 7154, and a photo interface 7158 may be displayed.

In one embodiment, the one or more identified faces may be displayed below the photo with a name associated with each of the identified faces. In other embodiments, the names associated with the identified faces may be displayed in any manner, including displaying the text on the photo (e.g. next to the identified name, etc.) causing the text to be displayed when a cursor is hovered over a face (or if a face is briefly selected [but not long enough to cause one or more options to appear], etc.), displaying a list of identified faces as a list (e.g. if a name is touched, a face is highlighted and/or otherwise selected, etc.), etc.

In one embodiment, if after selecting an image no identified faces are found, the user may go through one or more tutorials to correctly identify each of the faces. In one embodiment, the user may go through a contact tutorial for each of the contacts to assist the app in correctly identifying the friend. In another embodiment, the user may simply identify the faces, and based off of input over a period of time (e.g. a year, etc.), the input may be sufficient that accurate identification of faces may occur. Of course, the user may interact with the face identification software in any manner.

Figure 31K:
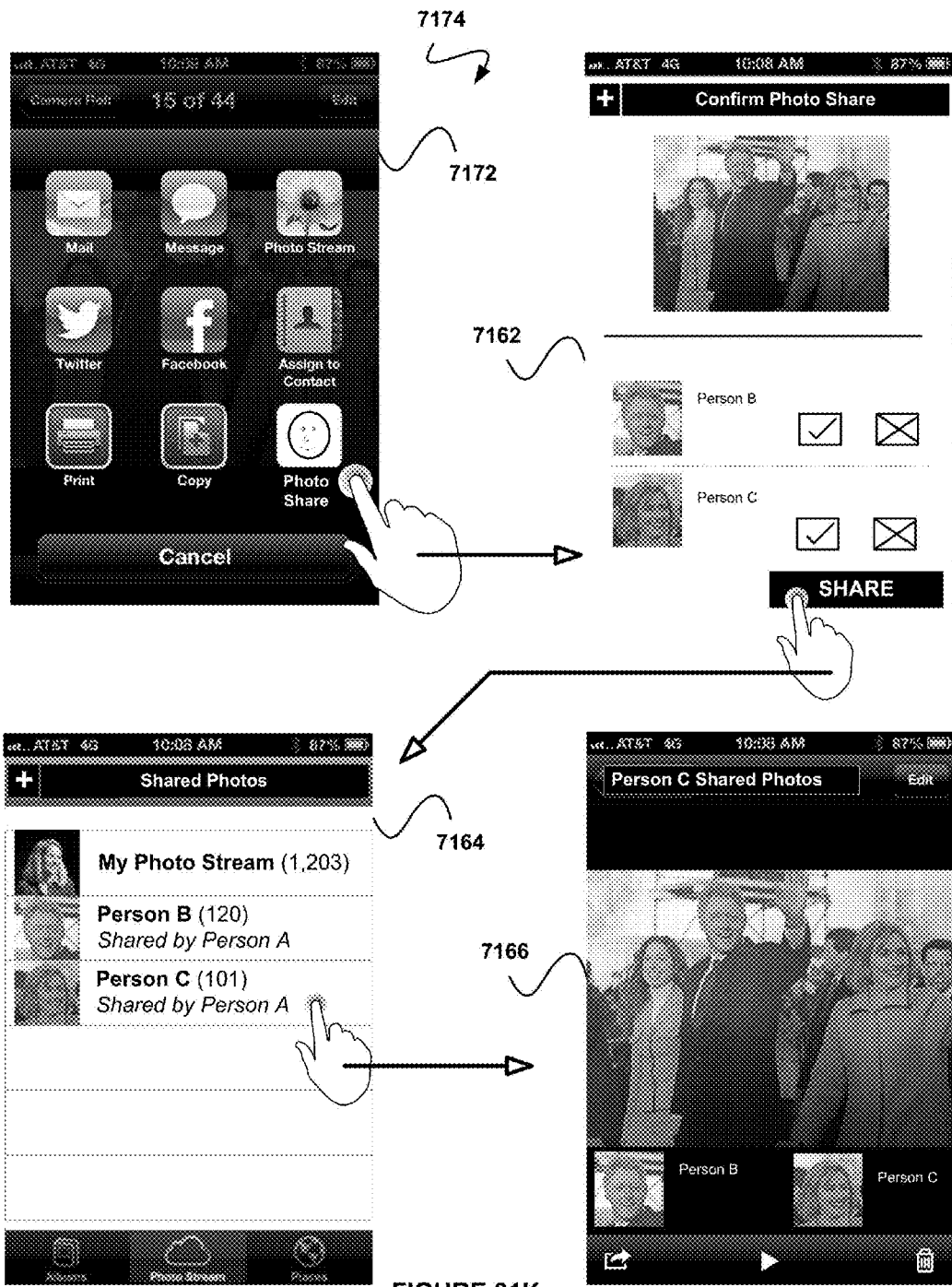
FIG. 31K shows a user interface for sharing metadata associated with media objects, in accordance with another embodiment.

FIG. 31K shows a user interface 7174 for sharing metadata associated with media objects, in accordance with another embodiment. As an option, the user interface 7174 may be implemented in the context of the architecture and environment of the previous Figures or any subsequent Figure(s). Of course, however, the user interface 7174 may be implemented in the context of any desired environment. It should also be noted that the aforementioned definitions may apply during the present description.

As shown, an existing photo may include an options interface 7172. In one embodiment, the options interface may include the ability to interact with the photo in some manner, including the ability to mail (e.g. email, etc.), message (e.g. via chat, real-time collaboration, etc.), photo stream (e.g. upload to an online photo database, upload to a synced server, etc.), upload to Twitter, upload to Facebook, assign (e.g. the photo, the identified faces, etc.) to a contact (or multiple contacts possibly if more than one face, etc.), print, copy, photo share (e.g. share the photo, etc.), and/or take any other action relating to the existing photo.

In various embodiments, the photo share option may be displayed with respect to any photo and/or image. For example, in one embodiment, a photo may be received as an attachment to an email. The photo may be viewed within the email app and an option associated with the photo (e.g. by selecting the photo, etc.) may include the ability to photo share. In one embodiment, after selecting a photo share option, a confirm photo share interface 7162 may be displayed.

In one embodiment, the confirm photo share may display one or more identified faces. In various embodiments, the identified faces may be displayed in separate rows, where each row provides one or more options associated with the identified face. For example, in one embodiment, identified face A may be displayed with a name associated with the face and a confirm or decline button may also be displayed. Subsequent identified faces may be listed in row format below the identified face A row. Of course, in other embodiments, the identified faces may be displayed in any manner, including a grid format (e.g. thumbnail images of the identified faces may be displayed, etc.), a list of matches (e.g. a number may be associated with each face and the number row may include one or more options, etc.), and/or in any other manner.

Additionally, in one embodiment, a confirm photo share interface may be used to identify one or more faces (e.g. select a face and associate the face with a contact, etc.). In other embodiments, the confirm photo share interface may be used to confirm pre-identified faces (e.g. faces which have already been associated with a contact, etc.).

As shown, after confirming the one or more identified faces, the user may select to share the captured image, and a shared photos interface 7164 may be displayed. In one embodiment, one or more shared photo albums may be presented, including one or more photo albums associated with the user, one or more albums associated with one of the identified contacts (e.g. based on the identified face(s), etc.), one or more albums associated with a non-identified contact (e.g. album was previously shared to the user, etc.), one or more online photo albums (e.g. Flickr, Picasa, etc.), one or more social media photo albums (e.g. Facebook, etc.), and/or any album.

In various embodiments, sharing permissions may be associated with the one or more shared photo albums. For example, in one embodiment, the user of the mobile device may grant to one or more contacts the ability to access the user's photos. As such, permissions may be based on a contact-by-contact basis. In another embodiment, sharing permissions may be granted to an app (e.g. album sharing app, etc.), to a database (e.g. online database, central database, etc.), to a management service (e.g. photo sharing service, etc.), and/or to any other entity or system which may manage in some manner sharing permissions.

In one embodiment, a Person A may share "My Photo Stream," or an album which belongs to Person A. Additionally, Person A may create and share an album relating to Person B, and/or Person C, each of which contain photos relating to Person B or Person C, respectively. In one embodiment, Person A may categorize and organize the photos to be shared within a specific folder (e.g. Person B folder, etc.). In another embodiment, Person A may configure automatic settings so that a shared folder is created relating to Person B and all relevant photos (e.g. of Person B, etc.) are put in the created shared folder. In a further embodiment, Person A may configure sharing settings such that all photos may be shared and categorized automatically according to metadata (e.g. person, place, time, etc.). Of course, any level of sharing and/or permission may be associated with a photo, an album, an entity (e.g. contact, individual, store, etc.), etc.

In a further embodiment, a Person A may "opt-in" to receive (or have access to) photos shared by a user. For example, in one embodiment, Person A may be interested in any photo containing Person D. As such, whenever the user uploads a photo (e.g. to Photo Stream, online database, shared folder, etc.) associated with Person D, Person A may receive notification of such an upload and have access to the photo (e.g. in the shared photo stream folder, etc.). In other embodiments, a Person A may "opt-in" to a shared album. The shared album may be created and/or managed by any user. In one embodiment, "opting-in" to a shared album may enable Person A to edit, share, delete, and/or manage photos on the shared album. Of course, in other embodiments, a shared folder may be controlled by one or more permissions (e.g. ability to manipulate, edit, delete, view, etc.).

As shown, in one embodiment, a user may select "Person C" shared album, and a shared photo interface 7166 may be displayed. In one embodiment, selecting a shared folder may display one or more photos (e.g. in grid form, in list form, as thumbnails, etc.). In other embodiments, the first photo in the album may be displayed. Additionally, in another embodiment, one or more features may be provided to manipulate and/or edit the view of the photos. For example, in one embodiment, a thumbnail size bar may be used to increase or shrink the size of the thumbnails, a dropdown menu (or any menu type) may be used to switch the view (e.g. grid, list, etc.) of the photos, one or more filters may be displayed to restrict (e.g. location, date, online database, local cache, etc.) in some manner the displayed photos, etc. Of course, in other embodiments, any filter and/or restriction may be applied to the one or more displayed photos.

In another embodiment, a shared photo may include an identification of the identified faces in the photo. For example, in one embodiment, a photo may include the faces of Person B and Person C, and below the photo a thumbnail image of the face(s) may be displayed with text alongside, including, for example, Person B or Person C. In other embodiments, a textual list of identified faces may be displayed and when the text is selected, the identified face may be highlighted (e.g. brightened, circle appears around the face, etc.). In another embodiment, briefly selecting a face (but not long enough to cause options to appears) may identify the face (e.g. text may be displayed next to the face, etc.). In a further embodiment, selecting a face may include displaying the name associated with the face and/or one or more options associated with the face (e.g. tag, shared media with this face, request media with this face, etc.). Additionally, selecting a face may cause an audible response (e.g. selecting a face may cause "Person B" to be spoken, etc.). Of course, in another embodiment, the user may interact with the photo in any manner to identify the identified faces.

In one embodiment, the display of the identified faces may be through an app on the phone (e.g. photo sharing app, etc.), a native utility app (e.g. gallery, etc.), an online portal (e.g. through a website, etc.), and/or through any other system.

Figure 31L:
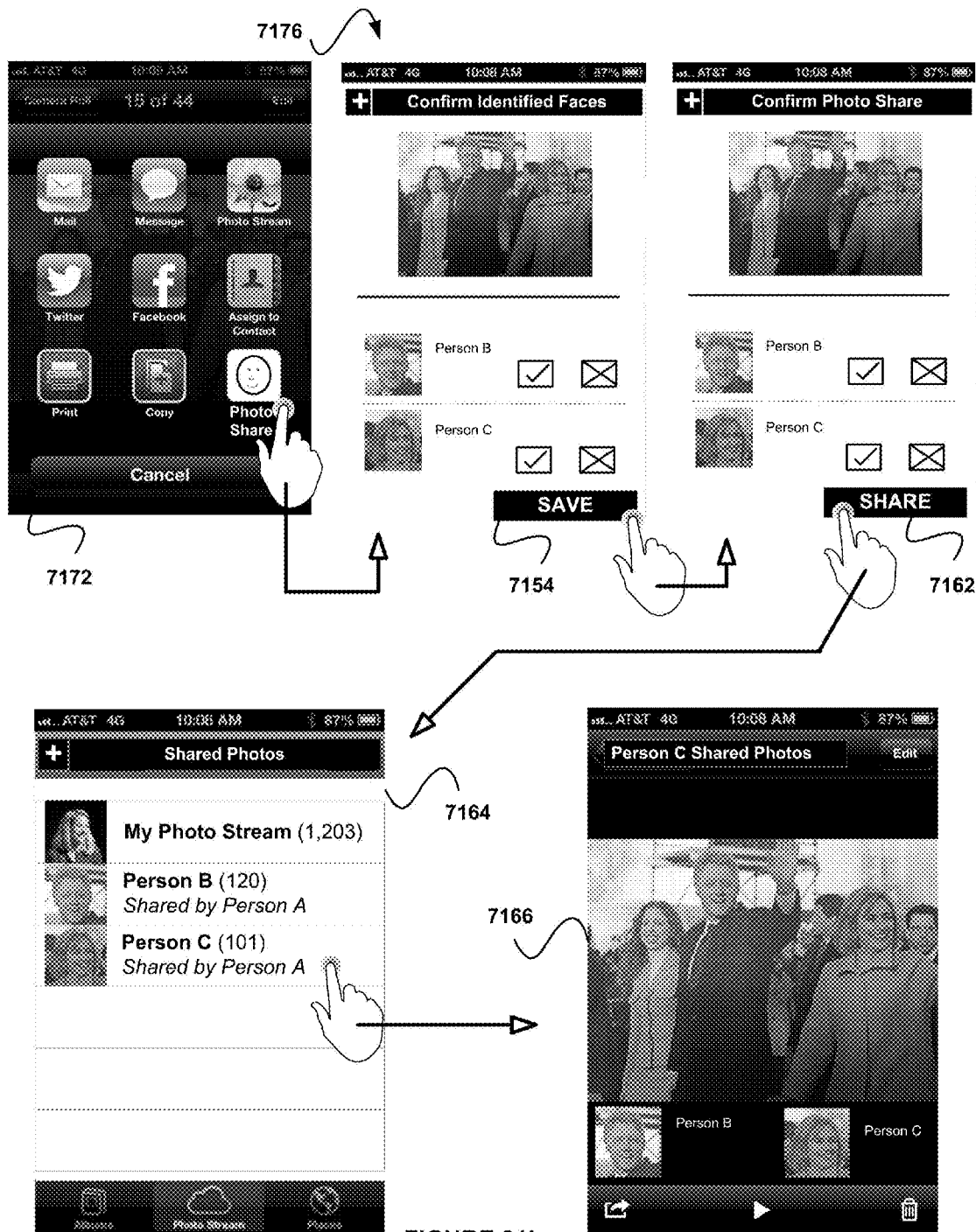
FIG. 31L shows a user interface for sharing metadata associated with media objects, in accordance with another embodiment.

FIG. 31L shows a user interface 7176 for sharing metadata associated with media objects, in accordance with another embodiment. As an option, the user interface 7176 may be implemented in the context of the architecture and environment of the previous Figures or any subsequent Figure(s). Of course, however, the user interface 7176 may be implemented in the context of any desired environment. It should also be noted that the aforementioned definitions may apply during the present description.

As shown, an existing photo may include an options interface 7172. In one embodiment, the options interface may include the ability to interact with the photo in some manner, including the ability to mail (e.g. email, etc.), message (e.g. via chat, real-time collaboration, etc.), photo stream (e.g. upload to an online photo database, upload to a synced server, etc.), upload to Twitter, upload to Facebook, assign (e.g. the photo, the identified faces, etc.) to a contact (or multiple contacts possibly if more than one face, etc.), print, copy, photo share (e.g. share the photo, etc.), and/or take any other action relating to the existing photo.

In various embodiments, the photo share option may be displayed with respect to any photo and/or image. For example, in one embodiment, a photo may be received as an attachment to an email. The photo may be viewed within the email app and an option associated with the photo (e.g. by selecting the photo, etc.) may include the ability to photo share.

In one embodiment, after selecting a photo share option, a confirm identified faces interface 7154 may be displayed.

In one embodiment, the identified faces may be displayed in separate rows, where each row provides one or more options associated with the identified face. For example, in one embodiment, identified face A may be displayed with a name associated with the face and a confirm or decline button may also be displayed. Subsequent identified faces may be listed in row format below the identified face A row. Of course, in other embodiments, the identified faces may be displayed in any manner, including a grid format (e.g. thumbnail images of the identified faces may be displayed, etc.), a list of matches (e.g. a number may be associated with each face and the number row may include one or more options, etc.), and/or in any other manner.

Further, in one embodiment, a confirm identified faces interface may be dependent on a confidence ranking. For example, in one embodiment, it may be determined (e.g. based on facial recognition algorithms, etc.) that the identified faces in a captured image are ranked at an 85% level of confidence. In some embodiments, if the confidence level is over a threshold (e.g. 70%, etc.), then the confirm identified faces interface may not be displayed and metadata associated with the identification will automatically be added to the captured image.

In other embodiments, one or more sensors may be used to assess the confidence ranking. For example, in one embodiment, the user's mobile device may recognize (e.g. via GPS path, via network discovery, via device discovery, etc.) that one or more devices (e.g. device associated with a contact, etc.) are near the user's device. In some embodiments, based off of the discovery of one or more devices, the user's mobile device may assign a higher confidence ranking to the captured image based off of the presence of other contact's devices. In one embodiment, the one or more discovered devices may have previously been saved (e.g. known device connection, etc.). In a further embodiment, the one or more discovered devices may have not previously been connected (discovered, etc.) by the user's mobile device. However, contact metadata (e.g. devices, device ids, etc.) associated with the user's contacts may help to establish the identity of the one or more discovered devices.

As shown, after confirming the identified faces, the save option may be selected, and a confirm photo share interface 7162 may be displayed.

In one embodiment, the confirm photo share may display one or more identified faces. In various embodiments, the identified faces may be displayed in separate rows, where each row provides one or more options associated with the identified face. For example, in one embodiment, identified face A may be displayed with a name associated with the face and a confirm or decline button may also be displayed. Subsequent identified faces may be listed in row format below the identified face A row. Of course, in other embodiments, the identified faces may be displayed in any manner, including a grid format (e.g. thumbnail images of the identified faces may be displayed, etc.), a list of matches (e.g. a number may be associated with each face and the number row may include one or more options, etc.), and/or in any other manner.

Additionally, in one embodiment, a confirm photo share interface may be used to identify one or more faces (e.g. select a face and associate the face with a contact, etc.). In other embodiments, the confirm photo share interface may be used to confirm pre-identified faces (e.g. faces which have already been associated with a contact, etc.).

As shown, after confirming the one or more identified faces, the user may select to share the captured image, and a shared photos interface 7164 may be displayed. In one embodiment, one or more shared photo albums may be presented, including one or more photo albums associated with the user, one or more albums associated with one of the identified contacts (e.g. based on the identified face(s), etc.), one or more albums associated with a non-identified contact (e.g. album was previously shared to the user, etc.), one or more online photo albums (e.g. Flickr, Picasa, etc.), one or more social media photo albums (e.g. Facebook, etc.), and/or any album.

In various embodiments, sharing permissions may be associated with the one or more shared photo albums. For example, in one embodiment, the user of the mobile device may grant to one or more contacts the ability to access the user's photos. As such, permissions may be based on a contact-by-contact basis. In another embodiment, sharing permissions may be granted to an app (e.g. album sharing app, etc.), to a database (e.g. online database, central database, etc.), to a management service (e.g. photo sharing service, etc.), and/or to any other entity or system which may manage in some manner sharing permissions.

In one embodiment, a Person A may share "My Photo Stream," or an album which belongs to Person A. Additionally, Person A may create and share an album relating to Person B, and/or Person C, each of which contain photos relating to Person B or Person C, respectively. In one embodiment, Person A may categorize and organize the photos to be shared within a specific folder (e.g. Person B folder, etc.). In another embodiment, Person A may configure automatic settings so that a shared folder is created relating to Person B and all relevant photos (e.g. of Person B, etc.) are put in the created shared folder. In a further embodiment, Person A may configure sharing settings such that all photos may be shared and categorized automatically according to metadata (e.g. person, place, time, etc.). Of course, any level of sharing and/or permission may be associated with a photo, an album, an entity (e.g. contact, individual, store, etc.), etc.

In a further embodiment, a Person A may "opt-in" to receive (or have access to) photos shared by a user. For example, in one embodiment, Person A may be interested in any photo containing Person D. As such, whenever the user uploads a photo (e.g. to Photo Stream, online database, shared folder, etc.) associated with Person D, Person A may receive notification of such an upload and have access to the photo (e.g. in the shared photo stream folder, etc.). In other embodiments, a Person A may "opt-in" to a shared album. The shared album may be created and/or managed by any user. In one embodiment, "opting-in" to a shared album may enable Person A to edit, share, delete, and/or manage photos on the shared album. Of course, in other embodiments, a shared folder may be controlled by one or more permissions (e.g. ability to manipulate, edit, delete, view, etc.).

As shown, in one embodiment, a user may select "Person C" shared album, and a shared photo interface 7166 may be displayed. In one embodiment, selecting a shared folder may display one or more photos (e.g. in grid form, in list form, as thumbnails, etc.). In other embodiments, the first photo in the album may be displayed. Additionally, in another embodiment, one or more features may be provided to manipulate and/or edit the view of the photos. For example, in one embodiment, a thumbnail size bar may be used to increase or shrink the size of the thumbnails, a dropdown menu (or any menu type) may be used to switch the view (e.g. grid, list, etc.) of the photos, one or more filters may be displayed to restrict (e.g. location, date, online database, local cache, etc.) in some manner the displayed photos, etc. Of course, in other embodiments, any filter and/or restriction may be applied to the one or more displayed photos.

In another embodiment, a shared photo may include an identification of the identified faces in the photo. For example, in one embodiment, a photo may include the faces of Person B and Person C, and below the photo a thumbnail image of the face(s) may be displayed with text alongside, including, for example, Person B or Person C. In other embodiments, a textual list of identified faces may be displayed and when the text is selected, the identified face may be highlighted (e.g. brightened, circle appears around the face, etc.). In another embodiment, briefly selecting a face (but not long enough to cause options to appears) may identify the face (e.g. text may be displayed next to the face, etc.). In a further embodiment, selecting a face may include displaying the name associated with the face and/or one or more options associated with the face (e.g. tag, shared media with this face, request media with this face, etc.). Additionally, selecting a face may cause an audible response (e.g. selecting a face may cause "Person B" to be spoken, etc.). Of course, in another embodiment, the user may interact with the photo in any manner to identify the identified faces.

In one embodiment, the display of the identified faces may be through an app on the phone (e.g. photo sharing app, etc.), a native utility app (e.g. gallery, etc.), an online portal (e.g. through a website, etc.), and/or through any other system.

Figure 31M:
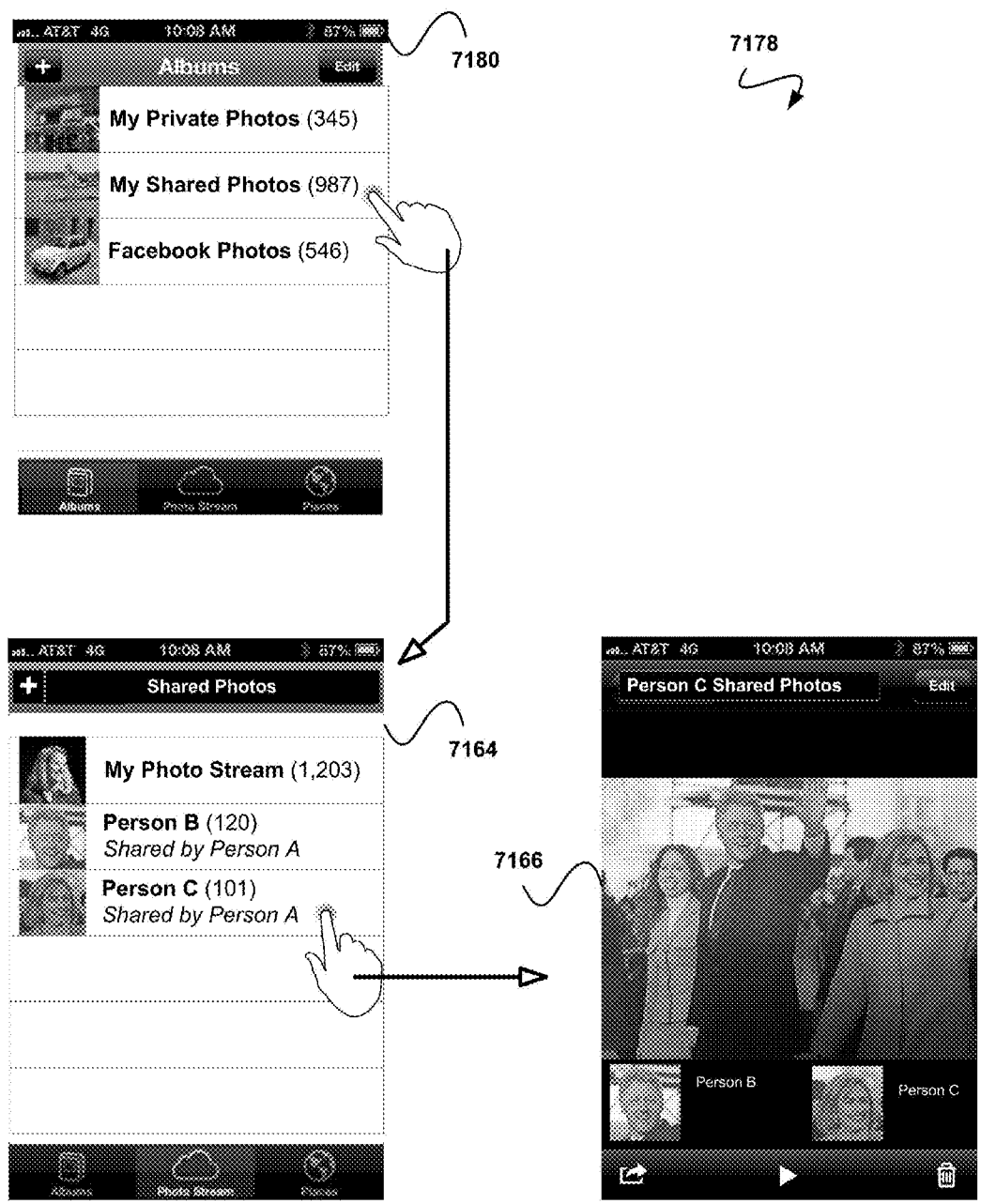
FIG. 31M shows a user interface for sharing metadata associated with media objects, in accordance with another embodiment.

FIG. 31M shows a user interface 7178 for sharing metadata associated with media objects, in accordance with another embodiment. As an option, the user interface 7178 may be implemented in the context of the architecture and environment of the previous Figures or any subsequent Figure(s). Of course, however, the user interface 7178 may be implemented in the context of any desired environment. It should also be noted that the aforementioned definitions may apply during the present description.

As shown, an album interface 7180 may be displayed. In various embodiments, the album interface may include private photos (e.g. permission settings are restricted to the user, etc.), shared photos (e.g. stored on the device and shared with another user and/or device, synced and managed in the cloud, etc.), social media photos (e.g. photos from Facebook, Flickr, etc.), photos stored on an online database (e.g. Dropbox, etc.), and/or any other photos stored on any medium and/or with any system.

As shown, after selecting a shared photo album, a shared photos interface 7164 may be displayed. In one embodiment, one or more shared photo albums may be presented, including one or more photo albums associated with the user, one or more albums associated with one of the identified contacts (e.g. based on the identified face(s), etc.), one or more albums associated with a non-identified contact (e.g. album was previously shared to the user, etc.), one or more online photo albums (e.g. Flickr, Picasa, etc.), one or more social media photo albums (e.g. Facebook, etc.), and/or any album.

In various embodiments, sharing permissions may be associated with the one or more shared photo albums. For example, in one embodiment, the user of the mobile device may grant to one or more contacts the ability to access the user's photos. As such, permissions may be based on a contact-by-contact basis. In another embodiment, sharing permissions may be granted to an app (e.g. album sharing app, etc.), to a database (e.g. online database, central database, etc.), to a management service (e.g. photo sharing service, etc.), and/or to any other entity or system which may manage in some manner sharing permissions.

In one embodiment, a Person A may share "My Photo Stream," or an album which belongs to Person A. Additionally, Person A may create and share an album relating to Person B, and/or Person C, each of which contain photos relating to Person B or Person C, respectively. In one embodiment, Person A may categorize and organize the photos to be shared within a specific folder (e.g. Person B folder, etc.). In another embodiment, Person A may configure automatic settings so that a shared folder is created relating to Person B and all relevant photos (e.g. of Person B, etc.) are put in the created shared folder. In a further embodiment, Person A may configure sharing settings such that all photos may be shared and categorized automatically according to metadata (e.g. person, place, time, etc.). Of course, any level of sharing and/or permission may be associated with a photo, an album, an entity (e.g. contact, individual, store, etc.), etc.

In a further embodiment, a Person A may "opt-in" to receive (or have access to) photos shared by a user. For example, in one embodiment, Person A may be interested in any photo containing Person D. As such, whenever the user uploads a photo (e.g. to Photo Stream, online database, shared folder, etc.) associated with Person D, Person A may receive notification of such an upload and have access to the photo (e.g. in the shared photo stream folder, etc.). In other embodiments, a Person A may "opt-in" to a shared album. The shared album may be created and/or managed by any user. In one embodiment, "opting-in" to a shared album may enable Person A to edit, share, delete, and/or manage photos on the shared album. Of course, in other embodiments, a shared folder may be controlled by one or more permissions (e.g. ability to manipulate, edit, delete, view, etc.).

As shown, in one embodiment, a user may select "Person C" shared album, and a shared photo interface 7166 may be displayed. In one embodiment, selecting a shared folder may display one or more photos (e.g. in grid form, in list form, as thumbnails, etc.). In other embodiments, the first photo in the album may be displayed. Additionally, in another embodiment, one or more features may be provided to manipulate and/or edit the view of the photos. For example, in one embodiment, a thumbnail size bar may be used to increase or shrink the size of the thumbnails, a dropdown menu (or any menu type) may be used to switch the view (e.g. grid, list, etc.) of the photos, one or more filters may be displayed to restrict (e.g. location, date, online database, local cache, etc.) in some manner the displayed photos, etc. Of course, in other embodiments, any filter and/or restriction may be applied to the one or more displayed photos.

In another embodiment, a shared photo may include an identification of the identified faces in the photo. For example, in one embodiment, a photo may include the faces of Person B and Person C, and below the photo a thumbnail image of the face(s) may be displayed with text alongside, including, for example, Person B or Person C. In other embodiments, a textual list of identified faces may be displayed and when the text is selected, the identified face may be highlighted (e.g. brightened, circle appears around the face, etc.). In another embodiment, briefly selecting a face (but not long enough to cause options to appears) may identify the face (e.g. text may be displayed next to the face, etc.). In a further embodiment, selecting a face may include displaying the name associated with the face and/or one or more options associated with the face (e.g. tag, shared media with this face, request media with this face, etc.). Additionally, selecting a face may cause an audible response (e.g. selecting a face may cause "Person B" to be spoken, etc.). Of course, in another embodiment, the user may interact with the photo in any manner to identify the identified faces.

In one embodiment, the display of the identified faces may be through an app on the phone (e.g. photo sharing app, etc.), a native utility app (e.g. gallery, etc.), an online portal (e.g. through a website, etc.), and/or through any other system.

Figure 31N:
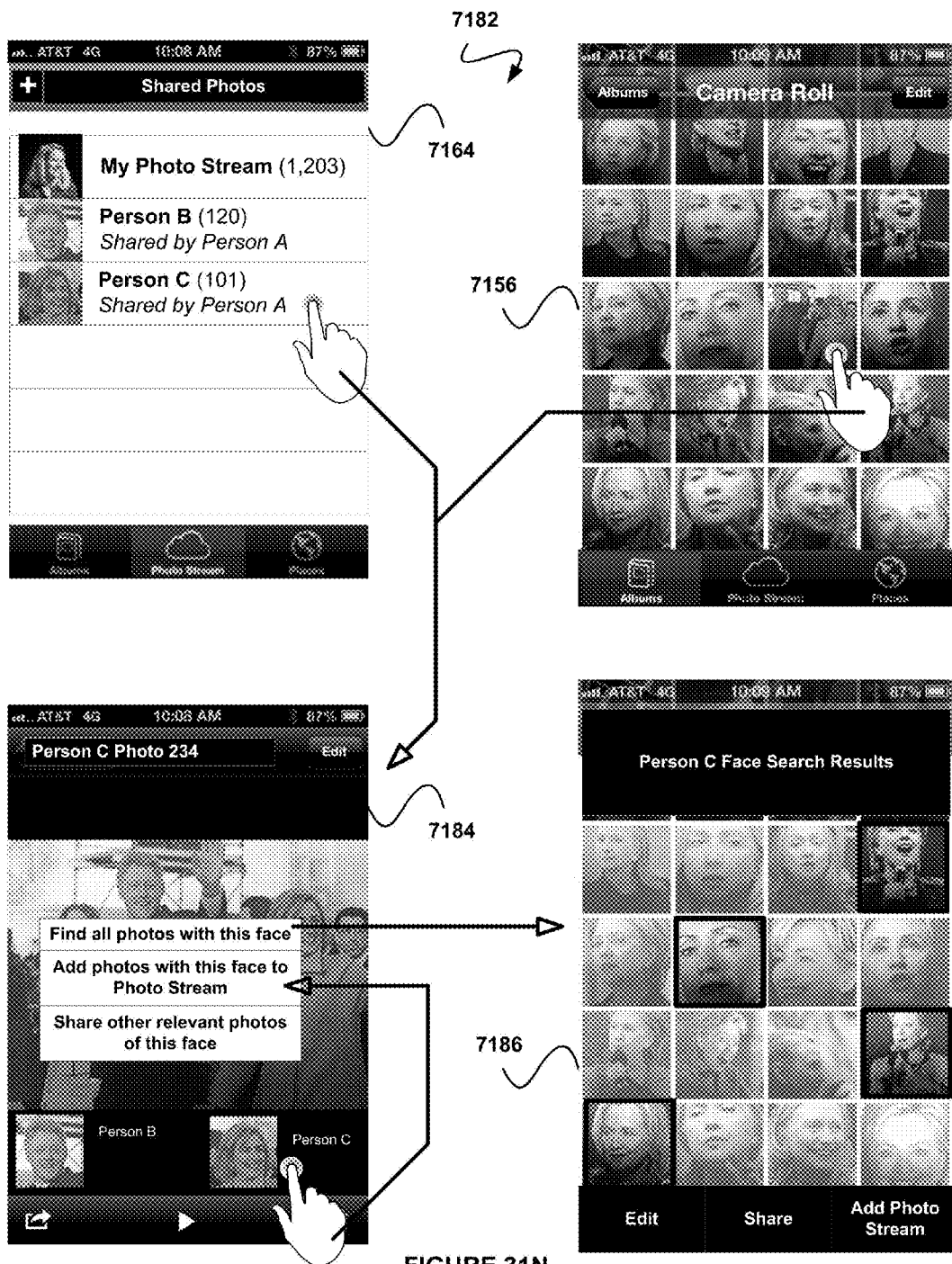
FIG. 31N shows a user interface for sharing metadata associated with media objects, in accordance with another embodiment.

FIG. 31N shows a user interface 7182 for sharing metadata associated with media objects, in accordance with another embodiment. As an option, the user interface 7182 may be implemented in the context of the architecture and environment of the previous Figures or any subsequent Figure(s). Of course, however, the user interface 7182 may be implemented in the context of any desired environment. It should also be noted that the aforementioned definitions may apply during the present description.

As shown, a shared photos interface 7164 may be displayed. In one embodiment, one or more shared photo albums may be presented, including one or more photo albums associated with the user, one or more albums associated with one of the identified contacts (e.g. based on the identified face(s), etc.), one or more albums associated with a non-identified contact (e.g. album was previously shared to the user, etc.), one or more online photo albums (e.g. Flickr, Picasa, etc.), one or more social media photo albums (e.g. Facebook, etc.), and/or any album.

In various embodiments, sharing permissions may be associated with the one or more shared photo albums. For example, in one embodiment, the user of the mobile device may grant to one or more contacts the ability to access the user's photos. As such, permissions may be based on a contact-by-contact basis. In another embodiment, sharing permissions may be granted to an app (e.g. album sharing app, etc.), to a database (e.g. online database, central database, etc.), to a management service (e.g. photo sharing service, etc.), and/or to any other entity or system which may manage in some manner sharing permissions.

In one embodiment, a Person A may share "My Photo Stream," or an album which belongs to Person A. Additionally, Person A may create and share an album relating to Person B, and/or Person C, each of which contain photos relating to Person B or Person C, respectively. In one embodiment, Person A may categorize and organize the photos to be shared within a specific folder (e.g. Person B folder, etc.). In another embodiment, Person A may configure automatic settings so that a shared folder is created relating to Person B and all relevant photos (e.g. of Person B, etc.) are put in the created shared folder. In a further embodiment, Person A may configure sharing settings such that all photos may be shared and categorized automatically according to metadata (e.g. person, place, time, etc.). Of course, any level of sharing and/or permission may be associated with a photo, an album, an entity (e.g. contact, individual, store, etc.), etc.

In a further embodiment, a Person A may "opt-in" to receive (or have access to) photos shared by a user. For example, in one embodiment, Person A may be interested in any photo containing Person D. As such, whenever the user uploads a photo (e.g. to Photo Stream, online database, shared folder, etc.) associated with Person D, Person A may receive notification of such an upload and have access to the photo (e.g. in the shared photo stream folder, etc.). In other embodiments, a Person A may "opt-in" to a shared album. The shared album may be created and/or managed by any user. In one embodiment, "opting-in" to a shared album may enable Person A to edit, share, delete, and/or manage photos on the shared album. Of course, in other embodiments, a shared folder may be controlled by one or more permissions (e.g. ability to manipulate, edit, delete, view, etc.).

As shown, in one embodiment, a gallery app interface 7156 may be displayed. In various embodiments, one or more photos may be displayed (e.g. grid format, thumbnail images, list format, etc.). Of course, any app may be used to display in some manner a photo. As an example, in one embodiment, an email may be received with a photo attachment and the email app may display in some manner (e.g. thumbnail preview, etc.) the photo attachment.

As shown, a shared album may be selected from shared photo interface 7164, and a photo interface 7184 may be displayed. Additionally, a photo may be selected from a gallery app interface 7156, and a photo interface 7184 may be displayed.

In various embodiments, selecting a shared album may cause one or more photos to be displayed. For example, in some embodiments, selecting a folder may cause more than one photo to be displayed (e.g. in grid view, etc.). In other embodiments, selecting a shared album may cause a single photo to be displayed. Of course, the view (e.g. single photo, multiple photos, etc.) may be manipulated in any manner by the user.

In one embodiment, the photo interface may include one or more identifications. For example, in one embodiment, identified faces may be displayed below a photo with identifying text (e.g. name, user id, etc.) associated with the face. Of course, in other embodiments, the identification may be displayed in any manner. In another embodiment, if the photo does not contain any identification metadata, the user may be prompted (or may proactively give) input to assign metadata (e.g. name, etc.) to faces.

In one embodiment, selecting a face (e.g. identified face, etc.) may display one or more options, including the ability to find all photos with the selected face, to add photos with the selected face to photo stream, and/or to share other relevant photos of the selected face.

As shown, selecting to find all photos with the selected face may cause a search results interface 7186 to be displayed. In one embodiment, the search results interface may include an ability to select one or more photos. In one embodiment, a "select all" feature may be provided. In another embodiment, the user may individually select one or more photos by touching each desired photo (e.g. touching the screen of the device, etc.), moving the finger over the desired photos in a fluid motion (e.g. without lifting up, sliding the finger across desired photos, etc.), and/or by any other manner. In one embodiment, when a photo is selected, the photo may be framed or otherwise altered to indicate the photo has been selected.

In one embodiment, the search results may be associated with photos on the user's local device (e.g. stored on the mobile device, etc.). In other embodiments, the searching may include searching the user's mobile device, one or more secondary devices (e.g. associated with another person, etc.), an online database, an online social media network, one or more shared folders, and/or any item which may contain relevant (e.g. associated with the face, etc.) photos.

After selecting the one or more desired photos, the user may select to edit the selected photos, share the selected photos (e.g. via email, via shared folder, via blog, via social media, etc.), add the photos to photo stream, and/or take any other action. In one embodiment, adding the photos to photo stream may include adjusting one or more permissions (e.g. in the metadata, etc.) for each photo (e.g. may be stored in the cloud, etc.). In other embodiments, selecting to share the photos may verify one or more permissions associated with the photos.

In one embodiment, one or more rules may be associated with the search results. For example, in a particular embodiment, after selecting the desired faces, a rule may be created whereby similar photos may be, in like manner, added to photo stream. Such a rule may include the photo angle (e.g. frontal face shot, etc.), the time of day (e.g. morning images, etc.), the exposure (e.g. not overexposed, etc.), and/or any other photo or device feature.

In another embodiment, a user may select from photo interface 7184 to add photos with this face to photo stream or to share other relevant photos of this face. An interface similar to search results 7186 may be displayed for both scenarios, whereby the user may select one or more photos to be added to photo stream or to be shared.

Still yet, in another embodiment, sharing one or more photos (e.g. based off of the identified face, etc.) may be based off of one or more permissions, including, for example, permissions associated with one or more users (e.g. sender and receiver permissions, etc.), applications (e.g. app has been granted permission to access and receive local and shared photos, etc.), devices (e.g. id clearance, etc.), and/or any other source.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals.

It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

In one embodiment, each method described above and combinations thereof may be embodied in computer executable code that, when executing on one or more computing devices, performs the acts and/or provides the capabilities thereof. In another embodiment, the methods may be embodied in systems that perform the acts and/or provides the capabilities thereof, and may be distributed across devices in a number of ways, or all of the functionality may be integrated into a dedicated, standalone device or other hardware. In another embodiment, means for performing the steps associated with the processes described above may include any of the hardware and/or software described above. All such permutations and combinations are intended to fall within the scope of the present disclosure.

References in this specification and/or references in specifications incorporated by reference to "one embodiment" may mean that particular aspects, architectures, functions, features, structures, characteristics, etc. of an embodiment that may be described in connection with the embodiment may be included in at least one implementation. Thus, references to "in one embodiment" may not necessarily refer to the same embodiment. The particular aspects etc. may be included in forms other than the particular embodiment described and/or illustrated and all such forms may be encompassed within the scope and claims of the present application. Further, this specification and/or specifications incorporated by reference may refer to a list of alternatives. For example, a first reference such as "A (e.g. B, C, D, E, etc.)" may refer to a list of alternatives to A including (but not limited to) B, C, D, E. A second reference to "A etc." may then be equivalent to the first reference to "A (e.g. B, C, D, E, etc.)." Thus, a reference to "A etc." may be interpreted to mean "A (e.g. B, C, D, E, etc.)."

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A device, comprising:
   a screen;
   an input mechanism;
   at least one non-transitory memory storing instructions; and
   one or more processors in communication with the screen, the input mechanism, and the at least one non-transitory memory, wherein the one or more processors execute the instructions to cause the device to:
   display, utilizing the screen of the device, a plurality of indicia each including at least a portion of an image including a face;
   receive, utilizing the input mechanism of the device, a user input in connection with at least one of the indicia including at least a portion of a first image including a first face;
   after receiving the user input in connection with the at least one indicia, display, utilizing the screen of the device, a first set of images each including the first face that has been recognized in at least one of a plurality of images accessible via the device;
   display, utilizing the screen of the device, at least one option for sharing images, where the sharing is performed utilizing face recognition information that is based on third party input of a third party that is provided by the third party into at least one other device in association with at least one face, the face recognition information being utilized in connection with the at least one option for sharing images based on a relation between a user of the device and the third party associated with the third party input, such that the face recognition information is only utilized in connection with the at least one option for sharing images if the relation exists between the user of the device and the third party associated with the third party input;
   in connection with the at least one option for sharing images, display, utilizing the screen of the device, a second set of images each including the at least one face that has been recognized in at least one of the plurality of images accessible via the device utilizing the face recognition information that is based on the third party input of the third party that is provided by the third party into the at least one other device in association with the at least one face;
   receive, utilizing the input mechanism of the device, a user input in connection with at least one of the second set of images; and
   after receiving the user input in connection with at least one of the second set of images, cause one or more of the second set of images to be shared.

2. The device as set forth in claim 1, wherein the one or more processors execute the instructions to cause the device to:
   display, utilizing the screen of the device, at least one additional option for sharing images; and
   in connection with the at least one additional option for sharing images:
   receive, utilizing the input mechanism of the device, an email address or a name of at least one other person,
   display, utilizing the screen of the device, the plurality of indicia each including the at least portion of the image including the face,
   receive, utilizing the input mechanism of the device, a user input in connection with one or more of the indicia corresponding to one or more faces, and
   based on the user input in connection with the one or more of the indicia corresponding to the one or more faces and utilizing the email address or the name of the at least one other person, cause sharing of a third set of images each including the one or more faces that has been recognized in at least one of the plurality of images accessible via the device.

3. The device as set forth in claim 2, wherein the device is configured such that the third set of images is caused to be shared by causing an invitation to be sent to the email address of the at least one other person.

4. The device as set forth in claim 2, wherein the device is configured such that, in response to the one or more faces being recognized in new images, the new images are automatically caused to be shared after the third set of images is caused to be shared.

5. The device as set forth in claim 2, wherein the device is configured such that the plurality of indicia is part of a face screen that is configured for receiving tags in connection with the plurality of indicia, and the tags are displayed with the plurality of indicia in connection with the at least one additional option for sharing images.

6. The device as set forth in claim 1, wherein the one or more processors execute the instructions to cause the device to:
after displaying the at least one option for sharing images, receive, utilizing the input mechanism of the device, a user input in connection with the at least one option for sharing images;
wherein the device is configured such that the second set of images is conditionally displayed, based on the user input in connection with the at least one option for sharing images.

7. The device as set forth in claim 1, wherein the one or more processors execute the instructions to cause the device to:
after displaying the at least one option for sharing images, receive, utilizing the input mechanism of the device, a user input in connection with the at least one option for sharing images;
wherein the device is configured such that the display of the plurality of images is disabled or enabled, based on the user input in connection with the at least one option for sharing images.

8. The device as set forth in claim 1, wherein the device is configured such the at least one face is a face of the third party, and the third party input includes an identification the face of the third party.

9. The device as set forth in claim 8, wherein the device is configured such the face recognition information is based on the third party input of the third party, by reflecting the face of the third party.

10. The device as set forth in claim 1, wherein the device is configured such the face recognition information is based on the third party input of the third party, by including a correspondence that is identified by the third party input of the third party.

11. The device as set forth in claim 1, wherein the device is configured such that the third party input includes training input that is input into the at least one other device for generating the face recognition information that is capable of being utilized for identifying the at least one face in the plurality of images accessible via the device.

12. The device as set forth in claim 1, wherein the device is configured such that the third party input correlates the at least one face with the third party.

13. The device as set forth in claim 1, wherein the device is configured such that the relation is established based on an invitation and an acceptance of the invitation.

14. The device as set forth in claim 1, wherein the device is configured such that the relation is established based on contact information of the third party being present in a contact database of the user.

15. The device as set forth in claim 1, wherein the device is configured such that the at least one option for sharing images includes an option for displaying sharing suggestions based on the face recognition information and the second set of images is displayed as the sharing suggestions for causing the one or more of the second set of images to be shared after the user input in connection the at least one of the second set of images.

16. The device as set forth in claim 1, wherein the device is configured such that the one or more of the second set of images is caused to be shared with the third party.

17. The device as set forth in claim 1, wherein the device is configured such that the user input in connection with the at least one of the second set of images includes a deselection of at least a portion of the second set of images, where the second set of images are selected by default.

18. The device as set forth in claim 1, wherein the device is configured such that the plurality of indicia include a plurality of face icons of a face recognition home screen, and the at least one option is accessible via a configuration interface element separate from the face recognition home screen.

19. The device as set forth in claim 1, wherein the instructions are configured to cause the device to access at least one server for: receiving at least one web page to cause the device to display the plurality of indicia, the first set of images, the second set of images, and the at least one option for sharing images, wherein the at least one web page further permits the receipt, by the device, the user input in connection with the at least one indicia and the user input in connection with at least one of the second set of images; where the sharing of the one or more of the second set of images is caused by sending a signal from the device to the at least one server.

20. The device as set forth in claim 1, wherein the device is configured such that the at least option is capable of being enabled, for permitting the face recognition information, that is based on the third party input, to be utilized for the benefit of the user by displaying, as sharing suggestions, the second set of images, so that the user is capable of sharing, with the third party and conditionally based on user control, the one or more of the second set of images that are previously accessible only via the device of the user.

21. The device as set forth in claim 1, wherein the device is configured such that the at least option is capable of being enabled, for permitting the face recognition information, that is based on the third party input, to be utilized for the benefit of the user by displaying, as sharing suggestions, the second set of image without a prior visible indication being received by the user indicating a sharing of the face recognition information by the third party, so that the user is capable of sharing, with the third party and conditionally based on user control, the one or more of the second set of images that are previously accessible only via the device of the user.

22. The device as set forth in claim 1, wherein at least one of:
the device includes a mobile device;
the input mechanism and the screen are components of a touchscreen;
the input mechanism and the screen are separate components;
the images include pictures;
the images are frames of a video;
the images are part of a video;
the images are included in corresponding videos;
the instructions are configured to cause the device to communicate with at least one server, and the communication causes the device to perform at least a portion of at least one instance of the displaying, the receiving, or the sharing;
the instructions are configured to cause the device to communicate with at least one server, and the communication causes the device to perform at least a portion of each of the displaying, the receiving, and the sharing;
the indicia includes a visible interface element associated with a face;
the at least one face is capable of including the first face;
the plurality of indicia each includes a different face;
the instructions are part of a client-based application;

the instructions are utilized to access a server-based application;

the device is configured such that the user input is received in connection with the at least one indicia as a result of detecting a touch of a finger of the user within a predetermined proximity to the at least one indicia displayed utilizing the screen of the device;

the second set of images is displayed in response to receipt of a user input in connection with the at least one option for sharing images;

the second set of images is displayed in response to receipt of a user input in connection with the at least one option for sharing images, where the at least one option for sharing images includes a share button;

the one or more of the second set of images caused to be shared, include the at least one of the second set of images;

the one or more of the second set of images caused to be shared, do not include the at least one of the second set of images;

the at least one of the second set of images includes a subset of the plurality of images accessible via the device;

the one or more of the second set of images includes a subset of the plurality of images accessible via the device;

the one or more of the second set of images is caused to be shared, in response to the receipt of the user input in connection with the at least one of the second set of images;

the one or more of the second set of images is caused to be shared, after one or more intermediate operations after the receipt of the user input in connection with the at least one of the second set of images;

the user input in connection with the at least one of the second set of images includes a selection of the at least one of the second set of images;

the user input in connection with the at least one of the second set of images includes a selection on a share button;

the first set of images and the second set of images are mutually exclusive;

the first set of images and the second set of images overlap;

the third party input results in a correspondence;

the third party input results in a correspondence between at least one face and at least one user;

the third party input results in a correspondence between at least one face and at least one user;

the third party input includes a selection of at least one face;

the third party input includes tagging input;

the face recognition information is directly or indirectly received at the device from the at least one other device;

the face recognition information is received at the device from at least one server in communication with the device;

the relation is established based on a request and a response to the request;

the relation includes a relationship;

the plurality of images are accessible via the device are accessible by being stored in the at least one non-transitory memory of the device;

the plurality of images are accessible via the device are accessible by being received over a network interface of the device;

the face recognition information of the user of the device includes facial data;

processing results involving the face recognition information are directly or indirectly received at the device from the at least one other device;

processing results involving the face recognition information are received at the device from at least one server in communication with the device; or the device is part of a system that further comprises at least one server.

23. An apparatus, comprising:

a screen;

an input device;

at least one non-transitory memory storing instructions; and one or more processors in communication with the screen, the input device, and the at least one non-transitory memory, wherein the one or more processors execute the instructions to cause the apparatus to:

display, utilizing the screen of the apparatus, a plurality of indicia each including at least a portion of an image including a face;

receive, utilizing the input device of the apparatus, a user input on at least one of the indicia including at least a portion of a first image including a first face;

in response to the receipt of the user input on the at least one indicia, display, utilizing the screen of the apparatus, a first set of images each including the first face that has been recognized in at least one of a plurality of images accessible via the apparatus;

provide access to at least one feature for displaying images for sharing, where at least one aspect of the at least one feature utilizes face recognition information that is based on third party information of a third party that is provided by the third party into at least one other device in association with at least one face for correlating the at least one face with the third party, the face recognition information being utilized with the at least one aspect of the at least one feature based on a relation between a user of the apparatus and the third party that provided the third party information, such that the face recognition information is only utilized with the at least one aspect of the at least one feature if the relation exists between the user of the apparatus and the third party associated with the third party information;

display, utilizing the screen of the apparatus, a second set of images each including the at least one face that has been recognized in at least one of the plurality of images accessible via the apparatus utilizing the face recognition information that is based on the third party information of the third party that is provided by the third party into the at least one other device in association with the at least one face;

receive, utilizing the input device of the apparatus, a user input on at least one of the second set of images; and after receiving the user input on at least one of the second set of images, cause one or more of the second set of images to be shared with the third party.

24. The apparatus as set forth in claim 23, wherein the apparatus is configured such that:

the relation is established based on one or more previous communications with the third party;

the at least one aspect of the at least one feature includes selecting the images for displaying the images for sharing; and the at least one face is a face of the third party.

25. The apparatus as set forth in claim 24, wherein the apparatus is configured such that the at least feature is capable of being enabled, for permitting the face recognition information, that is based on the third party information, to be utilized for the benefit of the user by displaying, as sharing suggestions, the second set of images, so that the user is capable of sharing, with the third party and conditionally based on user control via the user input on at least one of the second set of images, the one or more of the second set of images that are previously accessible only via the apparatus of the user.

26. The apparatus as set forth in claim 24, wherein the apparatus is configured such that the at least feature is capable of being enabled, for permitting the face recognition information, that is based on the third party information, to be utilized for the benefit of the user by displaying, as sharing suggestions, the second set of image without a prior visible indication being received by the user indicating a sharing of the face recognition information by the third party, so that the user is capable of sharing, with the third party and conditionally based on user control via the user input on at least one of the second set of images, the one or more of the second set of images that are previously accessible only via the apparatus of the user.

27. A computer-implemented method, comprising:
providing access to at least one server utilizing an apparatus including: a screen, an input device, at least one non-transitory memory storing instructions, and one or more processors in communication with the screen, the input device, and the at least one non-transitory memory; and communicating with the at least one server such that the apparatus is operable to:
  display, utilizing the screen of the apparatus, a plurality of indicia each including at least a portion of an image including a face;
  receive, utilizing the input device of the apparatus, a user input on at least one of the indicia including at least a portion of a first image including a first face;
  in response to the receipt of the user input on the at least one indicia, display, utilizing the screen of the apparatus, a first set of images each including the first face that has been recognized in at least one of a plurality of images accessible via the apparatus;
  provide access to at least one feature for displaying images for sharing, where at least one aspect of the at least one feature utilizes face recognition information that is based on third party information of a third party that is provided by the third party into at least one other device in association with at least one face for correlating the at least one face with the third party, the face recognition information being utilized with the at least one feature based on a relation between a user of the apparatus and the third party that provided the third party information, such that the face recognition information is only utilized with the at least one feature if the relation exists between the user of the apparatus and the third party associated with the third party information;
  display, utilizing the screen of the apparatus, a second set of images each including the at least one face that has been recognized in at least one of the plurality of images accessible via the apparatus utilizing the face recognition information that is based on the third party information of the third party that is provided by the third party into the at least one other device in association with the at least one face;
  receive, utilizing the input device of the apparatus, a user input on at least one of the second set of images; and
  after receiving the user input on at least one of the second set of images, cause one or more of the second set of images to be shared with the third party.

28. The method as set forth in claim 27, wherein the at least feature is capable of being enabled, for permitting the face recognition information, that is based on the third party information, to be utilized for the benefit of the user by displaying, as sharing suggestions, the second set of images, so that the user is capable of sharing, with the third party and conditionally based on user control via the user input on at least one of the second set of images, the one or more of the second set of images that are previously accessible only via the apparatus of the user.

29. The method as set forth in claim 27, wherein the at least feature is capable of being enabled, for permitting the face recognition information, that is based on the third party information, to be utilized for the benefit of the user by displaying, as sharing suggestions, the second set of image without a prior visible indication being received by the user from the third party in connection with a sharing of the face recognition information by the third party, so that the user is capable of sharing, with the third party and conditionally based on user control via the user input on at least one of the second set of images, the one or more of the second set of images that are previously accessible only via the apparatus of the user.

30. The method as set forth in claim 29, wherein:
the relation is established based on one or more previous communications with the third party;
the plurality of indicia is a grid of face interface elements; and
the at least one aspect of the at least one feature includes the displaying of the images for sharing.

* * * * *

Disclaimer and Dedication

10,027,726 B1 - Ozog, Jesse, Bethesda, MD. DEVICE, APPARATUS, AND METHOD FOR F/ RECOGNITION. Patent dated July 17, 2018. Disclaimer filed January 14, 2021 by the assignee, Bc LLC.

I hereby disclaim the following complete claims 1-30 of said patent.

*(Official Gazette, September 14, 2021)*